United States Patent [19]

Matsuda et al.

[11] Patent Number: 5,321,619
[45] Date of Patent: Jun. 14, 1994

[54] PRODUCTION CONTROL METHOD AND SYSTEM THEREFOR

[75] Inventors: Kinji Matsuda, Kameyama; Makoto Otabe, Suzuka, both of Japan

[73] Assignee: Honda Giken Kogyo Kabushiki Kaisha, Tokyo, Japan

[21] Appl. No.: 829,071
[22] PCT Filed: Sep. 17, 1991
[86] PCT No.: PCT/JP91/01231
§ 371 Date: Feb. 11, 1992
§ 102(e) Date: Feb. 11, 1992
[87] PCT Pub. No.: WO92/05012
PCT Pub. Date: Apr. 2, 1992

[30] Foreign Application Priority Data

| Sep. 17, 1990 | [JP] | Japan | 2-246531 |
| Sep. 17, 1990 | [JP] | Japan | 2-246532 |
| Oct. 23, 1990 | [JP] | Japan | 2-284694 |
| Oct. 23, 1990 | [JP] | Japan | 2-284695 |
| Oct. 26, 1990 | [JP] | Japan | 2-289381 |
| Oct. 29, 1990 | [JP] | Japan | 2-291233 |
| Nov. 1, 1990 | [JP] | Japan | 2-296247 |
| Nov. 29, 1990 | [JP] | Japan | 2-332776 |
| Nov. 29, 1990 | [JP] | Japan | 2-332777 |
| Nov. 30, 1990 | [JP] | Japan | 2-334071 |
| Nov. 30, 1990 | [JP] | Japan | 2-334072 |
| Nov. 30, 1990 | [JP] | Japan | 2-334073 |
| Nov. 30, 1990 | [JP] | Japan | 2-334074 |

[51] Int. Cl.$^5$ .......................... G06F 15/46
[52] U.S. Cl. .................. 364/468; 235/375; 364/478
[58] Field of Search ............... 364/468, 478, 401–403, 364/131–135; 235/375, 376, 385, 383

[56] References Cited

U.S. PATENT DOCUMENTS

| 4,646,245 | 2/1987 | Prodel et al. | 364/468 |
| 4,821,198 | 4/1989 | Takeuchi et al. | 364/468 |
| 4,831,540 | 5/1989 | Hesser | 364/468 |
| 4,930,086 | 5/1990 | Fukasawa | 364/468 |
| 4,942,534 | 7/1990 | Yokoyama et al. | 364/468 |
| 4,974,166 | 11/1990 | Maney et al. | 364/468 X |
| 5,044,634 | 9/1991 | Dudley | 340/991 X |

Primary Examiner—Joseph Ruggiero

[57] ABSTRACT

A method and a system of production control for a production line composed of a plurality of automatic machines, in which input of control data and change of contents of the data required for control of the automatic machine can easily and efficiently be made. Identification data fed from the host computer (30) are converted by a data converter (31) into control data for automatic machines (11) in each process and stored in a storage medium (20) so that each automatic machine may be controlled after the storage medium has been moved together with the workpiece, by control data read out from the storage medium in each process in the production line. The storage medium store not only control data for the workpiece moving together with this storage medium but also those for a plurality of work pieces positioned on the upstream side of the workpiece in the production line and, thereby, prepares the relative automatic machines to be ready for the subsequent stage of operation.

25 Claims, 41 Drawing Sheets

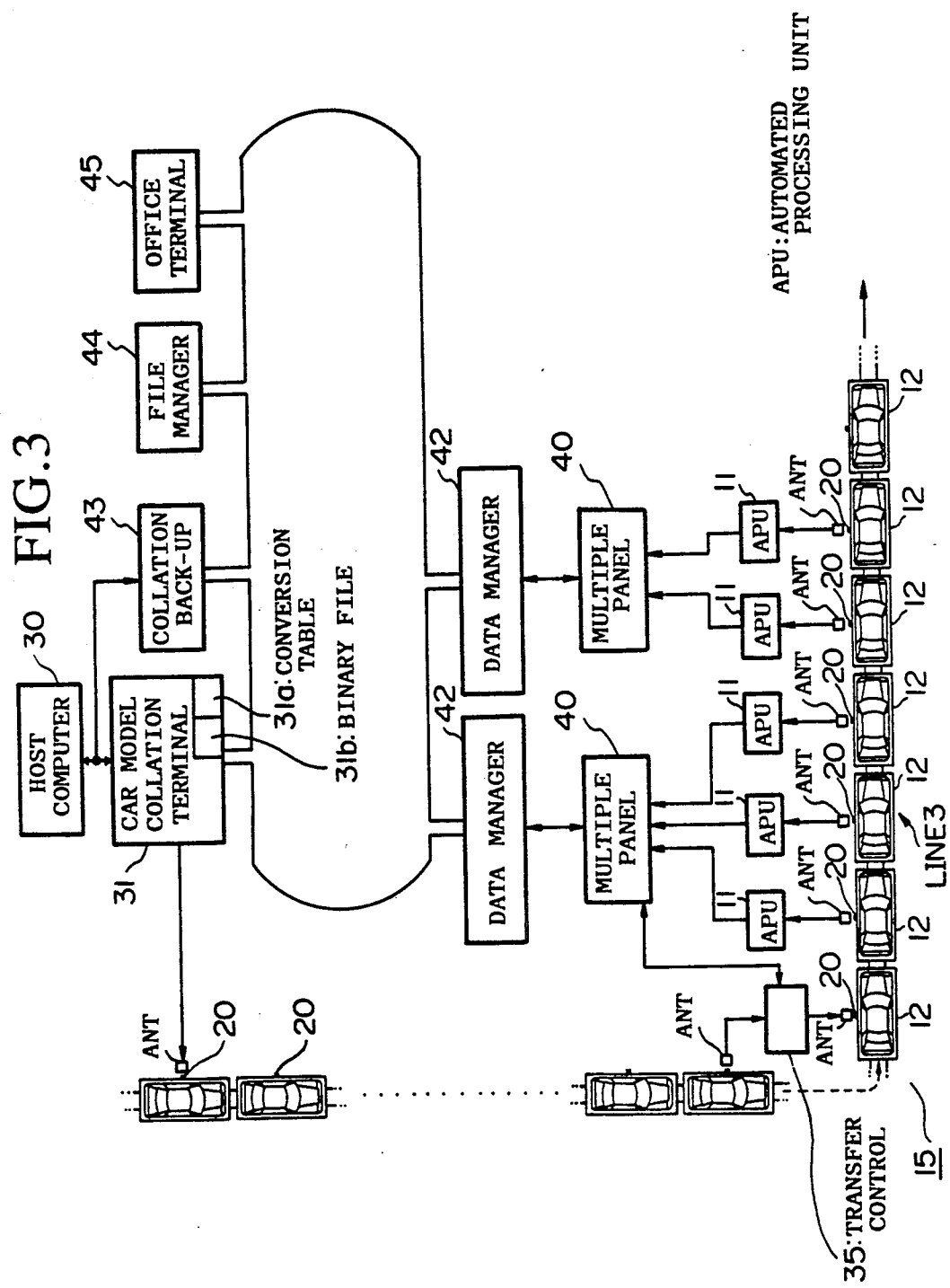

FIG.11
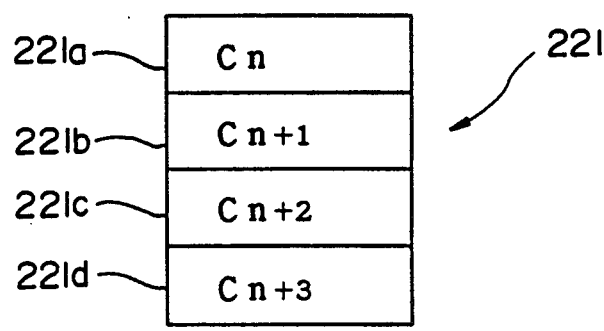
FIG.12 FIG.13
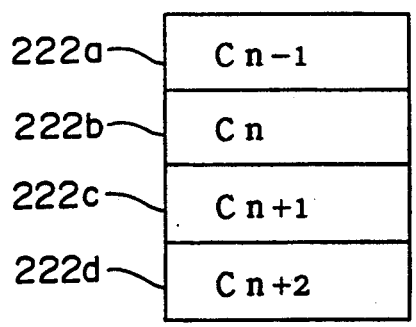 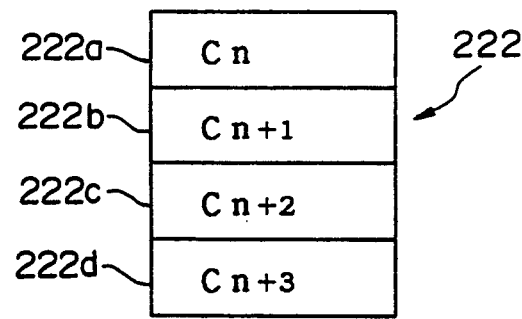

E:EMPTY

E:EMPTY

E:EMPTY

OBJ: OBJECT-TO-BE-PROCESSED

OBJ: OBJECT-TO-BE-PROCESSED

PRODUCTION CONTROL METHOD AND SYSTEM THEREFOR

BACKGROUND OF THE INVENTION

1. Field of the Invention

The present invention relates to production control methods and systems for automated production lines such as automated assembly lines for automobiles, and more particularly, to production control methods and systems with improvement in ensuring the conversion of data related to the contents of processing at each process, and in increasing the processing speeds.

2. Background Art

In an automated production line, automated processing units such as working units and assembling units are disposed at necessary positions in the production lines to process objects to be processed (OBJs) with necessary processing. The automated processing units (APUs) apply various processing to the OBJs which are moving toward the station along the production lines.

In a case in which different models or kinds of products are to be produced in a single production line, as is often the case with different car models produced in an automobile production line, different processing are required in accordance with each model. For example, in a conventional automobile production line, workers enter instruction data in each corresponding APU, indicating car models and other information. Such instruction data includes various data indicating car models, discrimination by number of doors such as between 2-door and 4-door models, and optional parts, if any, to be incorporated in the model, and the like. Instruction data to be entered is determined by the workers' visual observation of an identification card attached to the car being produced.

When the instruction data is entered, the APU generates a code for determining an operation to be conducted by utilizing a conversion table stored in its interior memory and applies a processing to the car being produced in accordance with this code. For example, in the case of an APU for automatically attaching windshields, the APU generates a code in accordance with the car model based on the instruction data, retrieves a windshield fitting the car model from a storage station, based on the code, and attaches the windshield to a specified position on the car.

However, the conventional production lines described above have problems as follows:

(1) a misdetermination of instruction data tends to occur since the instruction data is identified by the worker's visual observation; correcting the result from the misdetermination takes time, and the productivity of the production line thereby decreases;

(2) entering instruction data consumes time since the entering is done manually by the worker, thereby further decreasing productivity; and (3) changes in instruction data such as car model requires subsequent changes in every and all APUs, since each APU is equipped with its own respective conversion table, and the related adjustments are thereby complicated.

In order to overcome these problems, a data entering method may be considered in which an information storage medium for storing instruction data in memory (hereinafter referred to as an "ID plate") is attached to each OBJ so that the APU reads and enters information therein automatically; instead of the data being entered by a worker, the instruction data is stored in the ID plate attached to the OBJ, and by reading this ID plate, the APU applies processing to the OBJ in accordance with the entered data.

However, when the information is stored in such a storage medium, problems tend to arise as follows:

I. a huge storage capacity is required if sufficient information is to be stored for controlling all the operations to be conducted by the APU; and II. specifications for processing to be processed by an APU cannot be established until the OBJ has been brought in the APU and the necessary information has been read from the ID plate attached to the OBJ, since the ID plate is transported together with the OBJ, whereby the APU is caused to be idle until a next OBJ arrives to the APU after the processing of the current OBJ is completed.

SUMMARY OF THE INVENTION

It is therefore an object of the present invention to provide a production control system in which entries of control data and changes in control data required for controlling automated working units (APUs) are made easier and simpler in a production line constituted with a plurality of such APUs so that idle time is reduced which is taken while information is being read at each APU, thereby improving productivity.

According to the present invention, in order to achieve the above object, there is provided a production control system comprising: a host computer outputting identification data for identifying products; a plurality of APUs disposed at predetermined locations for processing an object to be processed (OBJ) in accordance with operation instruction data; data converter having text files storing the relationship between the operation instruction data and the identification data, the data converter generating the operation instruction data from the identification data by referring to the text files; information storage mediums respectively disposed on, and moving together with each of the plurality of OBJs flowing along the production line, the information storage mediums storing the contents of processing to be applied to the OBJs; data writer for writing the operation instruction data generated by the data converter in the information storage medium disposed on a corresponding OBJ; reader for reading the information from one OBJ being located at a predetermined location on the production line; and a control unit for controlling the APUs with the information read by the reader so that the APUs process the one OBJ as specified. The information storage mediums have a plurality of storage regions respectively storing both the information on an OBJ on which this information storage medium is disposed and the information on part of the plurality of OBJs located in a predetermined range of distance upstream from the one OBJ, along the production line.

In a production control system constituted as described above, when identification data is generated at and output from the host computer, the identification data is converted to operation instruction data by the data converter utilizing the data conversion table which stores the relationship between the identification data and the operation instruction data. Then, the operation instruction data is written in the information storage medium of a corresponding OBJ by the data writer. The information storage medium storing the operation instruction data moves along the production line together with the OBJ. When the OBJ arrives at a processing position of an APU, the operation instruction data is read by the reader and is sent to the control unit, which controls the APU based on the operation instruction data. Since the information storage medium stores the operation instruction data not only about the OBJ at the APU but also on other upstream OBJs following the OBJ at the APU, as described above, the APU is able to recognize the contents of processing for other OBJs in advance before the other OBJs arrive at the APU following the OBJ currently at the APU.

Since, as described above, the identification data is converted to the operation instruction data using the conversion table at one single data converter instead of using the conversion tables at every APU in the conventional production line, and since the APU is controlled with the operation instruction data, the necessary changes in the operation instruction data corresponding to changes in the identification data, such as car model change, can be easily and simply achieved by changing the contents of the data conversion table at the single data converter.

Furthermore, since the operation instruction data stored in the information storage medium is for a plurality of OBJs including both the OBJ currently at the APU and the upstream OBJs following the OBJ currently at the APU, the APU can recognize the operation instruction data for the next following OBJ in advance before the next following OBJ arrives after the processing of the preceding OBJ is finished, and thereby the APU can prepare for the next operation for the next following OBJ, thus resulting in the reduction of the idle waiting time and improvement in productivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the acompanying drawings which are given by way of illustration only, and thus are not limitative of the present invention, and wherein:

FIG. 3 is a schematic block diagram showing the electrical configuration of the production control system, according to a first embodiment of the present invention adapted in the production line of FIG. 1;

FIGS. 11, 12, and 13 are memory maps for the information storage medium according to the first embodiment of the present invention;

DETAILED DESCRIPTION OF THE PREFERRED EMBODIMENTS

Referring to the figures attached hereto, several embodiments of the present invention will be described below.

First, a layout of a production line to which the present invention is applicable, and the flow of automobile bodies as an example of objects to be processed (OBJs) along the production line, will be explained.

Figure 1:
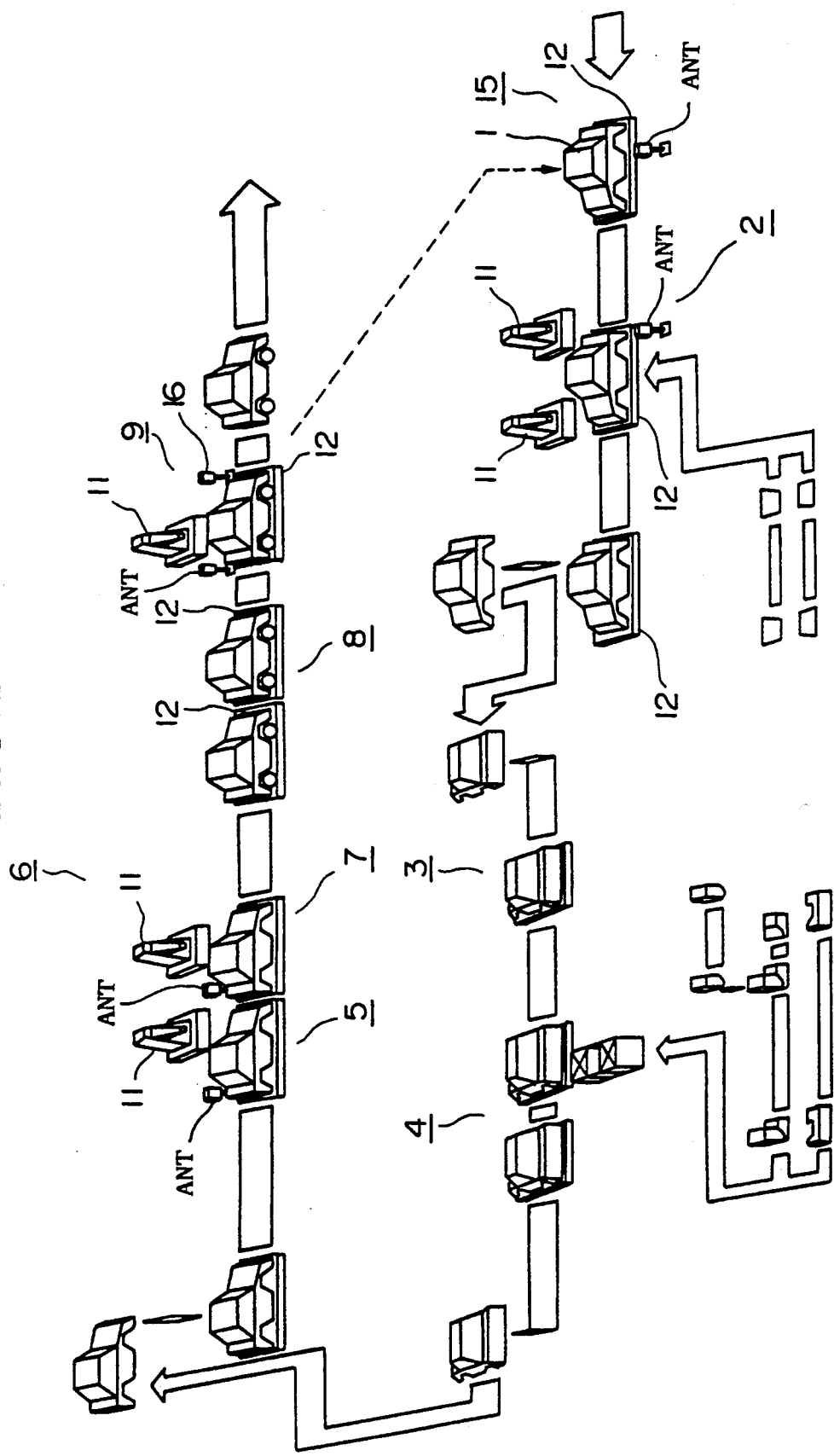
FIG. 1 is a schematic drawing showing a layout for a first example of production lines to which the present invention is applicable.

FIG. 1 is a schematic drawing showing an arrangement of part of an automobile production line to which the present invention is applied. Shown in FIG. 1 are automobile bodies 1, as objects to be processed (OBJs), and processing stations 2 to 9 for respectively processing the OBJs with predetermined processing. The predetermined processing at the processing stations include operations such as attaching a windshield, and securing a bumper, to the body 1. When processing at the last processing station 9 of this line is completed, the body 1 moves over to the next following production line (not shown). Each of the processing stations 2 to 9 described above is provided with APUs 11 such as industrial robots, which apply predetermined processing to the bodies 1 moving toward the APU 11. For the sake of simplicity, a certain number of the APUs not necessary for the description are not shown.

Along the line shown in FIG. 1, each body 1 is mounted on an automated transport dolly 12 which transports the body 1 along the production line. When the processings are completed at the processing station 9, which is the last processing station in this line shown in FIG. 1, the automated transport dolly 12 and the body 1 are separated from each other, and only the automated transport dolly 12 is returned to an input area 15, as shown by broken lines in FIG. 1. Thus, the automated transport dolly 12 is arranged to circulate through the production line shown in FIG. 1. At the input area 15, a body 1 having completed being processed in a preceding production line (not shown) is arranged to be transferred onto an empty automated transport dolly 12 which is circulating along the production line shown in FIG. 1.

It should be noted that the processings in the production line shown in FIG. 1 are adapted to be conducted on a single floor, e.g., the first floor of a building, and processing in a production line either following or preceding the line shown in FIG. 1 is performed on a different floor, e.g., the second floor of the same building. Hence, an OBJ, or body 1 completed with other processing such as welding and painting of the body 1 in the preceding line is brought in the input area 15, and mounted on an automated transport dolly 12 such as a movable pallet so that the body 1 is processed through the processing stations of the line shown in FIG. 1 while moving on the floor along the line. Furthermore, since the production line shown in FIG. 1 is arranged to be a final assembly line, an OBJ or automobile body coming out through the line shown in FIG. 1 is self-movable. Thus, an automobile body 1 completed with the processing in the line shown in FIG. 1 is a completed car after being dismounted from the automated transport dolly or pallet 12.

Figure 2:
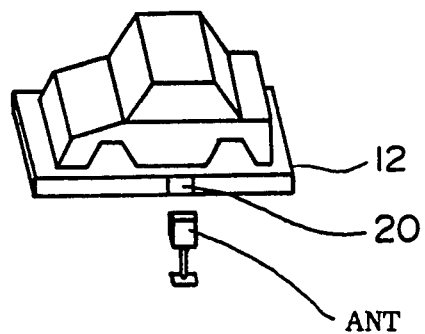
FIG. 2 is a perspective view of an automated transport dolly to be adapted in the production line of FIG. 1.

As shown in FIG. 2, an ID plate 20 is disposed in a central area on a side of the automated transport dolly 12. Various pieces of information are written in the ID plate 20 by microwaves emitted from an antenna (ANT). The information written in the ID plate 20 can also be read via an ANT. The ANT functions as an information writer or a reader. Thus, it should be noted that an antenna ANT may be referred to as a reader, a writer, or a read-writer, when performing reading functions, writing functions, or both reading and writing functions, respectively, in the description below.

As shown in FIG. 1, the last processing station 9 is equipped with an erasing unit 16 for erasing information from the ID plate 20 on the automated transport dolly 12 which is to be later brought again into the input area 15. The erasing unit 16 comprises an antenna (ANT) as an erasing signal writer and as an erasing signal generating circuit. The erasing unit 16 erases the body information written in the ID plate on the dolly 12, without contact, by transmitting the erasing signal to the ID plate 20 (FIG. 2).

Information to be written in the ID plate 20 will be explained next.

The ID plate 20 stores certain body information for identifying products to be produced, as follows:

(1) Entry Number with date code: information indicating the Entry Number and the date when the body entered the line;
(2) Model: car model name of the body, and information indicating characteristics thereof, such as 4-door or 2-door model;
(3) Destination: information indicating the country and climate (such as a cold climate) for which the car is destined;
(4) Option code: information indicating optional equipment or parts to be installed, such as a car stereo, if any;
(5) Frame number: information indicating the identification number attached to the car frame; and
(6) Color Designation Code: information for a code indicating the exterior color and interior color of the car.

The body information described above is supplied to a model collation terminal 31 (FIG. 3), and is converted to an operation factor code. An operation factor code is a code that can directly determine the operation for an APU 11 to conduct. In this embodiment, the model collation terminal 31 has a conversion table 31a which stores the relationship between the body information and the operation factor code, and generates the above described operation factor code by referring to the conversion table 31a. The model collation terminal 31 further has a binary file 31b, and generates a binary code by compressing the operation factor code based on the binary file 31b. This procedure is followed because the number of bits necessary for representing the operation factor code becomes so large that it cannot be handled efficiently, if it is handled as is. An example for such compression of a code is shown below; (a) and (b) denote before and after the compression procedure, respectively:

| (a) | 0011 0001 | 0011 0000 | 0011 0000 | 0011 0000 |
|---|---|---|---|---|
| (b) | 1 | 0 | 0 | 0 |

Thus, in this example, the number of bits necessary to be stored is decreased to one eighth of the original number of bits by compressing the original number of 8×4 bits required for the operation factor code to a binary code of 4 bits.

The model collation terminal 31 combines the operation factor code and the body information, together as a set, into write information, and writes this write information in the ID plate 20 via the ANT. This combined write information will hereinafter be referred to as ID information. This writing operation is performed at the beginning of the production process. In this embodiment, the entire production process comprises a plurality of separate processes, in which the production line shown in FIG. 1 constitutes only one such process. Subsequently, when a body moves from one process to the next process, the corresponding ID information is also transferred to the next process. This transfer of ID information between processes is possible because the ID plates 20, which are attached to the automated transport dollies or pallets 12, circulate through the line together with the dollies 12; subsequently, in order for the subject ID information to be preserved in correspondence with the subject body, the ID information must be transferred to the next line or process whenever the subject body 1 is transferred to the next line or process.

Figure 5:
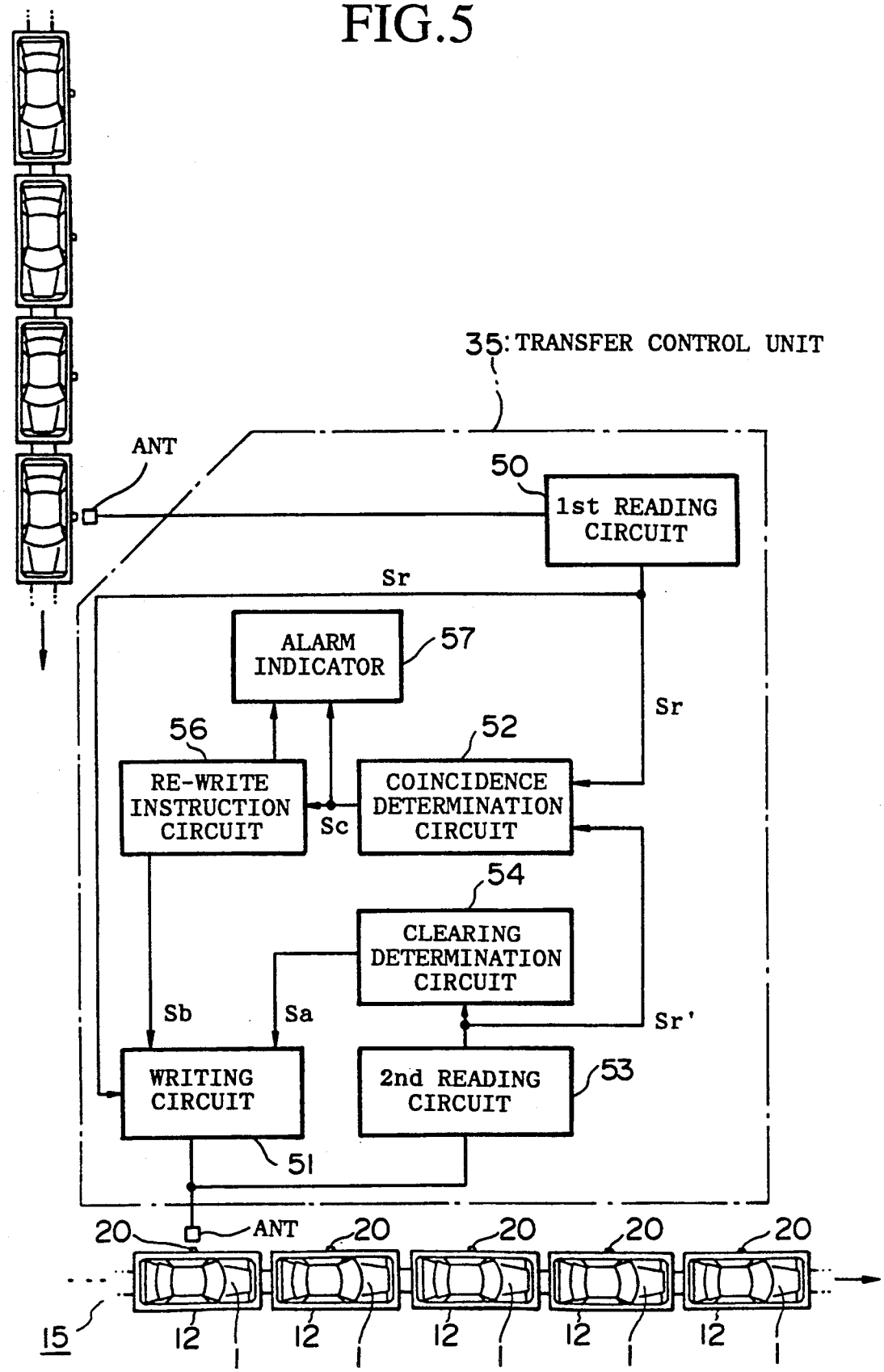
FIG. 5 is a schematic block diagram showing the detailed configuration of the data transfer control unit, according to the first embodiment of the present invention.

For example, at the input area 15 of the process or line shown in FIG. 1, the ID information at the end of the preceding line or process is transferred to the ID plate located in the input area 15 by a transfer control unit 35 shown in FIGS. 3 and 5. A sequence of this transfer processing will be discussed below.

First, the transfer control unit 35 reads information in ID plate 20 at the end of the preceding line or process via the antenna ANT. Simultaneously with the transfer of the body 1 onto an automated transport dolly 12 in the input area 15 of the line shown in FIG. 1, the transfer control unit 35 writes the ID information in the ID plate 20 disposed on the automated transport dolly 12 onto which the body 1 is to be transferred, in the input area 15 on the line in FIG. 1. Thus, the ID information always moves together with the body 1.

Second, each working unit is equipped with an ANT in the vicinity thereof and reads the ID information of an incoming body 1 via the ANT. In reading the information, the APU 11 is arranged to read not all the ID information stored in the ID plate 20, but only that portion of the ID information necessary for that APU 11, or information for specifying the operation of that particular APU. That is, while the model collation terminal 31 generates and writes in the ID plate 20 any and all binary codes necessary to the respective APUs, each APU reads only a portion of the ID information necessary to the working unit 11, or specific bits of information related to the operation of the particular working unit. More specifically, in a processing for attaching a windshield, for example, only a portion of the ID information necessary for windshield attachment is read.

As shown in FIG. 3, multiple panels 40, each corresponding to a respective plurality of APUs 11, receive data supplied by the corresponding plurality of APUs 11, and transmit to and receive from the model collation terminal 31 data for production control. In the present embodiment, the APU is arranged to be capable of detecting the time required for working, and outputs the detected data to the multiple panel 40. The multiple panel 40 transfers the detected data to an office terminal 45 via a data managing unit (data manager) 42. The office terminal 45 indicates the detected data on an indicator (not shown), enabling the monitoring of the operation times. The multiple panel indicates the operation time as well as other information, such as the contents of ID information read on a specified indicator.

Furthermore, in the present embodiment, a data communication network is constructed between the model collation terminal 31 and the data managers 42 in the form of a Local Area Network (LAN). The network will be described below with reference to FIG. 3.

Connected to the network are terminals including a collation backup terminal 43, a file managing unit (file manager) 44, and an office terminal 45, in addition to the terminals described above. The collation backup terminal 43 has structures and functions identical to the model collation terminal 31, and conducts similar data communication with the host computer 30, with each terminal connected to the network. This is arranged so that the collation backup terminal 43 is enabled to immediately take over for the model collation terminal 31 in the case where the model collation terminal 31 breaks down for any reason.

The file manager 44 reads and files various pieces of information flowing through the network, e.g., the facility operating status information, and periodically monitors whether each terminal is operating normally. The office terminal 45 divides the entire line into several blocks and monitors the operating status of each block. The office terminal 45 also generates the start and stop instruction for the line. The periodic monitoring by the office terminal 45 of the operating status of each block includes, for example, indicating the line layout on the CRT displays, and showing the operating status of each block by color to facilitate the distinguishing of the automated operation status, the manual operation status, or the termination status. In this case, since the APU 11 can recognize its own operating status, the APU 11 transfers the information indicating its own operating status to the file manager 44 via the multiple panel 40 and the data manager 42, and the file manager 44 performs the above-described indication classified by color based on the information.

The file manager 44 and the office terminal 45 have similar functions to the data manager 42, and are substituted for the data manager 42 in the case where the data manager 42 breaks down. During normal operations, however, such terminals are arranged to extract and take in only the information necessary to their own operation of respective terminals.

It is noted that when the corresponding automated transport dolly 12 is empty, i.e., the object to be processed (OBJ) has been dismounted from the automated transport dolly 12 for any reason, such as detected defects data indicating that the OBJ has been dismounted is written in the ID plate of the corresponding automated transport dolly 12, or the operation factor code Cn (FIG. 4) for the corresponding automated transport dolly 12 is erased by a writer operated by a line worker.

Furthermore, the working unit 11 as described above is arranged to respectively output data with respect to the its own operating status. The output data is supplied to the multiple panel 40 disposed to correspond to a plurality of APUs 11. Then, the various pieces of information on the operating status of the respective APU, such that the nth body (or car) is completed with all the processing, or the information, e.g., the time required for the processing for that body (or car), is collected by the multiple panel 40 and is supplied to the model collation terminal 31 and then to the data manager 42.

In addition, the data manager 42, the file manager 44, and the office terminal 45 are arranged to respectively store each set of respective entry numbers and the corresponding ID information so that if the information on ID plate 20 is lost for any reason, the lost information can be restored in accordance with the respective stored information.

The restoring process is conducted as described below. If the ID information on the ID plate 20 attached to an automated transport dolly 12 has been lost, the worker first examines the entry number of the ID plate 20 attached to the automated transport dolly immediately preceding or following the subject automated transport dolly 12. The worker may examine the entry number as read by the APU 11 since the entry number is read by the APU 11. The worker can find the entry number of the information lost from the ID plate by knowing the entry number of the ID plate 20 attached to the automated transport dolly immediately preceding or following the subject automated transport dolly 12 since the entry numbers are arranged serially. The worker then enters the subject entry number through a keyboard (not shown) attached to the APU 11 or the multiple panel 40. The entered entry number is supplied to the data manager 42, which in turn sorts the ID information corresponding to the subject entry number so entered and transfers the sorted ID information to the multiple panel 40 or the APU 11. Upon receiving the transferred ID information, the multiple panel 40 or the APU 11 indicates the contents of the ID information on the display. The worker is then able to know what the lost information was by observing the indication on the display and can then enter the information in a portable writing machine (not shown). The ID information is then written on the corresponding ID plate 20 via the portable writing machine. Thus, the lost ID information is restored as described above. In order to store on the subject ID plate 20 the ID information for bodies mounted on a plurality of automated transport dollies 12 following the subject body 1 on the subject automated transport dolly 12, the data manager 42 has only to transmit the ID information for the plurality of bodies following the subject body 1. Thus, when the ID information for the plurality of bodies following the subject body are arranged to be stored in the subject single ID plate, the necessary processing for the subject working unit 11 to process the following bodies with are known to the subject working unit 11 in advance result in the early and timely preparation therefor being possible.

Figure 4:
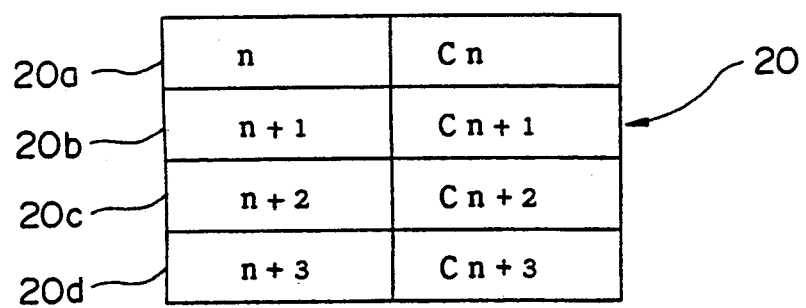
FIG. 4 is a memory map for an ID plate used in the first embodiment of the present invention.

Furthermore, for storing the ID information for a plurality of bodies in a single ID plate 20, the storage area of the ID plate 20 is constituted as shown in FIG. 4 and explained hereafter. That is, the storage area of the ID plate 20, in this embodiment, comprises storage regions 20a to 20d which electrically store (1) the reference number "n" for the subject body, or car 1, mounted as an OBJ, on the subject automated transport dolly 12 to which the subject ID plate is attached, and (2) the operation factor code (Cn) for the subject body having reference number "n", and the operation factor codes (Cn+1 to Cn+i) for the bodies following the subject body, respectively having reference numbers "n+1" to "n+i" (i=3, in this embodiment), where the operation factor codes respectively indicate the contents of the processing to be conducted in the corresponding processes.

In the case where the ID information stored in the data manager 42 is destroyed or lost for any reason, the destroyed ID information may be restored by utilizing the ID information stored in the file manager 44 and/or the office terminal 45.

Next, a specific configuration for the transfer control unit 35 disposed in the LAN described above will be discussed with reference to FIG. 5.

Shown in FIG. 5 is a first reading circuit 50 for reading the ID information at the end of a preceding production line via an ANT. The read signal Sr from the first reading circuit 50 is supplied to a writing circuit 51 and a coincidence discrimination circuit 52. The writing circuit 51 writes the ID information identical to the contents of the read signal Sr in the ID plate 20 attached to the automated transport dolly 12 in the input area 15. The writing operation of the ID information in the ID plate 20 by the writing circuit 51, is conducted synchronously with the mounting operation of the body 1 onto the automated transport dolly 12, as described above. The writing circuit 51 is disabled for writing operation when a signal Sa is supplied thereto, and is enabled and rewrites ID information when a signal Sb is supplied thereto. Also shown in FIG. 5 is a second reading circuit 53 for reading from the ID plate 20 both the ID information written by the writing circuit 51, and the contents of the ID plate 20 before the writing circuit 51 conducts writing. The read signal Sr' from the second reading circuit 53 is supplied to a cleared discrimination circuit 54 and the coincidence discrimination circuit 52. The cleared discrimination circuit 54 discriminates whether the contents of the read signal Sr' shows the cleared state or not. If the signal Sr' does not show the cleared state, or shows that any information is stored, the cleared discrimination circuit 54 outputs the signal Sa to the writing circuit 51. The coincidence discrimination circuit 52 discriminates the coincidence between the signals Sr and Sr', or between the information to be written and the information obtained from the ID plate 20 after the writing operation, and if these are not coincident, outputs a signal Sc to a rewrite instruction circuit 56. The rewrite instruction circuit 56 outputs the signal Sb to the writing circuit 51 when the signal Sc is supplied thereto. The rewrite instruction circuit 56 is equipped with a counter, and stops outputting the signal Sb after the signal Sc is output a predetermined number of times (three times, in this embodiment). The counter is arranged to clear and reset the count to 0 (zero) whenever the writing operations for one body are completed. Also shown in FIG. 5 is an alarm indicator 57 for indicating an abnormality in the case where the count is "3" at the counter of the rewrite instruction circuit 56, and the signal Sc is output from the coincidence determination circuit 52. The alarm indicator 57 comprises a CRT display, for example. The alarm indicator 57 may be equipped with a sound generating apparatus instead of a visual alarm device.

Next, the operations for the processing of information compression and information conversion will be described.

Body Information Arranging Processing

Referring to FIG. 3, the host computer 30 outputs the body information in succession in accordance with the production plan. The body information is converted to the operation factor codes based on the conversion table at the model collation terminal 31. The operation factor codes are written in the ID plate 20 of the corresponding body 1 positioned at the input area 15 at the entrance of a production line. Each APU reads the processing information from the ID plate 20 and automatically processes bodies 1 with processing in accordance with the information read from the ID plate.

The operations described above will be explained according to a specific example. In the case of the APUs 11 of the process station 2 shown in FIG. 1, each of the APUs 11 reads the operation factor code for the incoming body 1 from the ID plate 20 via an ANT, and processes the body 1 with the specified processing. The operations at the other process stations 3 to 9 are similar to the operations at the process station 2.

In this example, since the operation factor codes are generated corresponding to the respective car models, each APU 11 can process the bodies 1 with the processing according to each body 1 even in the case where a series of bodies 1 for different car models are mixed on the same production line. Furthermore, since the operation factor codes are arranged to specify only the basic operations for respective APUs 11, various kinds of operations may be specified by properly changing the combination of the basic operation factor codes, whereby a very high freedom of operation selectivity for the APUs can be obtained.

Therefore, even in the case where changes on a large scale occur in car models, for example, the operation factor codes corresponding to the contents of the changes can be generated by rearranging the conversion table in the model collation terminal 31, whereby each APU 11 is enabled to readily cope with the changes. It is noted that if each APU 11 is arranged so that respective operations of the APU 11 are determined based on the operation factor codes, the process of converting the operation factor codes to the binary codes at the model collation terminal 31 may be eliminated.

Information Transfer

The processings of the body 1 are carried out based on the information written by the information compression processing described above. As the body 1 moves through the final processing station 9 of the production line, the automated transport dolly 12, on which the body 1 is mounted, is cleared by the erasing unit 16 of the information stored in the ID plate 20 disposed on the automated transport dolly 12. The automated transport dolly 12 is then returned to the input area 15.

The operation of information transfer in the input area 15 will be described in detail referring to FIG. 5.

First, the second reading circuit 53 reads the ID plate of the automated transport dolly 12 in the input area 15. If the ID plate 20 is cleared of information, the cleared discrimination circuit 54 does not output the signal Sa. Subsequently, the writing circuit 51 writes the ID information in the ID plate 20, in accordance with the read signal Sr from the first reading circuit 50. When this writing is done, the second writing circuit 53 reads the ID plate 20 again. The signal Sr' read by the second reading circuit is supplied to the coincidence determination circuit 52. The coincidence discrimination circuit 52 then determines whether the read signals Sr and Sr' coincide. If the two signals coincide, the writing process ends, and the automated transport dolly 12 in the input area 15 moves to the next process. If the two signals do not coincide, the coincidence discrimination circuit 52 outputs the signal Sc. In accordance with the signal Sc, the rewrite instruction circuit 56 outputs the signal Sb. In accordance with the signal Sb, the writing circuit 51 rewrites, or writes again, the ID information in the ID plate 20. The sequence of the operation above is repeated until the coincidence discrimination circuit 52 detects coincidence. It is noted that in the case where the rewriting is repeated for a predetermined number of times, the signal Sb will not be output thereafter, and the rewriting will not be conducted any longer. In addition, in the case where the coincidence is not obtained when the rewriting is conducted for a predetermined number of times, the alarm indicator 57 indicates a sign of abnormality, and calls the worker's attention to the problem.

In the case where the body 1 is returned from a location in the same production line to the input area 15, the operation will be conducted as follows. The ID plate 20 of the automated transport dolly 12, on which the returned body 1 is mounted, stores the ID information of the returned body 1. Then, in the course of writing process in the input area 15, the signal Sr' read by the second reading circuit 53 corresponds to the ID information of the returned body 1, as described above. Subsequently, the cleared discrimination circuit 54 outputs the signal Sa, which disables the writing circuit 51. Thus, the data to be preserved is prevented from being erased. In this case, the body 1 transferred from the preceding production line may be mounted on another automated transport dolly 12 having a cleared ID plate.

Figure 6:
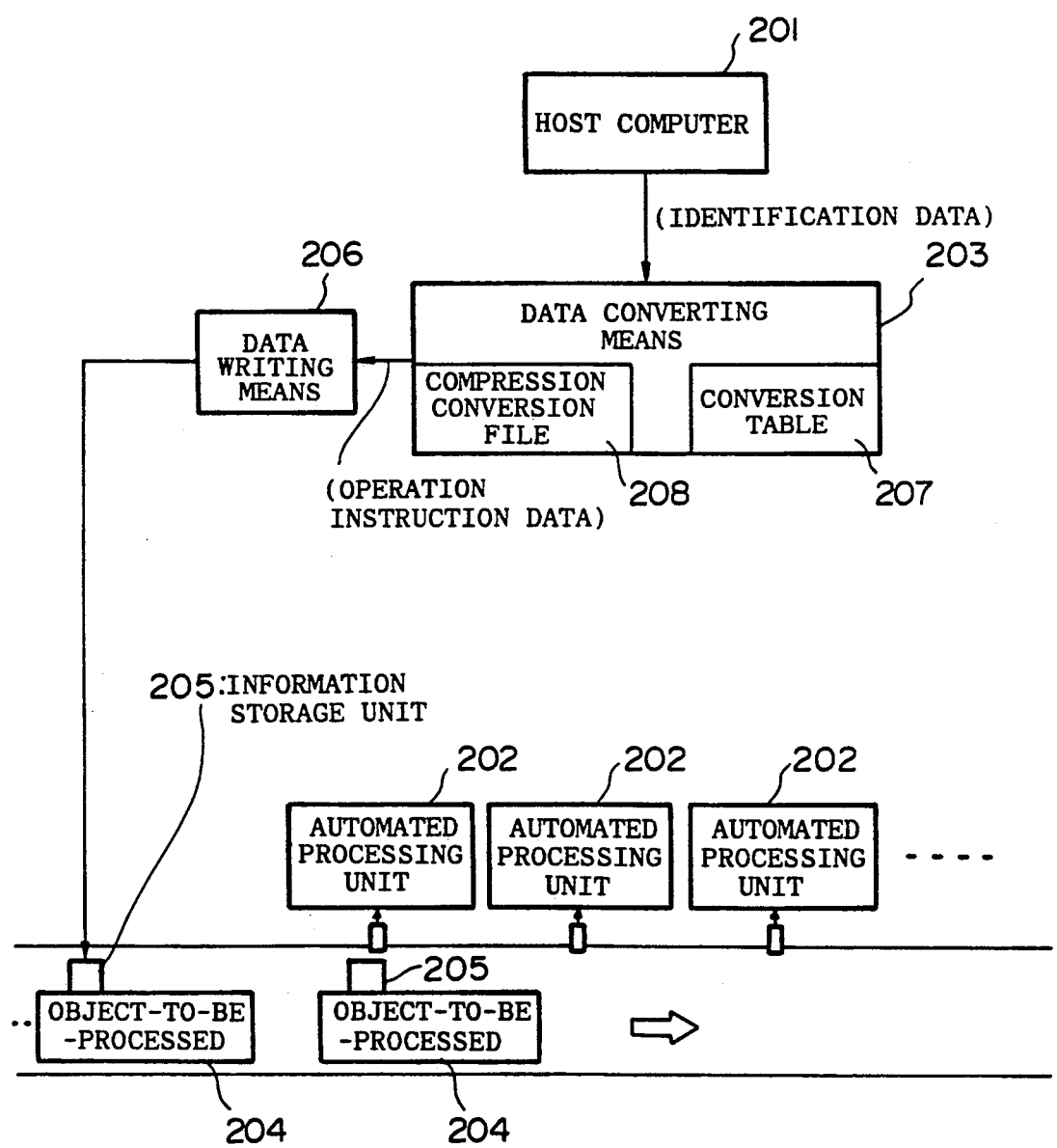
FIG. 6 is a schematic block diagram showing components necessary for the data compression conversion processing conducted in the first embodiment, according to functions.

Next, the essential elements for the information arranging processing in the production control system described above will be described in accordance with the respective functions with reference to FIG. 6.

The host computer 201 outputs the identification data for identifying the products. A plurality of automated processing units (APUs) 202 are disposed at predetermined locations along the production line, and conduct processing in accordance with the operation instruction data. Data converter 203 has text files which store the relationships between the operation instruction data and the identification data. The data converter 203 generates the operation instruction data from the identification data by referring to the text files. The information storage mediums 205 are respectively disposed on a plurality of objects to be processed (OBJs) 204, or automated transporter, on which the OBJs are mounted, moving along the production line. Data writer 206 writes the operation instruction data generated by the data converter 203 in the information storage mediums 205 of OBJs corresponding to the operation instruction data. The APUs 202 respectively conduct processing in accordance with the operation instruction data.

In the arrangement described above, operations will be conducted as follows.

The host computer 201 outputs the identification data, which is converted to the operation instruction data and ID information by the data converter. The operation instruction data is written in the information units 205 of the OBJs 204 corresponding to the data by the data writer 206. The APUs 202 respectively conduct processing in accordance with the operation instruction data.

The data converter 203 is provided with the data conversion table 207, or with text files, which store the relationships between the operation instruction data and the identification data. The operation instruction data is generated by referring to the conversion table 207. The data to be stored in the information storage mediums 205 may be compressed by utilizing the compression conversion table, or file, 208 provided in the data converter 203.

The functions performed by the transfer control unit for the information transfer and deletion processing will be discussed with reference to FIGS. 7 and 8.

Figure 7:
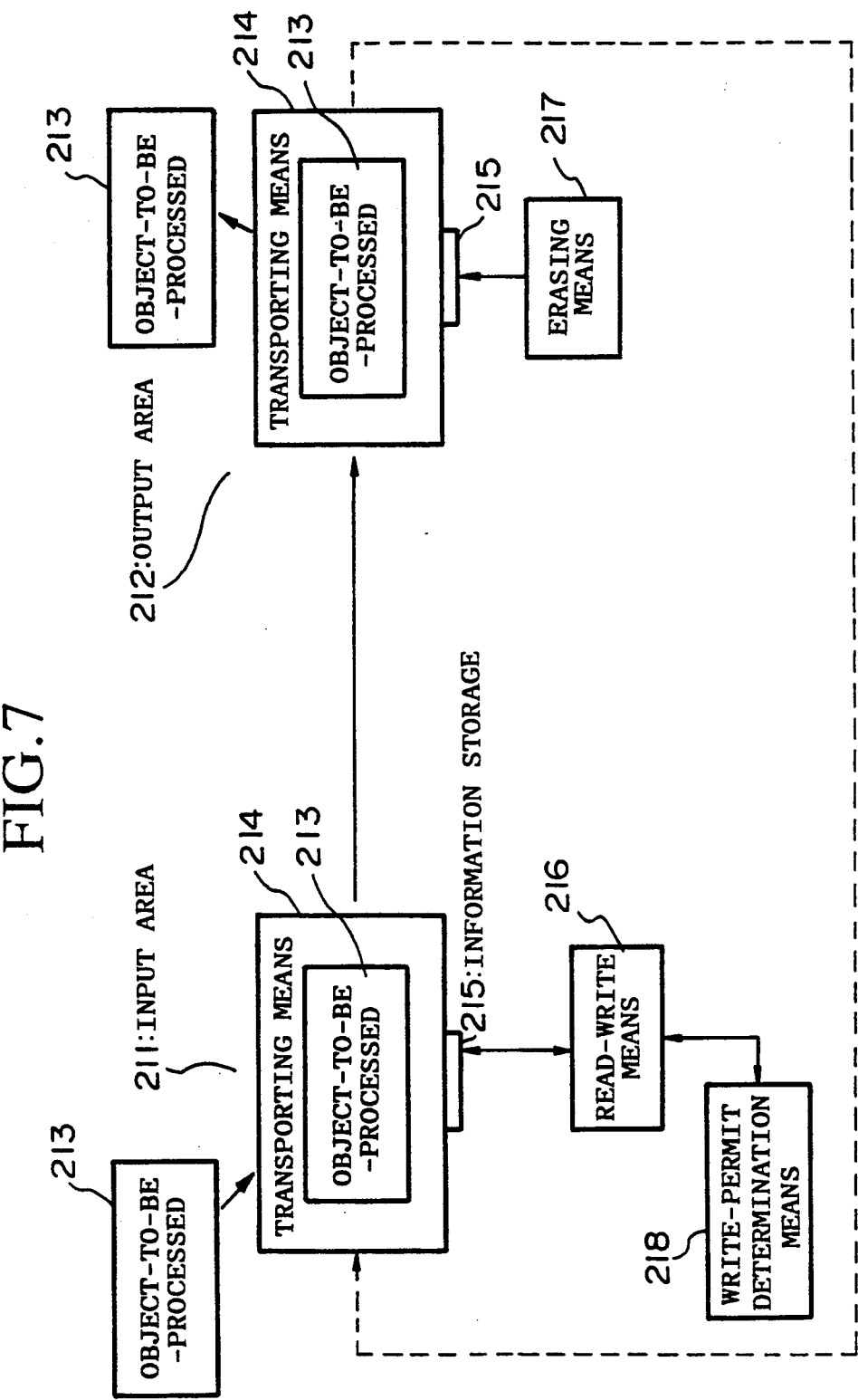
FIG. 7 is a schematic block diagram showing components necessary for the data transfer processing conducted in the first embodiment, according to functions.

In FIG. 7, transporter 214 transports an object to be processed (OBJ) 213 from the input area 15 to the output area 212. After the OBJ is output, the transporter 214 moves back to the input area 211, thus, circulating along the production line. An information storage medium 215 is disposed on the transporter 214. Read-writer 216 reads the storage contents of the information storage medium 215 in the input area 211, and writes information about the OBJ 213 in the information storage medium 215. Eraser 217 clears the contents of the information storage medium 215 attached to the transporter 214 moving to the output area 212. Write-permit determinator 218 determines whether the contents of the information storage medium 215 is cleared, from the result of reading by the read-writer 216. Thereby, the write-permit determinator enables for writing by the read-writer 216 if the contents of the information storage medium is cleared, and disables for writing by the read-writer 216 if the contents of the information storage medium is not cleared.

Figure 8:
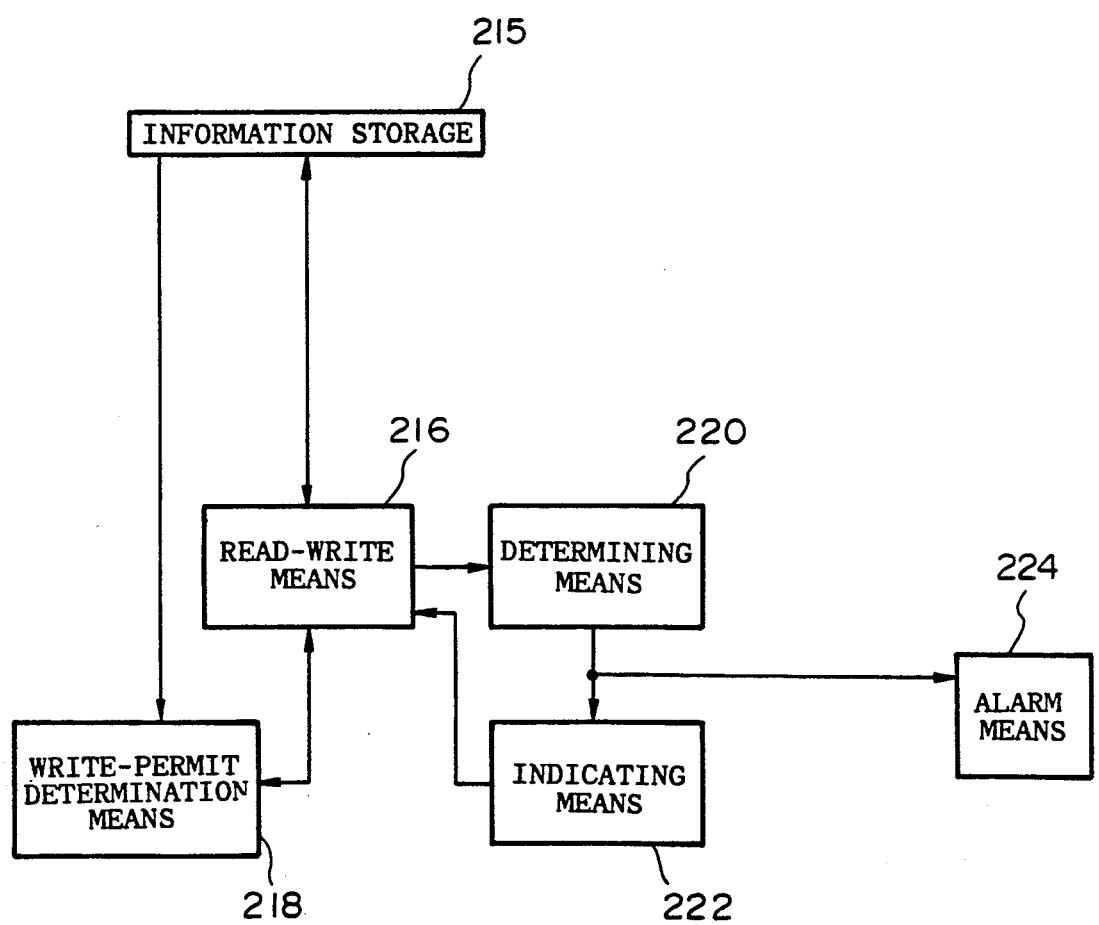
FIG. 8 is a schematic block diagram showing components necessary for controlling the rewriting in the data transfer processing conducted in the first embodiment, according to functions.

In FIG. 8, in addition to the arrangement shown in FIG. 7, determiner 220 and alarm 224 are provided. The determiner 220 instructs the read-writer 216 to rewrite after the original writing, and determines whether the result of this reading coincides with the information to be written. The rewrite instructor 222 instructs the read-writer 216 to rewrite the information if the determiner determines that the coincidence does not exist. The alarm 224 indicates alarm in the case where the coincidence is not detected after the rewriting is conducted for a predetermined number of times In the embodiment shown in FIG. 1 to 8, in the case where the data about a plurality of objects to be processed (OBJs) are stored in the ID plate 20, each automated processing unit (APU) applies processing to the OBJs in accordance with such data. The functions for processing by utilizing the data about a plurality of OBJs will be analyzed, referring to FIG. 9.

Figure 9:
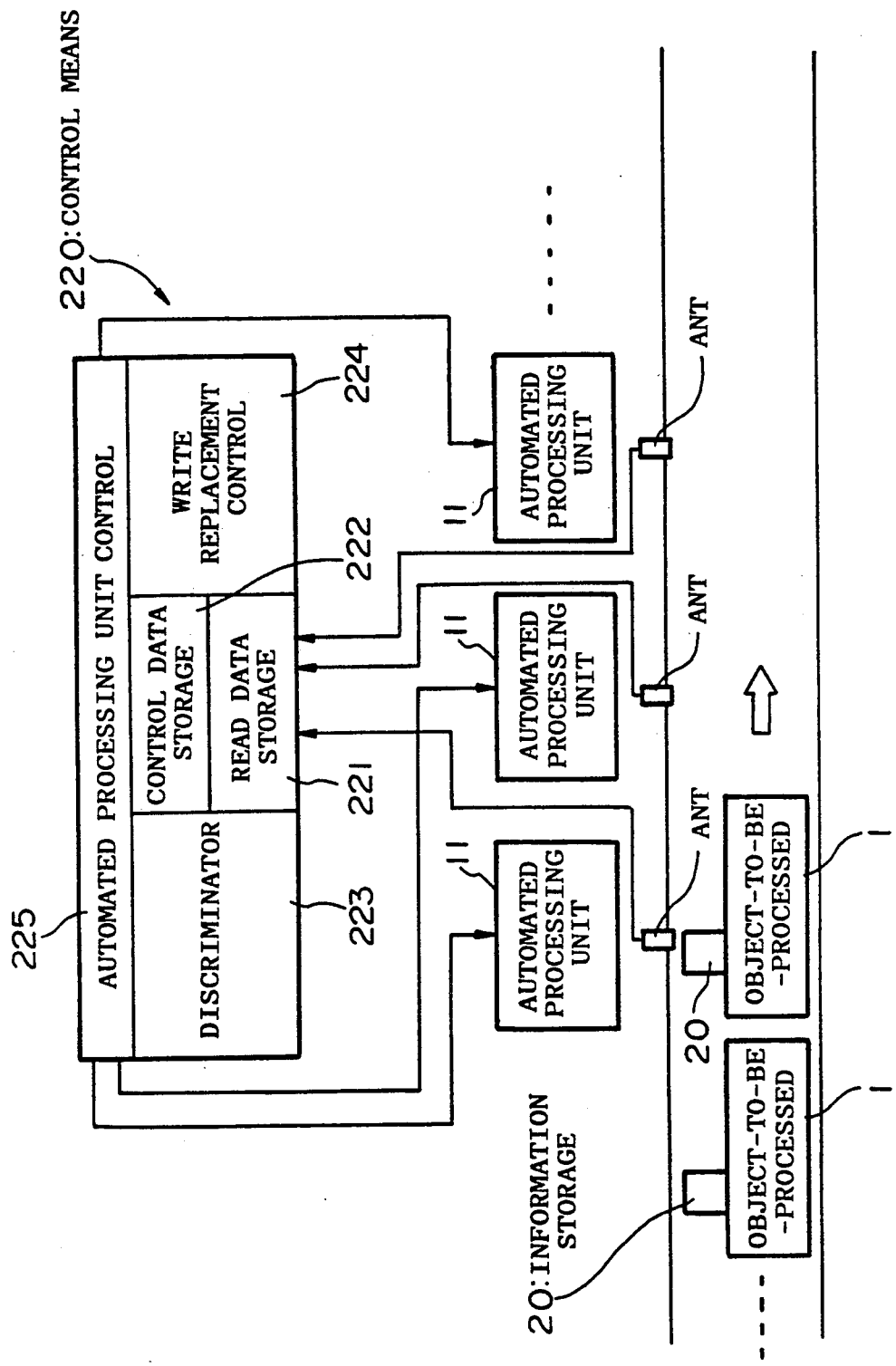
FIG. 9 is a schematic block diagram showing components necessary for the conversion processing of data for a plurality of OBJs conducted in the first embodiment, according to functions.

In FIG. 9, information storage mediums, or ID plate 20, are respectively disposed on and moving together with a plurality of OBJs 1 flowing along the production line. The information storage mediums store the contents of processing to be applied to the OBJs. Reader, or antenna (ANT), reads information from the information storage medium 20 of one OBJ existing at a predetermined location on the production line. A controller, or control unit, 220, controls the APUs 11 in accordance with the information read by reader so that the APUs process the one OBJ with predetermined processing. The information storage medium 20 comprises a plurality of storage regions for respectively storing information about the one OBJ, and information about other OBJs located between a predetermined range of distance upstream from the one OBJ, along the production line.

The control unit 220 comprises: a read data storage unit 221 which has a plurality of storage regions for respectively storing the information about a plurality of OBJs, read by the reader ANT; a control data storage unit 222 which has a plurality of storage regions for respectively storing the processing information, or data, about a plurality of OBJs, with which the APUs are to process the OBJs; a discriminator, or discriminator, 223 which discriminates whether at least a part of respective information stored in the read data storage unit 221 coincides with information stored in the control data storage unit 222; a write replacement control unit 224 which replaces the information stored in the control data storage unit 222 with the information stored in the read data storage unit 221 only when the coincidence above is discriminated by the discriminating unit 223; and an APU control unit 225 which controls the APUs in accordance with the control data read from the control data storage unit 222.

In the arrangement described above, since the information about OBJs located on the upstream side of one OBJ is stored in the information storage medium 20 disposed on the one OBJ, the processing preparation can be started based on the information about the OBJs, before one of the upstream OBJs arrives at a predetermined process and the identification data of the one upstream OBJ is read. Also, the coincidence of the data in the read data storage unit and the data in the control data storage unit is determined by the determining unit 223, and the data write replacement is conducted by the write replacement control unit, if the coincidence exists. Therefore, the data is replaced only when the OBJ is brought in, in a predetermined order. Then, processing of the corresponding OBJ starts.

Figure 10:
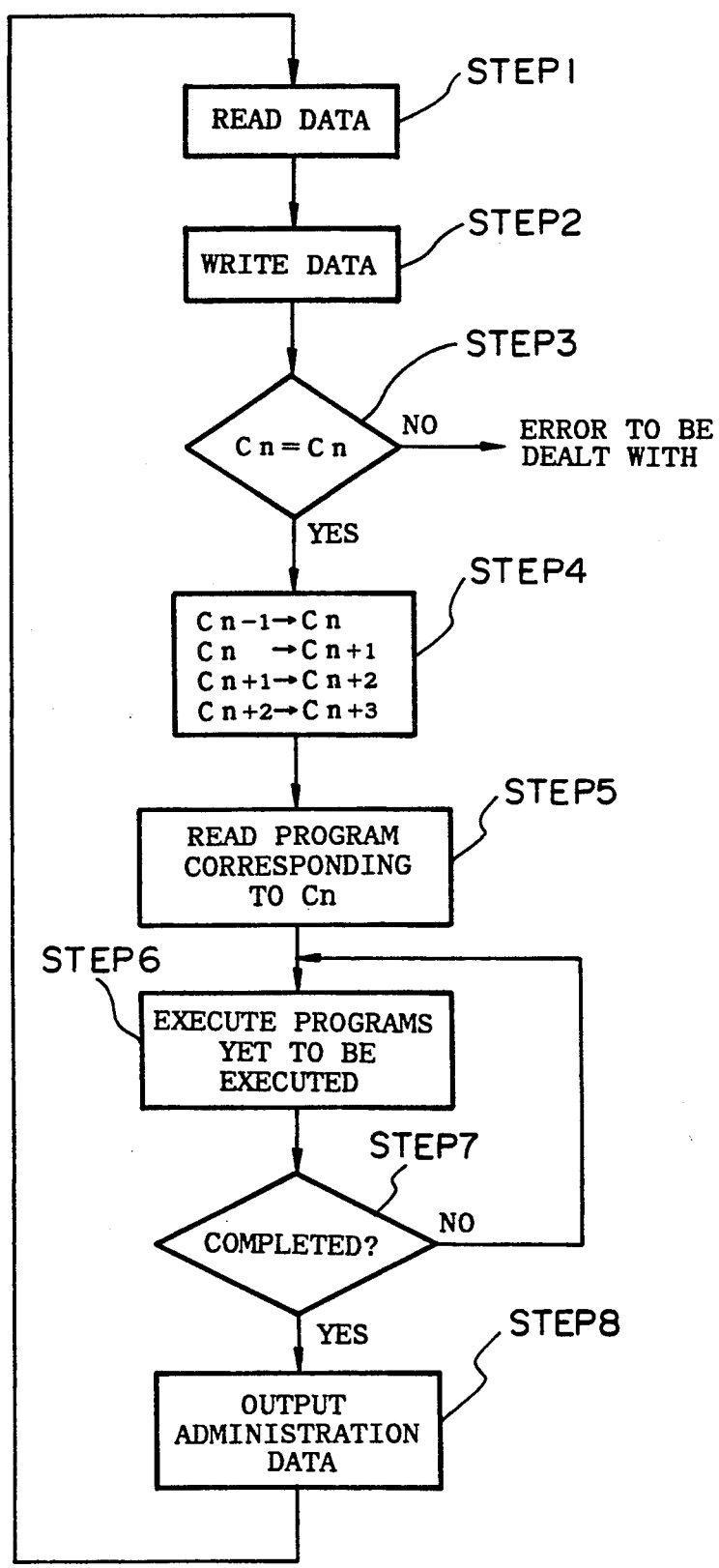
FIG. 10 is a flow chart for the data conversion processing for the data of a plurality of cars conducted in the first embodiment.

An example for the process followed for applying necessary processing to a plurality of OBJs in accordance with the information about the plurality of OBJs, stored in the information storage mediums 20, will be described, in accordance with a flow chart shown in FIG. 10.

Step 1

The reader ANT reads respective data about the nth OBJ to the (n+3)th OBJ, stored in the ID plate 20 disposed on an automated transport dolly 12 on which the nth car body is mounted.

Step 2

As shown in FIG. 11, the read data Cn to Cn+1 (i=3) is respectively written in storage regions 221a to 221d of the data storage unit 221.

Step 3

The process compares the operation factor data Cn stored in the storage region 222b of the control data storage unit 222, shown in FIG. 12, with the operation factor data Cn stored in the storage region 221a of the read data storage unit 221, or compares the number data of the region 222b and of the region 221a with each other; only when they coincide, the process proceed to the next Step 4, and if they do not coincide, the process determines the state as an error, and stops the corresponding APU or the entire system related to this APU. At this step, the process may be arranged to proceed to the next step, only when all the coincidences exist between the storage region 222c and 221b, and between 222d and 221c, respectively, in addition to the coincidence between 222b and 221a.

Step 4

The process replaces the operation factor data Cn−1 to Cn+2 respectively stored in the storage region 222a to 222d of the control data storage unit 222, as shown in FIG. 12, with the operation factor data Cn to Cn+3 respectively stored in the storage region 221a of the read data storage unit 221, as shown in FIG. 11. The storage regions of the control data storage unit 222 after the replacement is shown in FIG. 13.

Step 5

The process reads the operation factor data Cn stored in the storage region 222a of the renewed control data storage unit 222, then reads the APU operation program corresponding to the operation factor data Cn from the work program storage unit (not shown), which is provided separately from the read data storage unit 221 and the control data storage unit 222.

Step 6

The process determines up to which step in the work program the program has been executed, and causes the APU 11 to perform the predetermined operation by running the portion of the program following the portion already executed.

Step 7

The process waits for the entire program to be completed, and when it is completed, proceeds to the next step.

Step 8

The process outputs and supplies to the multiple panel 40 the data showing the completion of the work, or administrative data, such as the work time data. The process then sends the currently processed OBJ to the next process or production line, and controls the transporter to receive the next OBJ 1 in this process or production line while waiting for the next OBJ to arrive.

Since the information about OBJs located on the upstream side of a particular OBJ is stored in the information storage medium 20 disposed on that particular OBJ, processing preparation can be started based on the information about the upstream OBJs prior to the arrival of the OBJs at a predetermined process, and the information stored in the information storage medium or ID plate 20 is read by the reader ANT. In addition, the coincidence of the data in the read data storage unit and the data in the control data storage unit is determined by the determining unit 223, and the data write replacement is conducted by the write replacement control unit 224, if the coincidence exists. Therefore, the data is replaced only when the OBJ arrives in a predetermined order. Processing of the corresponding OBJ is then initiated.

Through the steps as described above, the process ends one round of the operation, and returns to Step 1. Also, on condition that all the work program is completed at Step 6, while executing the remaining steps, or steps after the next Step 1, the process reads the operation factor code Cn+1 for the next round, stored in the storage region 222b of the control data storage unit 222. Referring to the work program for the next (n+1)th OBJ corresponding to the operation factor code Cn+1 for the next round which was just read, the process executes the operations which can be executed without the presence of the OBJ; these operations may include, for example, moving the robot arm from the end position of the processing operation according to the operation factor code Cn to the start position of the processing operation according to the operation factor code Cn+1, and supplying in advance the parts to be attached in the next processing operation. The process also may be arranged to read the work program corresponding to the OBJ following the next OBJ and supply the appropriate parts.

By executing the steps described above, a portion of the processing operation for the (n+1)th OBJ can be executed during the interval from the end of the processing of the nth OBJ to the start of the processing of the (n+1)th OBJ.

Figure 14:
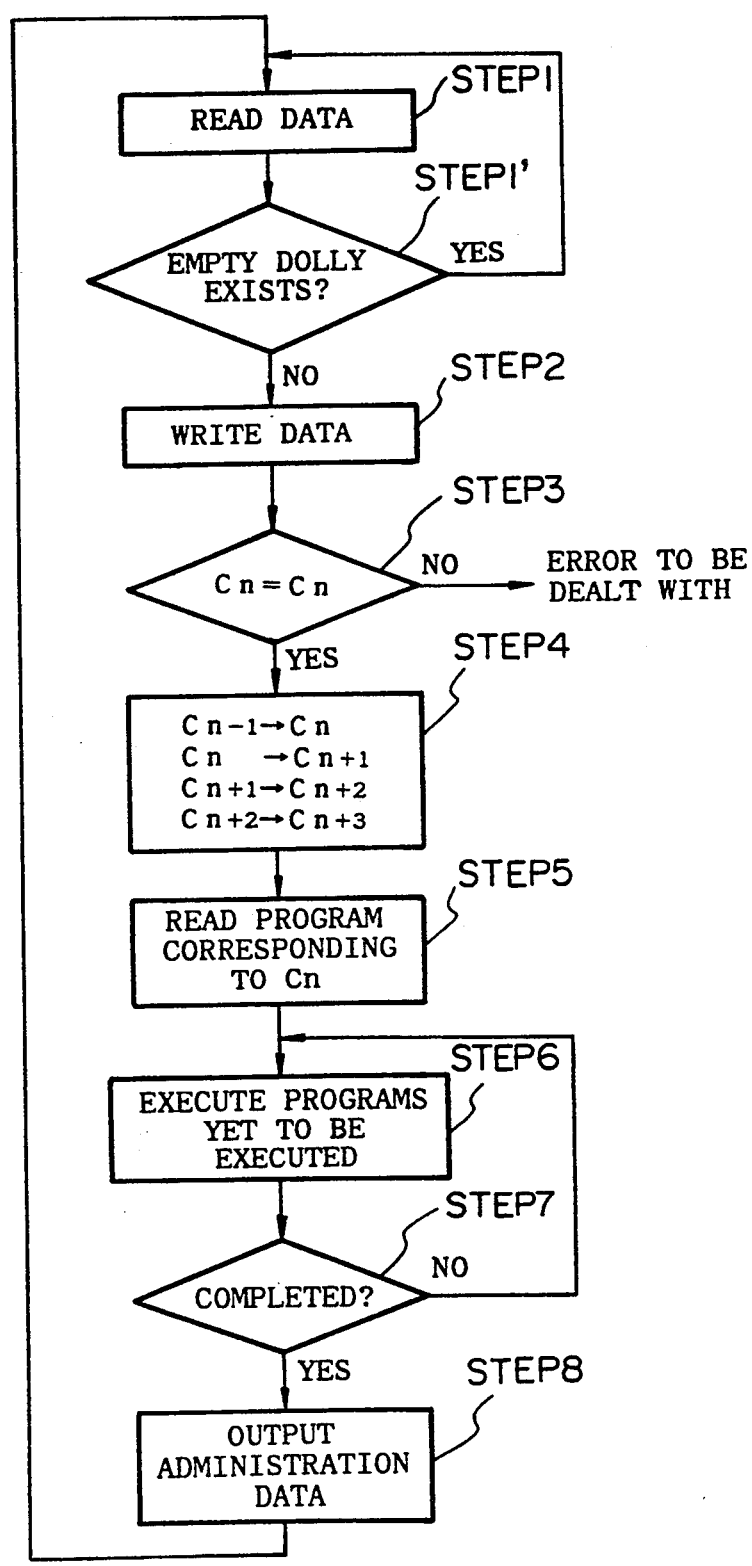
FIG. 14 is a flow chart for the data conversion processing having empty pallets conducted in the first embodiment.

In the production line described above, if an OBJ moving along the line is removed from the line for some reason, such as when processing defects are found, the automated transport dolly 12 without the mounted OBJ comes in. In order to automatically cope with this situation, as shown in FIG. 14, an additional Step 1' is required between Steps 1 and 2, as shown in FIG. 10, in which the process determines whether an empty transporter (or dolly or pallet, as the case may be) is present.

Step 1'

The process determines whether or not the automated transport dolly 12 which has arrived at a predetermined position is empty. The automated transport dolly 12 has attached an ID plate from which data is read. That the automated transport dolly 12 is empty is determined by the absence of the operation factor codes in the case where the operation factor codes of an empty automated transport dolly are erased; alternatively, a sensor may output a detection signal according to whether or not an OBJ is present on the automated transport dolly 12. If the automated transport dolly 12 is not empty, the process proceeds to Step 2. If the automated transport dolly 12 is empty, the process returns to Step 1 to wait for an automated transport dolly on which an OBJ is mounted to come in as the line proceeds.

Next, a description will follow on the data writing processing and the data correction processing for the empty automated transport dolly, which are required when an empty automated transport dolly exists.

Data writing processing

It is first determined whether an empty automated transport dolly 24 exists or not on the upstream side of the relevant APU. The positions of dollies to be considered in making this determination are those up to the ith one (i=3 on the upstream side in the embodiment) in accordance with the number (i+1 in the embodiment) of the data written into each ID plate for conducting processing. Whether an empty automated transport dolly 24 exists or not can be determined based on the visual confirmation of the worker controlling the production line, or by the detection data of the sensor monitoring the presence of an OBJ on the automated transport dolly 24. Furthermore, the communication of information indicating that an OBJ has been removed from the automated transport dolly 24 can also be used. In FIG. 15 to FIG. 20, P0 indicates the automated transport dolly located at the ith position on the downstream side of the empty automated transport dolly, and the P1-P4 indicate the numbers of the ID plates of the automated transport dollies following this dolly.

Figure 15:
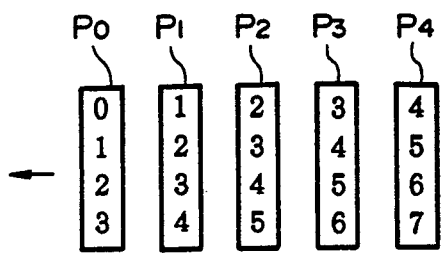
FIG. 15 is a schematic diagram showing a typical state of information written in, before taking the object to be processed (OBJ) out of the line, in the information storage medium, according to the first embodiment of the present invention.
Figure 16:
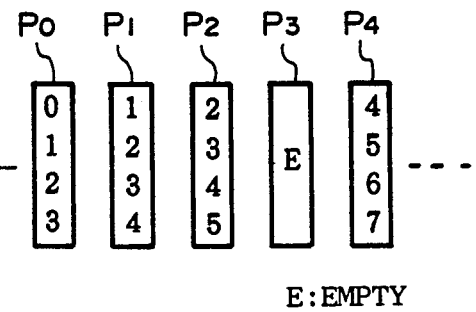
FIG. 16 is a schematic diagram showing a typical state of stored information before converting the data, in the information storage medium, according to the first embodiment of the present invention.

When the state shown in FIG. 15 changes to that shown in FIG. 16 due to the removal of the OBJ loaded on the automated transport dolly P3, it is determined that the dolly P3 is empty. If this occurs, the data of P0 to P2 stored on the ID plates of the automated transport dollies on the downstream side of this automated transport dolly are rewritten in the manners shown in FIG. 17 and FIG. 18 by the application of a portable data writing machine (not shown in the figures). That is to say, the data on the OBJs in the fourth to sixth positions from ID plates on the automated transport dollies upstream of P3 (empty automated transport dolly) are read, and this data is written into the fourth region of the automated transport dolly P0, the region further from the third position of the automated transport dolly P1, and the regions further from the second region of the automated transport dolly P2, respectively. To read the data for the OBJs on the upstream side of the empty automated transport dolly, a portable data reading unit (not shown in the figures) may be used.

Figure 17:
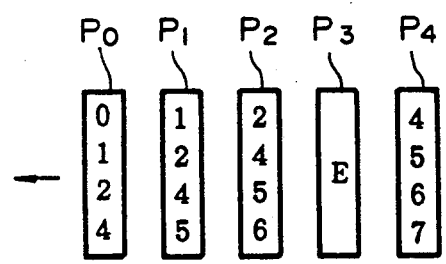
FIG. 17 is a schematic diagram showing a typical state of stored information after converting the data, in the information storage medium, according to the first embodiment of the present invention.
Figure 18:
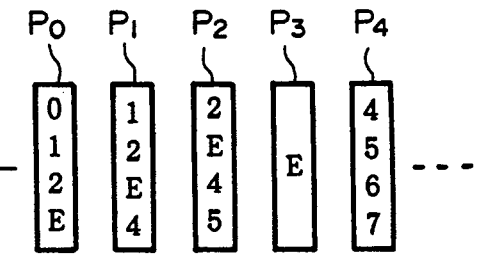
FIG. 18 is a schematic diagram showing a state of stored information after converting the data, with empty automated transport dollies, in the information storage medium, according to the first embodiment of the present invention.

After performing such correcting processing for the data of the empty automated transport dolly, processing based on the data read from each ID plate is carried out according to the flow chart shown in FIG. 14. More specifically, provide that the automated transport dolly 24 is not empty, data is read from the ID plate of the automated transport dolly which has reached a specified position; this data is then written into the read data storage unit 221, and is collated with the data stored in the control data storage unit 222; if the data coincide, the read data is rewritten into the control data, and processing based on the renewed control data is performed. Moreover, instead of the rearrangement (as shown in FIG. 17) of data due to the existence of an empty automated transport dolly as described above, the corresponding positions may be filled with the data "empty", as in shown in FIG. 18, with respect to each of the automated transport dollies, P0 to P2, on the upstream side of this empty automated transport dolly P3. In this case, this data "empty" can be treated the same as the usual operation factor code with Step 1' of FIG. 14 omitted. That is, the same processing can be applied irrespective of the existence of an automated transport dolly by allowing the control unit 220 to control and transport the next automated transport dolly without any processing in the case of "empty".

By using the data "empty", which represents an empty automated transport dolly as above, a new OBJ can be easily inserted into the production line utilizing the empty transport dolly. The insertion of a new OBJ is made possible by writing the operation factor code 3 onto each ID plate instead of "empty", and by exchanging "empty" for "3" written into the corresponding region of the control data storage unit 222 of the control unit 220.

Figure 19:
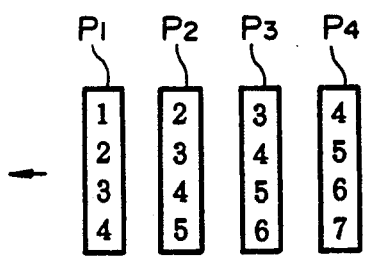
FIG. 19 is a schematic diagram showing a state of stored information, before converting the data, with a new OBJ brought in, in the information storage medium, according to the first embodiment of the present invention.
Figure 20:
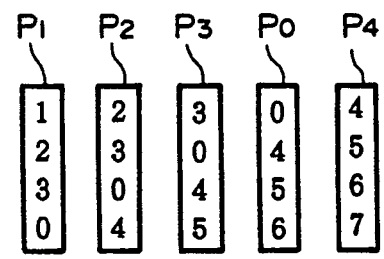
FIG. 20 is a schematic diagram showing a state of stored information, after converting the data, with a new OBJ brought in, in the information storage medium, according to the first embodiment of the present invention.

In addition, when a new OBJ is to be inserted between the third automated transport dolly, P3 and the fourth automated transport dolly, P4, in the production line where there is an empty automated transport dolly as shown in FIG. 19, using data zeroth (0th) concerning the new OBJ, the ID plate of the automated transport dolly P0 on which the OBJ is loaded is entered with the data ranging from the 0th to the following fourth (4th) to fifth (5th). This ID plate is inserted between the automated transport dollies P3 and P4, and furthermore, the data on the ID plates of the three automated transport dollies P1 to P3, on the downstream side are rewritten by a portable writer. In other words, in the ID plate of each automated transport dolly, the fourth (4th) is replaced with the zeroth (0th) data, and the data in the succeeding regions is replaced with the data downstream by one, respectively.

The above processing is carried out based on the insertion of an OBJ into the downstream side of the range (the ith position on the downstream side of the OBJ currently being processed) of the control data storage unit 222 of the APU where the operation factor data is stored. Therefore, such insertion does not necessitate the rewriting of data inside the control data storage unit 222 of the APU, but rather allows the rewriting of the data of three ID plates (a number one less than that of the data written in the ID plates) on the downstream side of the position of insertion.

Meanwhile, in the above embodiment, the write/reader of the data for the ID plate is arranged so that reading can be carried out using portable instruments. Needless to say, the above processing can be performed by the writing or reading unit installed on the production line on the upstream side of the work unit.

The constitution required in the information transfer processing accompanying the removals and insertions of the above OBJs are analyzed according to functions as follows:

In the case where the information is transferred accompanying removal or insertion, the constitution comprises a recording medium which is installed on each of several OBJs flowing on the production line and which move therewith unitarily,.and on which the contents of the processing to be applied to the OBJ are recorded; a reader reads information from the storage medium of one OBJ existing at a specified position of the production line; a data writer that writes information into the storage medium; a controller that controls the APU based on the information read into the reader and causes the APU to apply a prescribed processing to one OBJ; a determiner to determine whether an OBJ should be taken out from the production line; a storage medium that has many storage regions which separately store the information on the OBJ to which the medium is attached; and the information on the OBJs is located within a prescribed range upstream; the determiner determining whether an OBJ is to be removed from the production line on the ith position or from a point further upstream of the OBJ to be processed by the APU, and whether a new OBJ is to be introduced into the production line; a data writer for use when the removal of an OBJ is determined and rewriting of the storage medium of an OBJ is determined by the determiner, and rewriting the storage media of up to the ith OBJ on the downstream side of the removed OBJ with information on the neighboring respective upstream side, and when the drawing-up of a new OBJ is determined by the determiner, writing the information on the new OBJ into the storage region corresponding to the new OBJ in the storage medium of OBJs covering up to the nth one on the downstream side of the new OBJ, and also rewriting the information in the storage region corresponding to the OBJs on the upstream side of the new OBJ into the information on the OBJ neighboring the respective downstream side, the controller controlling the APU based on the information read from the storage medium on the condition that the information on the single OBJ previously read from the storage medium coincides with the information on the single OBJ read from the storage medium at this time; and when the processing information shows "empty" in the same manner as the identification data, a storage medium which is installed with each of several OBJs flowing on the production line and moves together therewith, and on which the content of the processing to be applied to the OBJ; a reader reads information from a single OBJ existing at a specific position on the production line; a data writer writes information into the storage; a controller controls an APU based on the information read by the reader to apply a prescribed processing to the single OBJ; a determiner to determine whether an OBJ is removed from the production line; the storage medium being provided with many storage regions that store the information on the OBJ on which the medium is mounted and the information on the OBJs positioning in a prescribed region on the upstream side of the medium, the determiner that determines whether an OBJ is removed from the production line on the upstream side by more than one from the OBJ to be processed by the APU, and whether a new OBJ is inputted into the production line; the data writer, when the determiner determines the extraction of an OBJ, storing the information that no OBJ exists in the region which the information on the single OBJ is to be in the storage medium of the single OBJ and the storage medium installed on the OBJs covering ith one on the downstream side of this OBJ and, when the determiner determines the insertion of an OBJ, rewriting the information indicating that no information exists on the OBJ; the control unit controlling the APU based on the information read from the storage medium, this time on condition that the information on the single OBJ previously read from the storage medium and the information read from the storage medium this time on a single OBJ coincide with each other.

Such a constitution has the following effect: Since an ID plate moving with an OBJ is entered with the information on that OBJ and also with the information on OBJs on the upstream side of that OBJ, information can be obtained on the next OBJ, which cannot be obtained from the ID plate, to allow preliminary preparation for the processing of the next OBJ, and also to prevent erroneous processing by the collation with information read from the ID plate of the next OBJ.

Consequently, time is saved in the production system and the reliability of the processing can be enhanced. Since the process of removing an OBJ from or inserting an OBJ into the production line is conducted on the upstream side of the range where information is stored in the working unit, the shift of information due to the removal or insertion of the OBJ is corrected by rewriting a partial storage of the storage medium within a specific range, resulting in a continuation of work without imparting any influence on the control unit of the working unit.

The write-in and read-out processings of information to an ID plate 20 storage medium will be explained more specifically. The antenna ANT is disposed so that when the automated transport dolly 12 moves to a prescribed position as shown in FIG. 21, it is located in opposition to the ID plate 20 mounted on the side of the dolly.

The automated production line to which this invention is applied is made up of a continuously moving transporter. Therefore, the antenna ANT is required to provide a scanning speed which allows necessary information to be read from an ID plate 20 during the period between when the ID plate 20 of an automated transport dolly 12 enters the reading range and then leaves the reading range. Furthermore, in the system in which a body 1 is temporarily stationary before each process, or in the system in which the transporter 12 moves intermittently, the scanning speed is set so that reading can be completed within the stationary period of the transporter 12. Therefore, the ID plate 20 allows the antenna ANT to write or read the ID data in the position in which the plate 20 is disposed generally in front of the antenna ANT, as shown in FIG. 21. The ID plate 20 has a built-in Li cell which is utilized as a transmitter source to make the read-write antenna output the ID data, a memory back-up source to record and hold that ID data in the memory, and a driving source which is installed inside the ID plate 20 and causes the control data storage unit for storing ID data to write and read the ID data.

Figure 21:
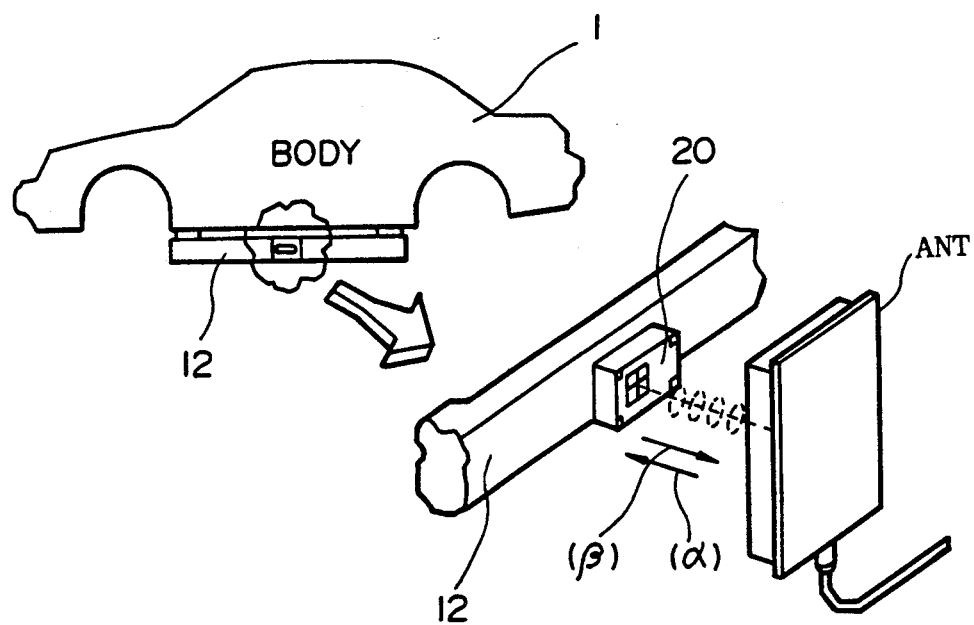
FIG. 21 is a perspective view showing positional relationship between an antenna and the information storing unit according to the first embodiment of the present invention.

The antenna ANT is arranged to output a call signal (kick signal, shown by the symbol (α) in FIG. 21) in microwaves to the ID plate 20 as shown in FIG. 21. When an automated transport dolly 12 reaches a prescribed range and the call signal is received at the ID plate 20, the ID plate 20 will output its ID data to the antenna ANT in the form of microwaves (this signal is shown by the symbol (β) in FIG. 21).

Having received the data output from the ID plate 20, the read-write antenna ANT supplies ID data to each control unit 220 described above.

The lithium cell built into the ID plate 20 uses a comparatively large current every time ID data is transmitted to output radio waves. Therefore, it is unavoidable that the cell will use significant power to transmit ID data, in comparison with the reception of call signals or write signals.

Thus, a lithium cell uses power depending on the amount of ID data transmitted to the antenna ANT. Hence the lithium cell must be replaced when the number of times ID data is transmitted from the ID plate 20 to each read-write antenna ANT reaches a prescribed number. In order to cope with this, either the ID plate 20 or the control unit 220 which is the receiver for the ID plate is provided with a transmission time control unit 230, which controls the number of times ID data is transmitted.

Figure 22:
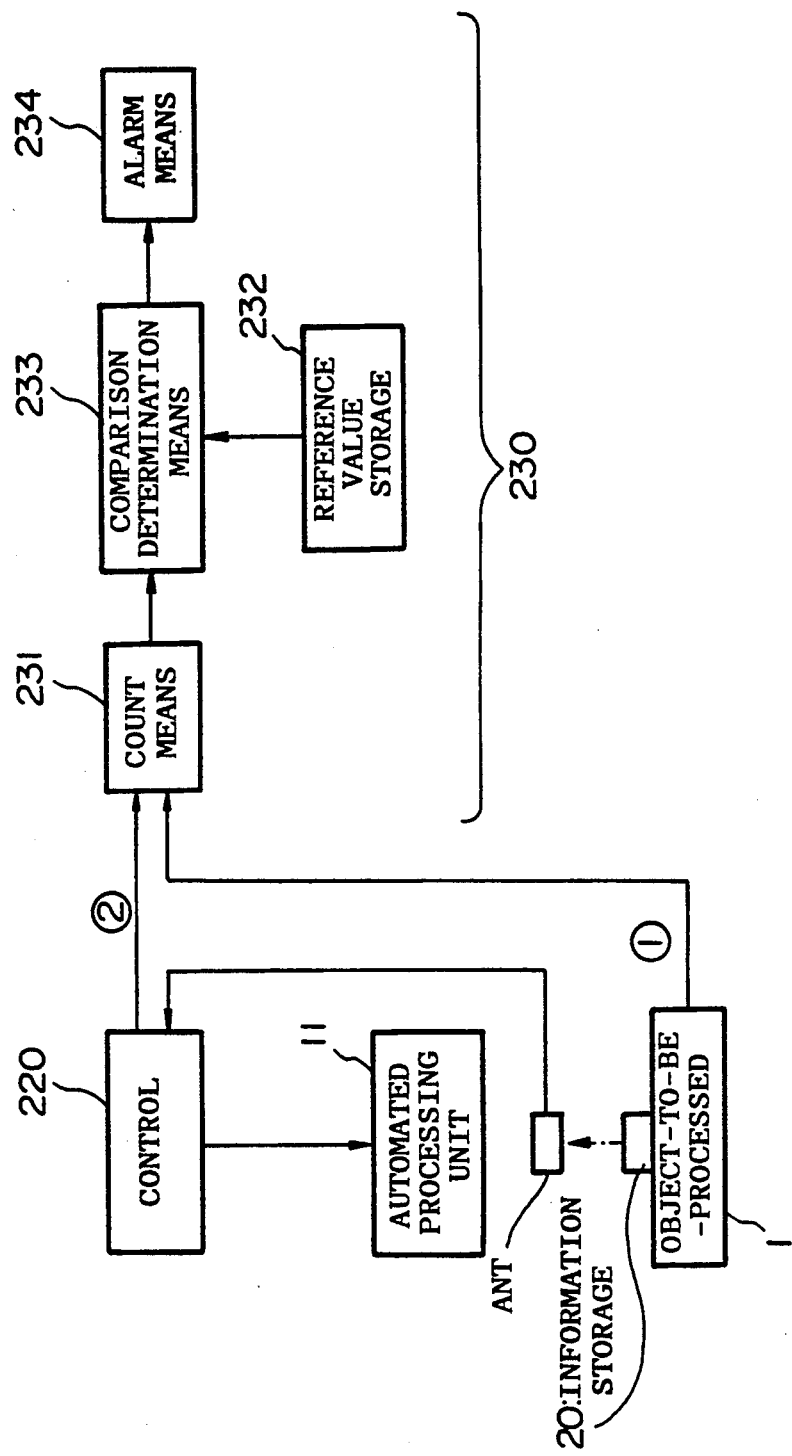
FIG. 22 is a schematic block diagram showing components necessary for the battery life control processing conducted in the first embodiment, according to functions.

Referring to FIG. 22, two examples for installing a transmission number control unit (one in the ID plate 20 and the other in the control unit) will be given.

Case in which transmission number control unit 230 is installed inside ID plate 20 (signal current indicated by the symbol 1)

The transmission number control unit 230 is composed of a counter 231 which advances the count (the initial value is zero) by one each time ID data is issued, a reference value storage 232, which stores the number of times ID data has been transmitted, corresponding to the time for renewal of the lithium cell as a reference value; a comparator and evaluator 233 which compares the reference value with the count value each time the count value of the counter 231 is renewed (advanced by one) and determines that a cell must be replaced when these values coincide; and a warning device 234 which urges the worker to replace the cell.

As the warning device 234, a lamp, a buzzer or the like may be installed on the ID plate 20, and a warning signal is sent to the read-write antenna using microwaves, etc.; the control unit 230 issues a warning based on the signal.

Case in which transmission number control unit 230 is installed inside control unit 220 (signal flow indicated by the symbol 2)

This transmission number control unit 230 comprises a counter 231, a reference value storage 232, a comparison and evaluator 233 and a warning device 234 similar to those in the transmission number controller.

In the counter, a number of storage areas are required in accordance with the number (kind) of ID plates, and therefore a larger storage capacity is required than that installed in the ID plate 20.

More specifically, the ID plate 20 is attached and has stored in it, in advance, the identification number of the ID plate 20 itself and this identification number is output to the antenna together with the ID data. Each of the control units 220 cumulatively stores the number of ID data read for each of the identification numbers supplied with the ID data to control the timing of the replacement of the ID plate 20.

That is, the counter 231 is provided with a number of storage units, each of which cumulatively stores the read times of the ID data, and an identification unit in which the identification numbers supplied with the data are collated with the identification numbers of read times of the stored ID data (for each identification number) in the storage unit and the stored value of the corresponding identification number is advanced. With these storage units and identification units, the timing of the replacement of the ID plates is sequentially controlled.

In the transmission of ID data from the antenna ANT, a call signal from the antenna ANT may be output based on the detection signals supplied by touch sensors, photosensors, etc, provided that the automated transport dolly 12, which is loaded with the body 1 is disposed at a prescribed position (range). The count value in the counter 231 is reset by the reset signal output when a cell is renewed. A reset signal is output by operating a reset switch, provided that, after the power supply is turned off by taking out an old cell to replace the cell, the power supply goes to the mounting of a new cell; or this may be done artificially.

As described above, every time the count value of the counter is renewed, the count value is compared with the reference value stored in the reference value storage. When these values match, it is determined that this agreement indicates the arrival of the renewal time of the cell and the worker is urged to replace the cell. As a consequence, the control of the life of a cell such as a lithium cell with a sharp voltage-drop characteristic or the like is securely controlled to allow uninterrupted processing of an APU. Since the count is performed based on the frequency of data transmission and the transmission produces a marked consumption of a cell, the count can reflect the consumption of a cell accurately, thereby reducing the risk of unnecessary cell replacement.

Figure 23:
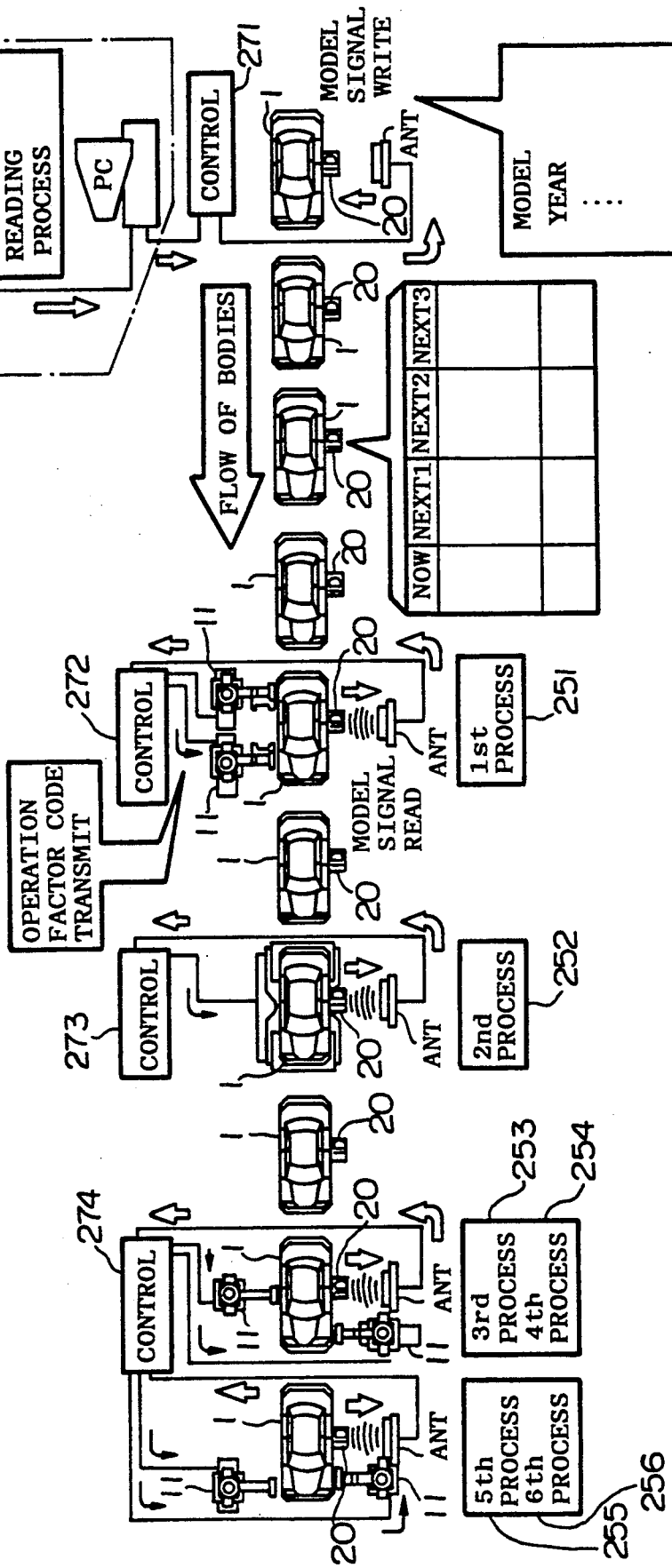
FIG. 23 is an arrangement for a specific production line to which the first embodiment of this invention is applicable.

Referring to FIG. 23, a more concrete constitution which, while processing a body 1, allows the processing of the following bodies 1, will be explained.

FIG. 23 specifically illustrates the constitution of part of the production line shown in FIG. 1. The fundamental elements of this production line in general comprises the control data storage medium 20 which is mounted on each of a number of OBJs flowing in the production line and moves together with the OBJ, a non-contact type transmission-receptor (read-write antenna) ANT which transfers control data through microwaves with a control data storage medium 20 located at a specified position of the production line, and an APU 11 which applies the prescribed processing to an OBJ based on control data.

In FIG. 23, symbol 1 indicates the body of an automobile, an OBJ which is to be coated, welded, etc,, in the preceding process, and which is then fed to the present process.

This body 1 is transported on the production line through a transporter such as a self-travelling automated transport dolly and, in the first process 251, it is mounted with, for example window parts using an APU. The body, after having undergone this first process 251, is integrated with, for example bumpers, engines, suspension devices, etc., in the second process 252. Subsequently the body 1 having passed the second process 251 is arranged to be injected with, for example braking fluid, and to have a battery and the like installed in the third process 253, fourth process 254, fifth process 255, and the sixth process 256. These kinds of work in such third to sixth processes are executed with each APU 11.

The above processes are conducted on one floor (e.g., first floor) of the factory and applied to the automobile bodies that have been fed via such processes as welding and coating, while each is mounted on a moving automated transport dolly on one floor. Moreover, the automobile having been subjected to the processes shown in the figure becomes capable of self-traveling after it is supplied with fuel and unmounted from the automated transport dolly as a finished car.

Next, explanation is provided on the control data storage medium 20 control data read unit ANT and APU 11.

The control data storage medium 20 is provided with a proper body information storage region 260 which stores body information appropriate to the corresponding body 1 and an operation factor storage region 261 where the operation factor code (operation determining data) indicates the contents of the processing to be applied to the body 1 in each process.

Information to be stored in the proper body information storage region 260, includes the serial number n, car model, year-model, etc. Operation factor codes to be stored in the operation factor code storage region 261 are provided with the data for selecting the optimum in accordance with the kind of body 1 (car) out of a number of operation patterns making the APU 11 work.

In this case, one control storage medium 20 stores the proper body information and operation factor codes (hereafter referred to in the control data shown in the scope of claims) of the body 1 moving along with this control data storage medium 20 and even the control data on a number of bodies upstream of the body 1. The control data storage medium 20 stores the control data (corresponding to (NOW)) showing the contents of work on the body 1 disposed at a given time in each process (second process 252, third process 253, etc.) and in addition, the control data ((NEXT (NEXT 2, NEXT 3) . . .) showing the work data on the body 1 to be disposed next, next, (next after next . . .) in the process.

A control data read unit ANT is set so as to oppose the control storage medium 20 which is provided on an automated transport dolly 12 and moves on the production line as shown in FIG. 21, while the respective control data read units ANT are connected to the control units 271-274 of each APU. The writing and reading of the control data are conducted through microwaves having a frequency of, for example, 2450 MHz transmitted to and received from the read/writer ANT in a non-contact manner.

An APU, actuated by the control data transmitted from the control units 271-274, applies a specified processing to the body 1. This APU 11 is fed with the control data corresponding to the four dollies stored in an ID plate (control data (NOW), (NEXT 1), (NEXT 2), (NEXT 3), . . .). After being fed with data about a number of dollies, the APU 11 selects a specified processing program of its own (operation indicating data) and applies a specified processing to the body 1.

At the same time, the APU reads the control data (NEXT 1) in the period before the arrival of the next OBJ, and is arranged to conduct in advance various kinds of preparative operations for the coming OBJ.

Next, the operations from the reading operation of the control data to the processing operation of the APU 11 in the production line related to the present invention will be explained.

First, the control data read unit ANT for the first process 251 outputs a call signal to the control data storage medium 20 of a body 1, which comes in front of the control data unit and, upon receiving this call signal, the control data storage medium 20 outputs the control data (the control data about the body 1 moving with this control data storage medium 20 and all the control data of a number of bodies upstream of this body 1) to the control data reading unit ANT. The control data output to the control data read unit ANT is supplied to the control unit 272. The control data sent from the control unit 272 to the APU 11 contains that data corresponding to (NEXT), (NEXT 1), (NEXT 2), . . . . The APU 11 selects a prescribed working program (operation determining data) of its own from the control data of these many dollies thus sent to apply a prescribed processing to the body 1 and further reads the control data (NEXT 1) . . . in the period before the arrival of the next OBJ to perform various processes for the next OBJ in advance.

Hereafter, the control data is read by the control data read unit (actually the read-write antenna) which is installed for each series of processes (the first process 251, the second process 252, . . .) as above stated.

As can be easily understood from the above description, in the present embodiment, the APU R reads from the control data read unit ANT the control data (NOW), (NEXT 1), (NEXT 2), (NEXT 3), . . . about the body 1 having moved the position of the APU 11 and the bodies 1 within a specified range on the upstream side of the body 1, and at the same time, selects the operation instruction data to perform the previously described processing and reads the control data (NEXT 1) . . . on the upstream side to prepare for the various operations in the period before the next body 1 to thereby decrease the amount of time wasted and shorten the cycle time of each APU.

Next, a second embodiment will be explained which shows how to move ID information when shifting an OBJ from one production line to the next production line. In the case where there are many production lines as shown in FIG. 1, it is necessary to transport an OBJ (such as a body) from one production line to the next production line. In this case, the transporter on which the storage medium is mounted is constituted so as to circulate through each production line. Therefore, when an OBJ is transferred to the next production line, the information on the OBJ must be simultaneously transferred. To do so, the information on the transferred OBJ must be written into the storage medium of the transporter located in the input area of the next production line.

Although it is conceivable that the host computer carry out this writing process, a problem arises in that it is difficult to match the timing of the transfer of the OBJ and that of the writing of the information. This is because the host computer must identify the OBJ positioned at the feed-out part of the precedent production line and, after that, perform a writing operation synchronized with the transfer timing of the OBJ, which makes the processing complex. If the writing timing shifts, the information and OBJ will be mismatched, and the following process will be that for quite a different model. The above problem is more significant when an intermediate transporter exists on this side of the next production line. The reason for this is that the OBJ must be transferred once to the intermediate transport unit, and then to the next production line, further complicating the processing for the following information.

Figure 24:
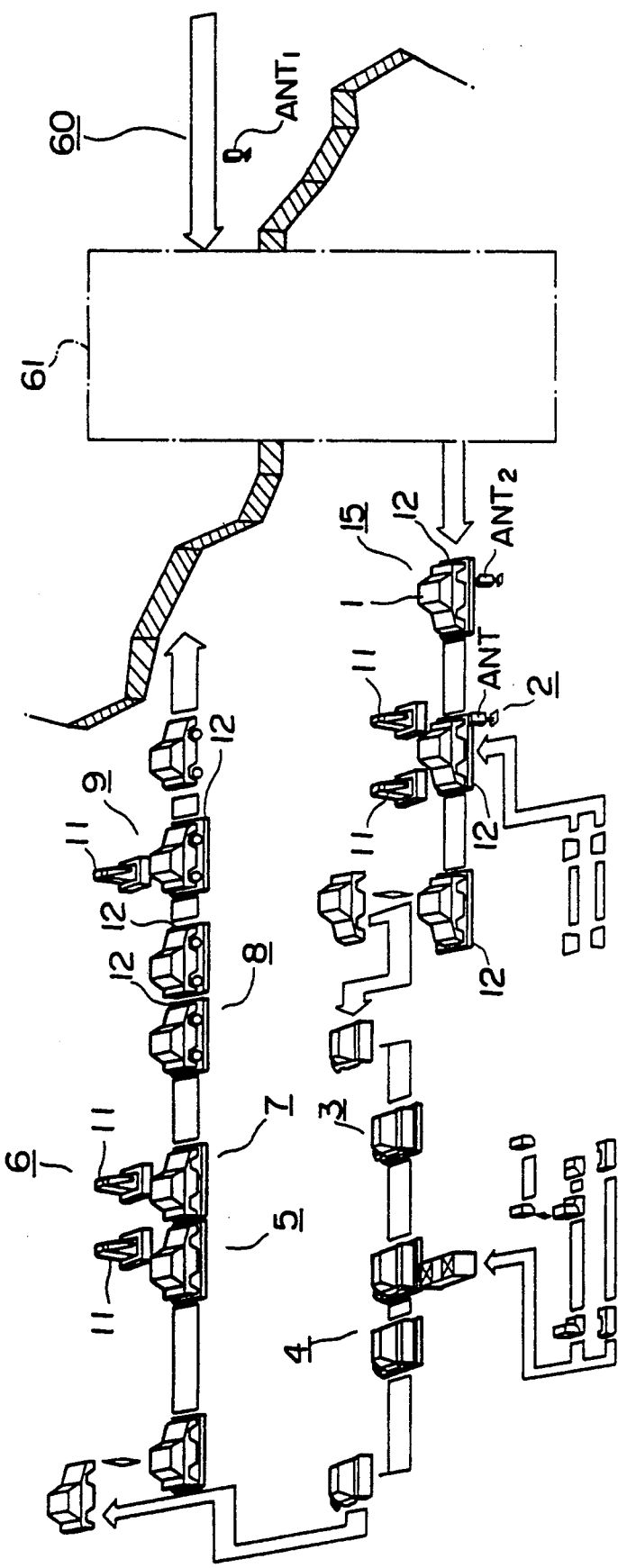
FIG. 24 is a schematic drawing showing a layout for a second example of production lines to which the present invention is applicable.

This embodiment is presented in consideration of the above-stated circumstances and aims to provide a production control system which allows the exact following of the information on the OBJ. In FIG. 24, the same symbols are attached to the same parts of the production line in FIG. 24 and FIG. 1. In the input area 15 of this production line, an OBJ 1 (body 1) that has finished processing in the preceding production line is arranged to be transferred to an empty automated transport dolly 12. The preceding production line has a different assembly process from this production line, and the output part 60 of the previous production line and the input part 15 of the following production line are connected through a lift device 61.

The lift device 61 is used to lower body 1 from the second floor (the preceding production line) to the first floor (the current production line shown in the figure) by its vertical movement while holding the body 1 by means of a suspender 62. The body is transferred from an automated transport dolly 12 to the lift device 61, or vice versa, by a transfer device (not shown). FIG. 24 is drawn in simplified form by omitting the drawing of the APU and part of the preceding production line.

Figure 25:
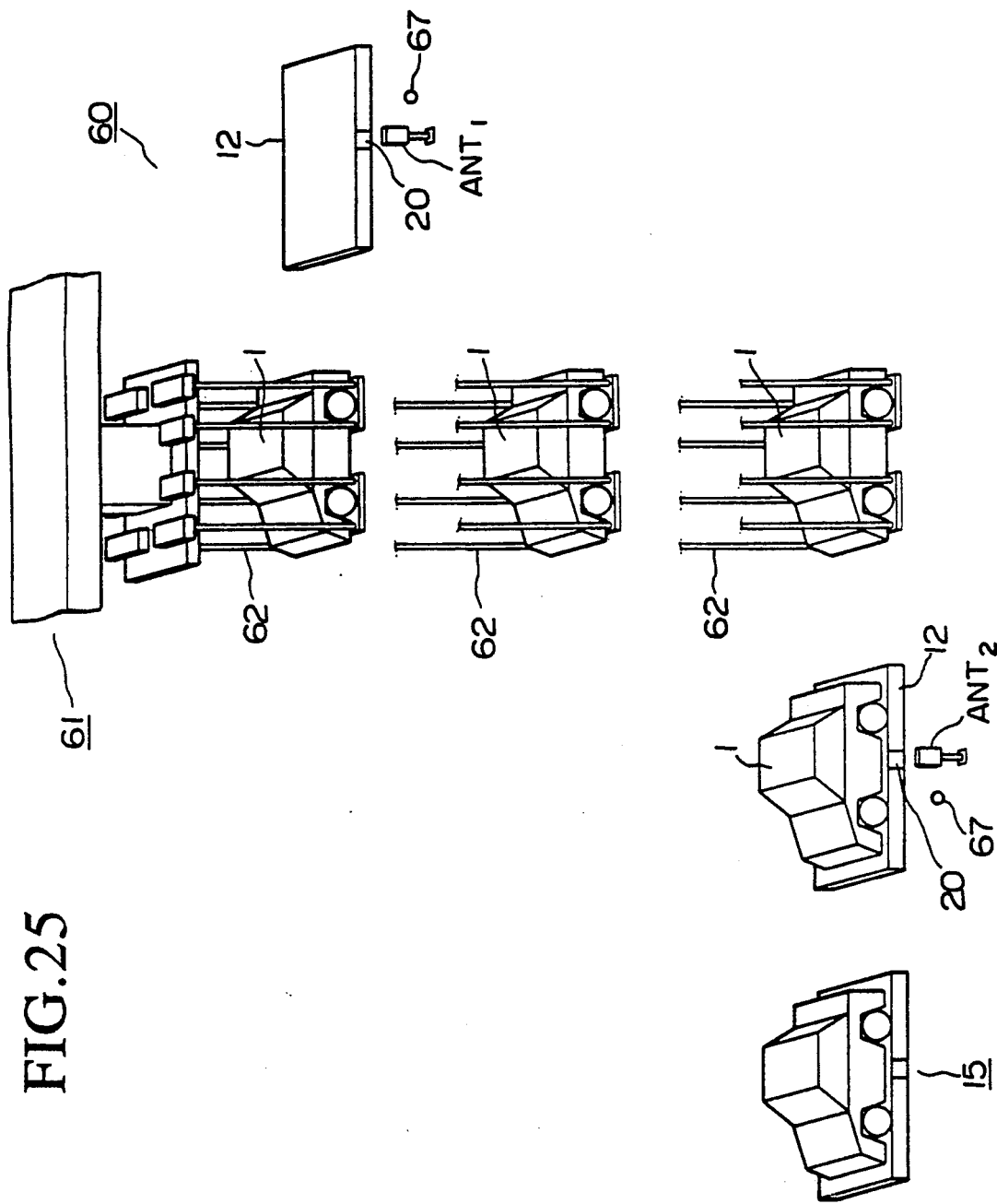
FIG. 25 is a perspective view of a lifting apparatus adapted to be used for transfer between the lines, according to the second embodiment of this invention.

In the present production line, each body 1 is loaded on an automated transport dolly 12 or the like, which moves the body 1 along the preceding production line as is shown in FIG. 25. However, when the final processing is finished in the preceding production line, the dolly 12 is separated from the body 1 and is moved to the input area of the preceding production line to pass through the preceding production line. At the same time, the body 1 is transferred to the following production line using the lift device 61.

The central part of the side surface of the automated transport dolly 12 is provided with an ID plate 20 similar to that shown in FIG. 21 of the first embodiment. A variety of information is written into this ID plate 20 via microwave transmission from the antenna ANT, and the written information can be read via the antenna ANT.

Figure 26:
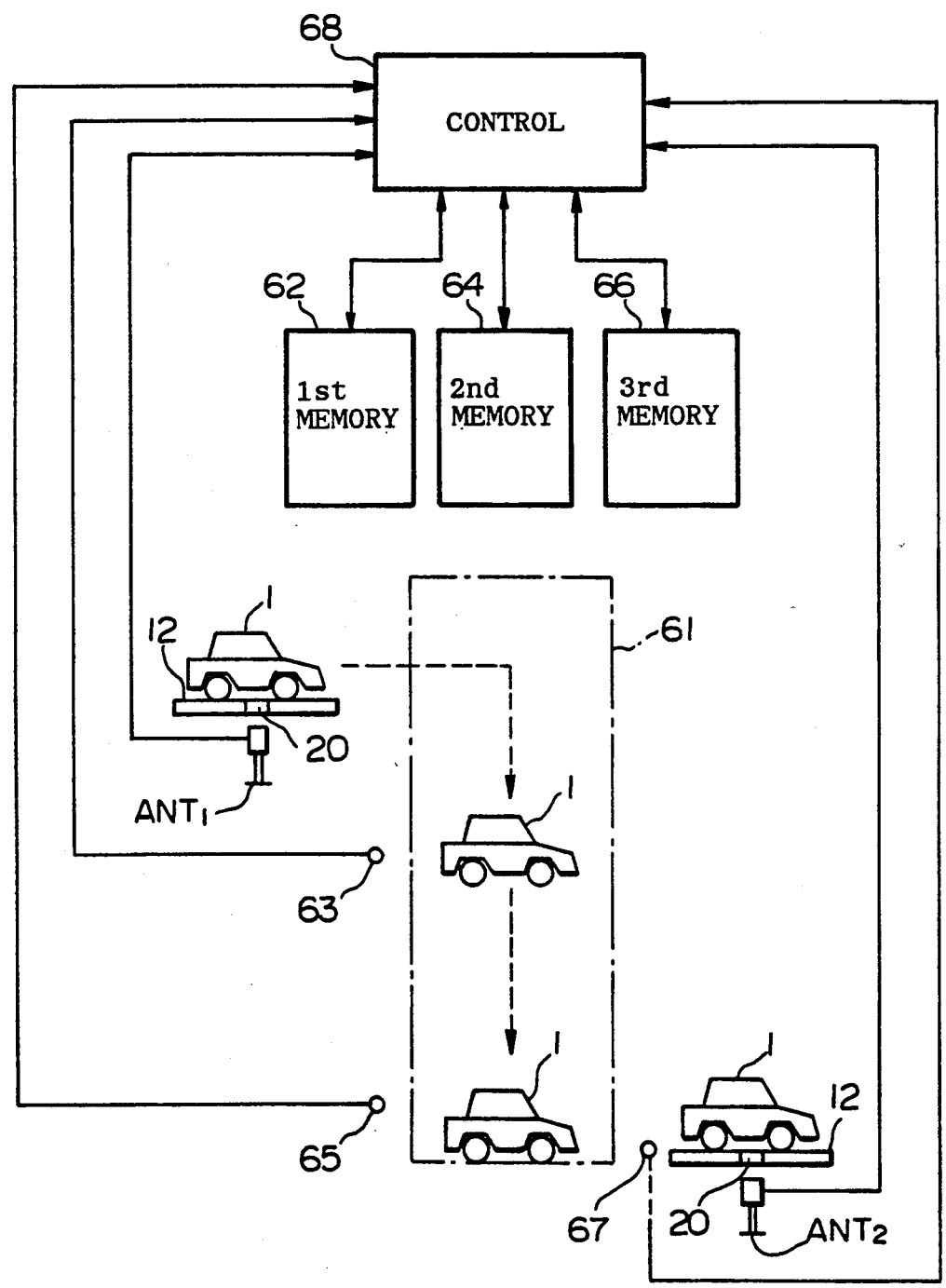
FIG. 26 is a schematic block diagram showing the electrical configuration of the lifting apparatus of FIG. 25.

Next, the constitution of a transferer which moves the ID information together with the movement of the body 1 by means of the lift device 61 is explained with reference to FIG. 26.

This transferer is provided with an antenna ANT1 which reads the ID information from the ID plate 20 installed on the automated transport dolly 12 of the preceding process; an antenna ANT2 which writes ID information into the ID plate 20 installed on an automated transport dolly 12 of the following process; a first memory 62 which stores the ID information read by the antenna ANT1; a first sensor 63 which detects the passing of the body 1 by the movement of the lift device 17; a second memory 64 to which ID information stored by the first memory 62 is transferred from the memory 62; a second memory 65 which detects the arrival of the body 1 at the first floor; a third memory 66 to which the ID information stored by the second memory is transferred from the second memory; a third sensor 67 which detects the transfer to an automated transport dolly 12 circulating along the following production line; and a controller 68. The controller 68 transfers ID information from the first memory 62 to the second memory 64 based on the activity of the first sensor 63, from the second memory 64 to the third memory 66 based on the activity of the second sensor 65, and transfers ID information to the antenna ANT2 based on the activity of the third sensor 67 outputting a write signal so that the ID information can be written.

Next, the operation of the embodiment with the above constitution is explained. First, the body information is sequentially output from the host computer in accordance with a production plan. This body information is then converted into an operation factor code following the text file at the model collation terminal 31. In the first input area 15 of the process, car model information and the operation factor code are written into the ID plate 20 of the corresponding body, and hereafter each APU applies automated processing by reading the operation factor code inside the ID plate 20.

For example, in each process shown in FIG. 24, the operation factor code concerning the corresponding body 1 is read from the ID plate 20 via an antenna ANT and the prescribed processing (e.g., the selection, movement and fitting of a window in the window-fitting process) is executed in accordance with this operation factor code. This processing is executed in a similar manner as in the three-fluid injection unit, battery fitting unit and other processing units. In this case, since the operation factor code is formed in correspondence with each model, the processing of each APU 11 can respond to even the case which mixes different models in the preceding production line. As the operation factor code is the code which determines only the fundamental operation of each APU 11, its combination can be properly changed and the freedom of the APU 11 is substantial. Hence, even when a marked model change or the like occurs, by rewriting the text file inside the model collation terminal 31, an operation factor code can be prepared in accordance with the contents of the change, allowing for the rapid response of each APU.

Next, an explanation will be given for the case in which a body 1 is transferred from the preceding production line to the following one, with reference to FIG. 26. When a body 1 is transferred to the output area 60 of the preceding production line, the ID information is read from the ID plate 20 to the antenna ANT1. The ID information thus read is written into the first memory 62 by the controller 35. When the first sensor 63 detects the arrival of an automated transport dolly 12 and outputs such a detection signal. Then, the information stored in the first memory 62 is transferred from the first memory 64 to the second memory 66 by the controller 68.

When the second sensor 65 detects the passage of a body 1 and outputs a detection signal, the ID information stored in the second memory 64 is transferred from the second memory 64 to the third memory 66 by the controller 68. When the third sensor 67 detects the transfer of the body 1 to an automated transport dolly 12 and outputs a detection signal, the ID information stored in the third memory 66 is written into the ID plate 20 by the controller 68 via the antenna ANT2.

As described above, the ID information securely transferred from the ID plate installed on an automated transport dolly 12 circulating on the preceding production line is transferred to the ID plate 20 installed on an automated transport dolly 12 circulating on the following production line without suspending the production line. Although there are three storages in this embodiment, the scope of the present invention is not limited to these, since any number can be applied to this invention.

Though the controller 68 is actuated based on the detection signal received from the sensors 63, 65, and 67, the scope of this invention is not limited to such a method, but can rather apply to other means. For example, the period required in the transfer of a body from the preceding production line to the following production line can be stored in the controller 68, and with every lapse of this period, the information that is transferred can be employed as a preferred method for the present invention.

Figure 27:
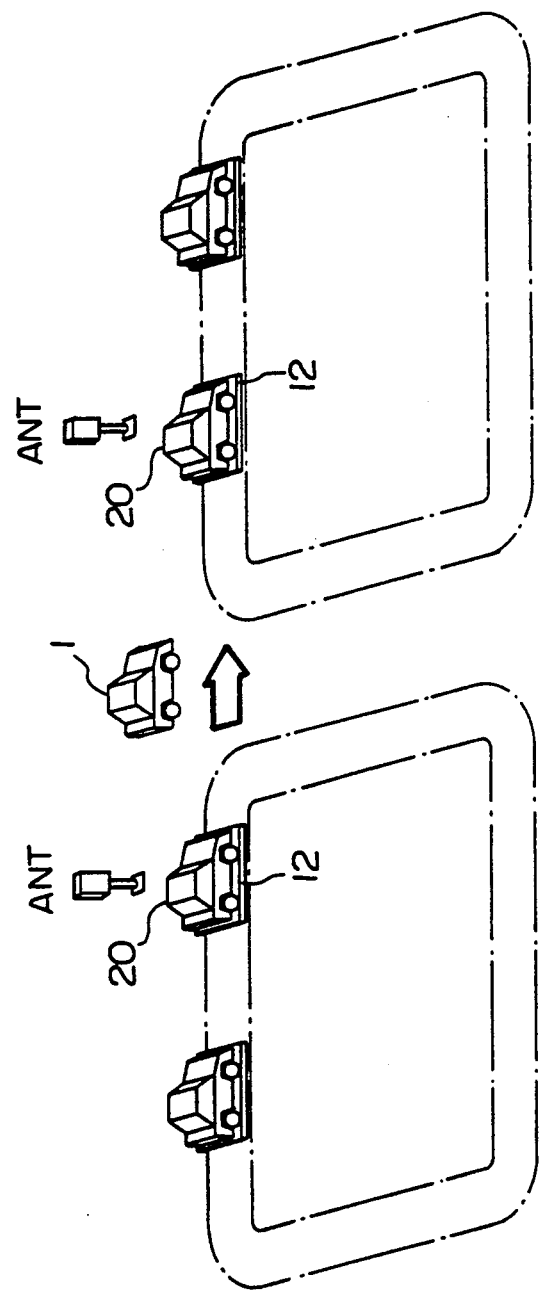
FIG. 27 is a perspective view of a variation of the layout for the second example of production lines of FIG. 24.

Although a production line is laid over different floors, this invention is not limited to such a case, but rather can be applied to the case in which many production lines are laid over different regions of the same floor as shown in FIG. 27. In such a case, antennas ANTs are set at the terminal point of one process and the starting point of the next process, and the former antenna ANT reads the body information stored on the ID plate attached to an automated transport dolly 12 circulating in one process and the latter antenna ANT writes the body information to the ID plate 20 attached to an automated transport dolly 12 circulating in the other process. In this way, the body information can be transferred from one process to another.

It is possible to install an ID plate on the lift device 61 and use this plate as a shift register instead of the first to third memories. In such a case, body information which one ANT receives is written into the corresponding ID plate 20 and body information of the ID plate 20 is written into another ID plate 20 from the ID plate 20 via another ANT. The above process is thereby able to transfer body information. The constitution of the above second embodiment provides four functions as analyzed in the following.

Figure 28:
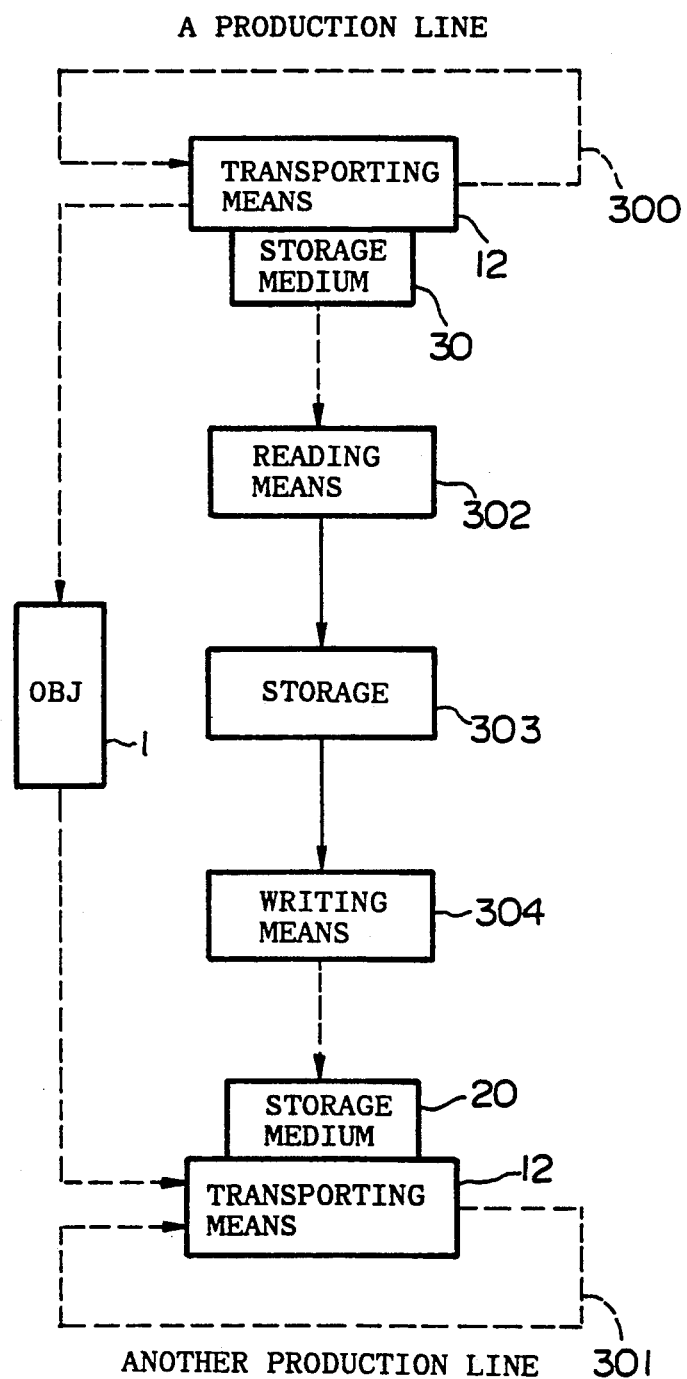
FIG. 28 is a first block diagram for analyzing according to functions the configuration of the second embodiment.

The embodiment of this invention represented in FIG. 28 comprises a number of production lines, a transporter 12 which transports an OBJ 1 from the input area to the output area of each of the production lines, and after feeding out the OBJ, returns to the input area to circulate on the production line, a reader 302 which, in a production control system provided with the transporter mounted with a storage medium 20 storing information regarding the OBJ 1 when the transporter mounted with the OBJ 1 reaches the output area of one production line, reads the information from the storage medium 20 mounted on the transporter, a storage 303 which stores information read from the reader 302, a writer (not shown) which writes information stored by the storage 12 existing in another production line 301, and a writer 304 which writes information stored by the storage 303 into the storage installed on the transporter when the OBJ reaches the transporter existing in the input area or another production line.

In the above constitution of the invention, when an OBJ 1 is transferred to the output area of the production line 300, the information concerning the OBJ is read from the storage medium 20 to the reader 302. The read information is written into the storage 303. When the OBJ is transferred to the input area 301 of another production line, the information written into the storage 303 is written into a storage medium 20 by the writer 304.

Figure 29:
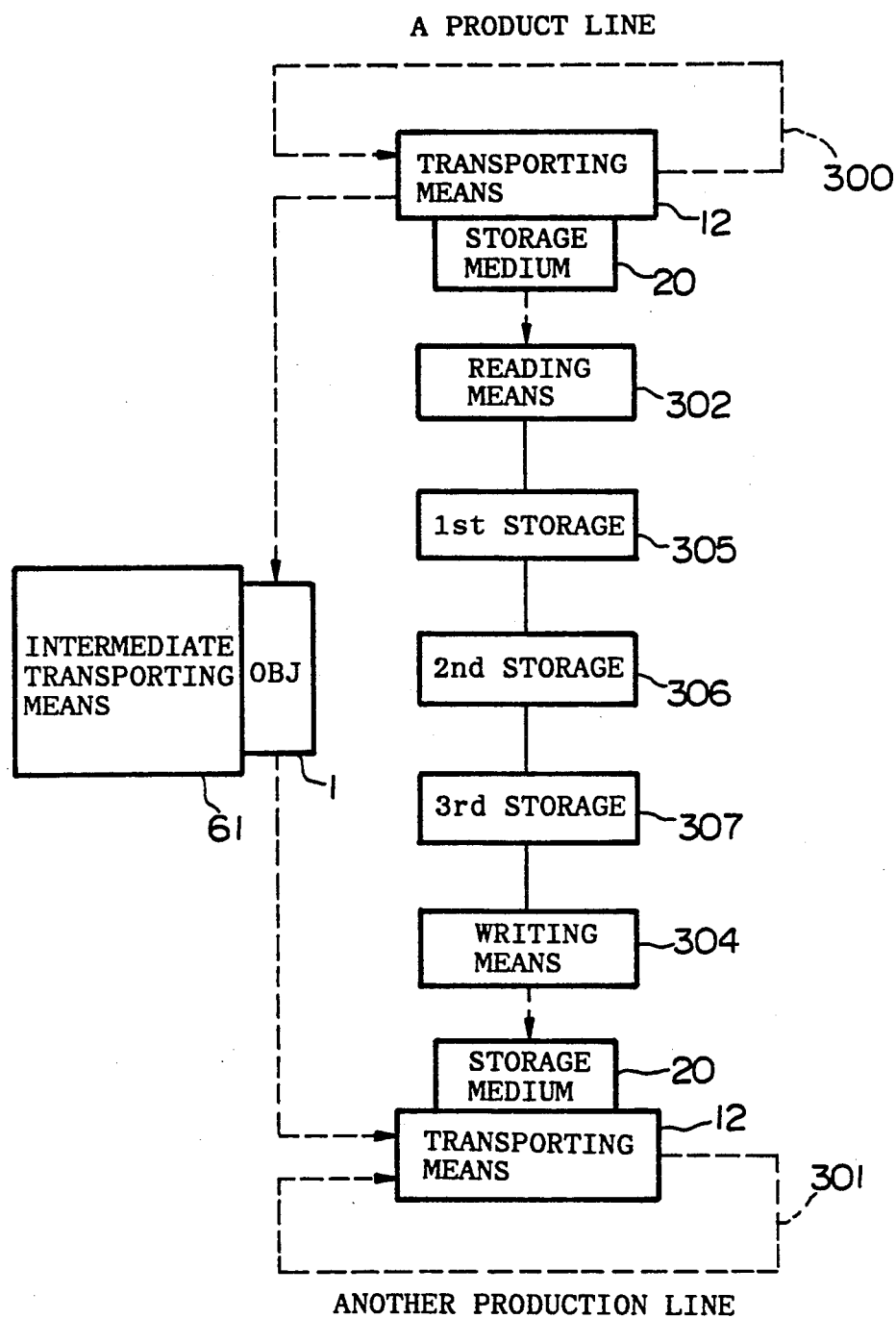
FIG. 29 is a second block diagram for analyzing according to functions the configuration of the second embodiment.

The embodiment of this invention shown in FIG. 29 is a production control system comprising a number of production lines (300, 301), a transporter 12 which transports an OBJ from the input area to the output area in each production line and, after having sent the OBJ, returns again to the input area to circulate on the production line, an intermediate transporter 61 which transports the OBJ 1 from the output area of a production line 300 to the input area of another production line 301, and a storage 20 which stores the information concerning the OBJ 1, and is installed on the transporter 12. The embodiment is further provided with a reader 302 which reads information from the storage medium 20 installed on the transporter 12 when these transporters 12 mounted with an OBJ reach the output area of a production line; a first storage 305 which stores the information read by the reader 302; a second storage 306 which reads the information in the first storage when the OBJ is loaded on the intermediate transporter 61; a third storage 307 which takes in the information in the second storage 306 when the OBJ is transferred to the input area of another production line; a writer 304 which writes the information in the third storage 307 to the storage medium 20 of the transporter 12 when the OBJ 1 is loaded on the transporter existing in the input area of another production line 301.

In the embodiment relating to the invention shown in FIG. 29, when an OBJ 1 is transferred to the output area of the production line, the information regarding the OBJ 1 is read from the storage medium 20 to the reader 302, When the OBJ is mounted on the intermediate transporter 61, the information in the first storage 305 is taken into the second storage 306. When the OBJ 1 is transported to the input area of another production line 301, the information in the second storage 306 is taken into the third storage 307. When the OBJ 1 is loaded on a transporter existing at the input area of another production line 301, the information in the third storage 307 is written into the storage medium 20 of the transporter.

Figure 30:
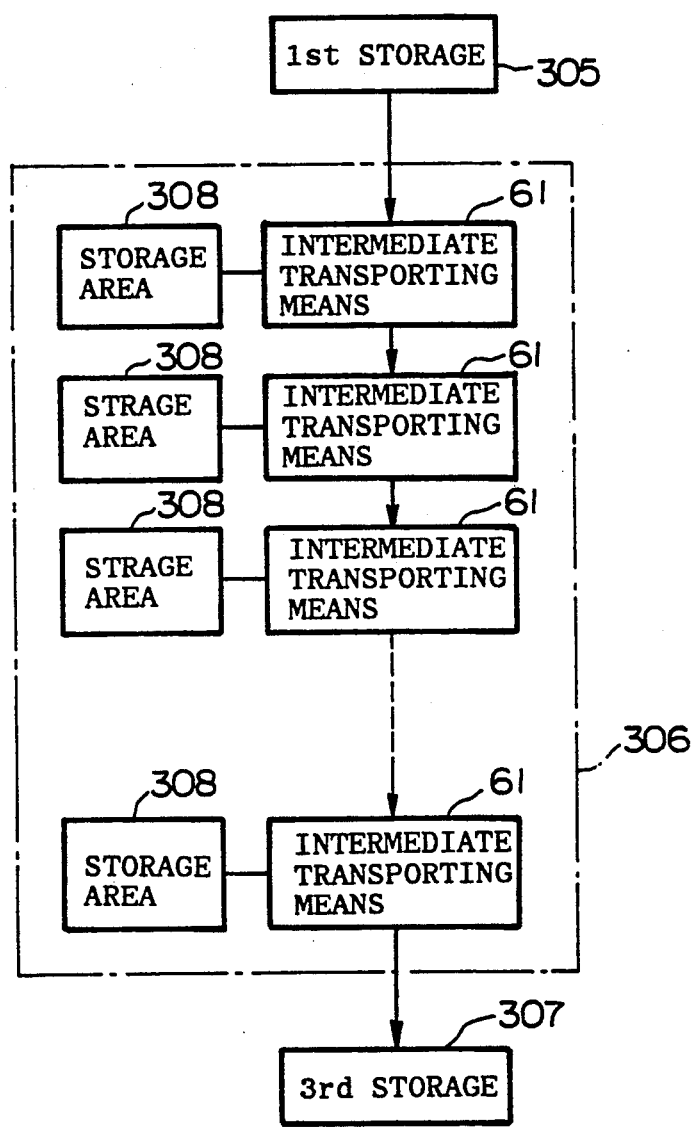
FIG. 30 is a third block diagram for analyzing according to functions the configuration of the second embodiment.

The embodiment shown in FIG. 30 is a modification of the embodiment shown in FIG. 29 and is constituted in such way that the intermediate transporter is constituted from a number of consecutive intermediate transporters (61, 61, . . .), the second storage 306 is constituted from a number of storage areas 308 which correspond to these intermediate transporters (61, 61, . . . ), each storage area 308 takes in the information of the storage area 308 at the preceding stage when the OBJs 1 are mounted on the corresponding intermediate transporters (61, 61, . . . ), and the third storage 307 takes in the information from the storage area 308 at the final stage of the second storage 306 when an OBJ is transferred to the input area of another production line.

In the embodiment shown in FIG. 30, when an OBJ is mounted on the corresponding intermediate transporter 61, the information in the storage area 308 at the preceding stage is taken into the storage area 38 at the later stage. When the OBJ 1 is transferred to the input area of another production line 301, the information stored by the storage area 308 at the final stage of the second storage 306 is taken into the third storage 307.

Figure 31:
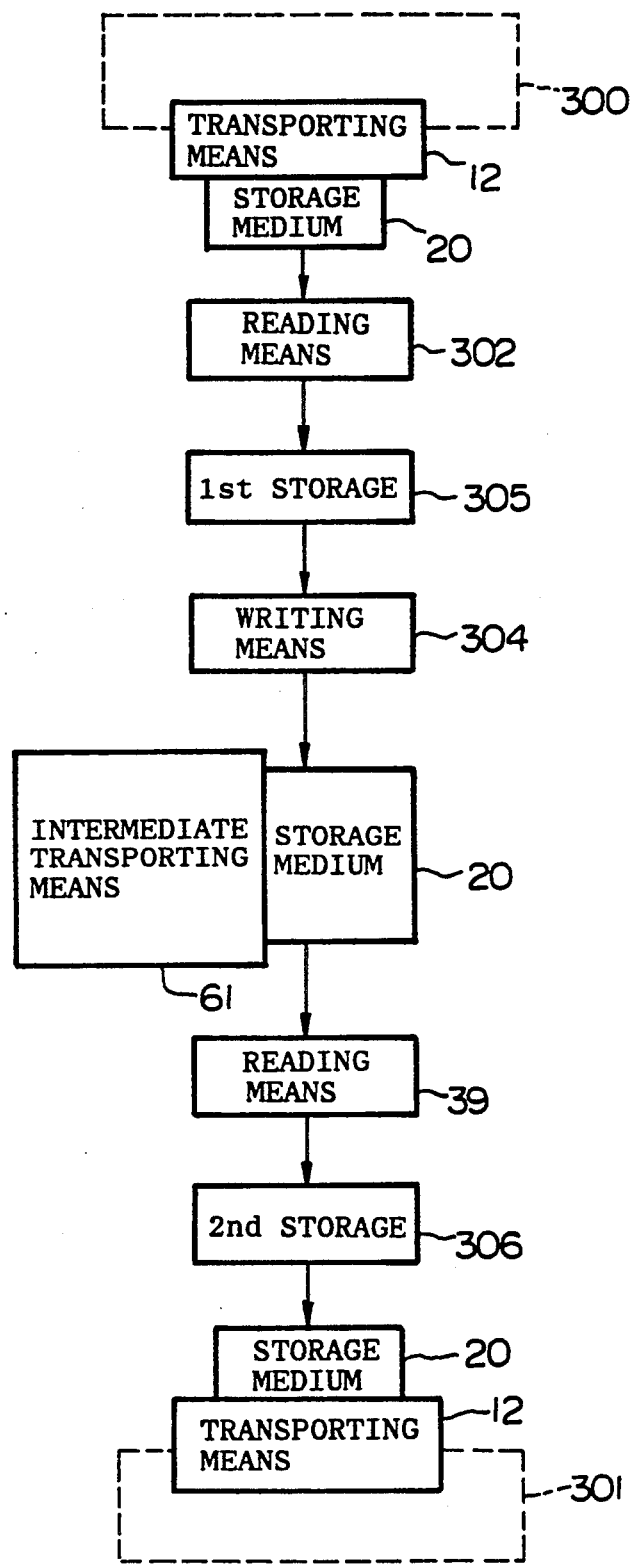
FIG. 31 is a fourth block diagram for analyzing according to functions the configuration of the second embodiment.

The embodiment of this invention shown in FIG. 31 is a production control system comprising a number of production lines (300, 301); a transporter 12 which transports an OBJ from the input area to the output area in each production line and, after having sent the OBJ, returns again to the input area to circulate on the production line; an intermediate transporter 61 which transports the OBJ 1 from the output area of a production line 300 to the input area of another production line 301; and a storage medium 20 which stores the information concerning the OBJ 1 and is installed on the transporter 12 and the intermediate transporter 61, and is further provided with a reader 302 which reads information from the storage medium 20 installed on the transporter 12 when the transporter 12 mounted with an OBJ 1 reaches the output area of a production line 300, a first storage 305 which stores information read by the reader 302, a writer 304 which writes the information stored by the first storage 305 to the storage medium 20 installed on the intermediate transporter 61, a reader 309 which reads the information stored by the storage medium 20 installed on the intermediate transporter 61, a second storage 306 which stores the information read by the reader 309, and a writer 309 which writes the information stored by the second storage 306 to the storage medium 20 installed on the transporter 12 when the OBJ reaches the transporter 12 which is at the input area of another production line 301.

In the embodiment of the invention shown in FIG. 31, when the transporter 12 loaded with an OBJ 1 reaches the output area of a production line 300, the information stored by the storage medium 20 installed on the transporter 12 is read by the reader 302. The information read by the reader 302 is stored by the first storage 305. The information stored by the first storage 305 is written into the storage medium 20 installed on the intermediate transporter 61 by the writer 304. The information stored by the storage medium 20 installed on the intermediate transporter 61 is read by the reader 309. The information read by the reader 309 is stored in the second storage 306. When the OBJ 1 reaches the transporter 12 which is at the input area of another production line 301, the information stored in the second storage 306 is written into the storage medium 20 installed on the transporter 12 by the writer.

Any constitution shown in FIGS. 28-31 gives the following effects. The yield and the production speed are improved because information related to an OBJ can be securely transferred from one storage medium to another storage medium without suspending the advance of the production line. As a result, according to the present invention, productivity on the production line can be improved. Since each APU operates in accordance with the operation instruction data stored in the storage medium of the OBJ, neither erroneous discrimination of a car model or the like nor troublesome operation will occur, resulting in the enhancement of productivity.

Since the operation of each APU is determined by the operation instruction data, and because the operation data is prepared based on the text file in the converter, even when a change of car model or the like becomes necessary, there is no need to change the program of each APU. A change of the text file alone can promptly and advantageously respond to such a situation.

Figure 32:
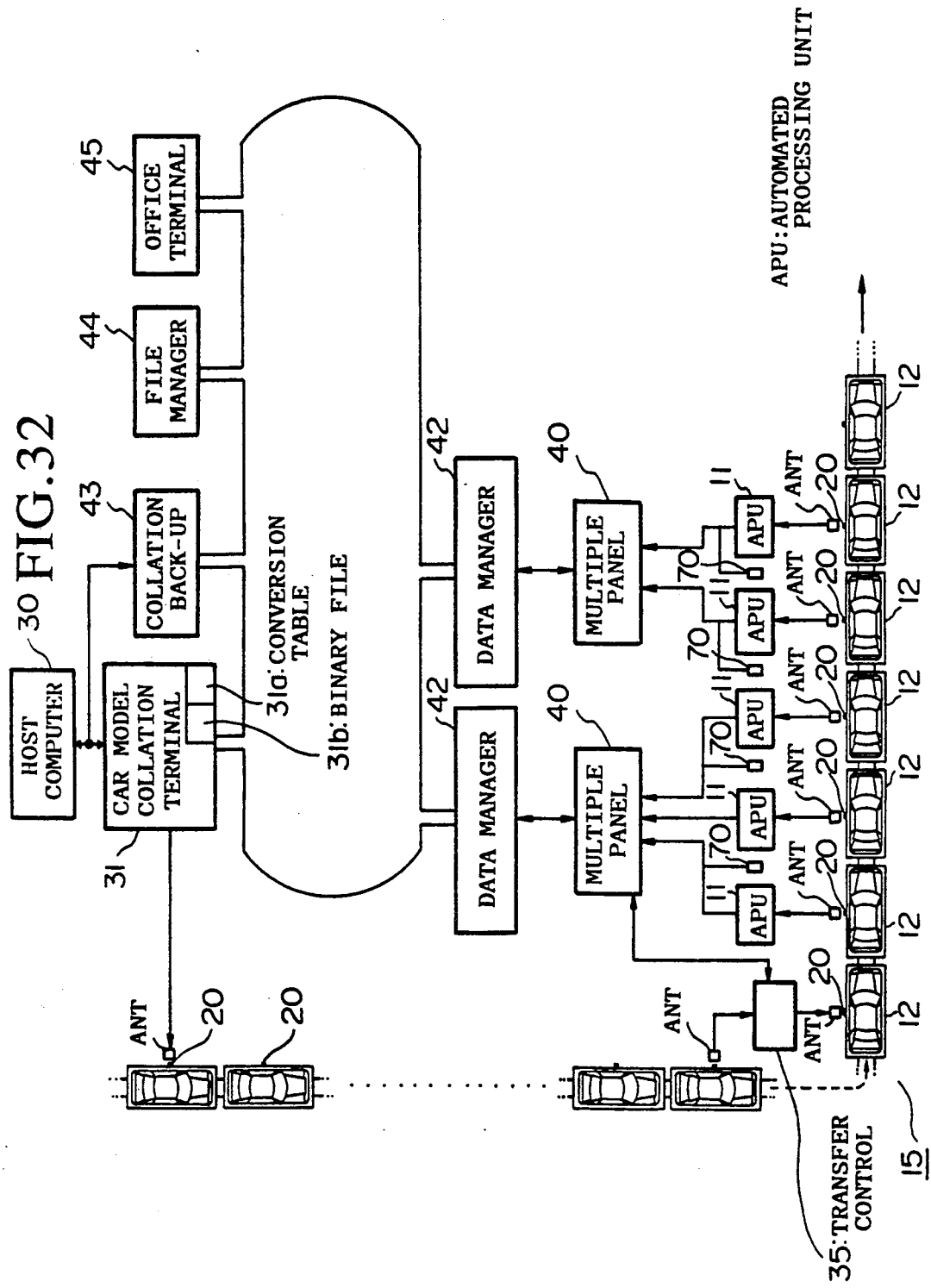
FIG. 32 is a schematic block diagram showing the electrical configuration of a third embodiment of the present invention.
Figure 33:
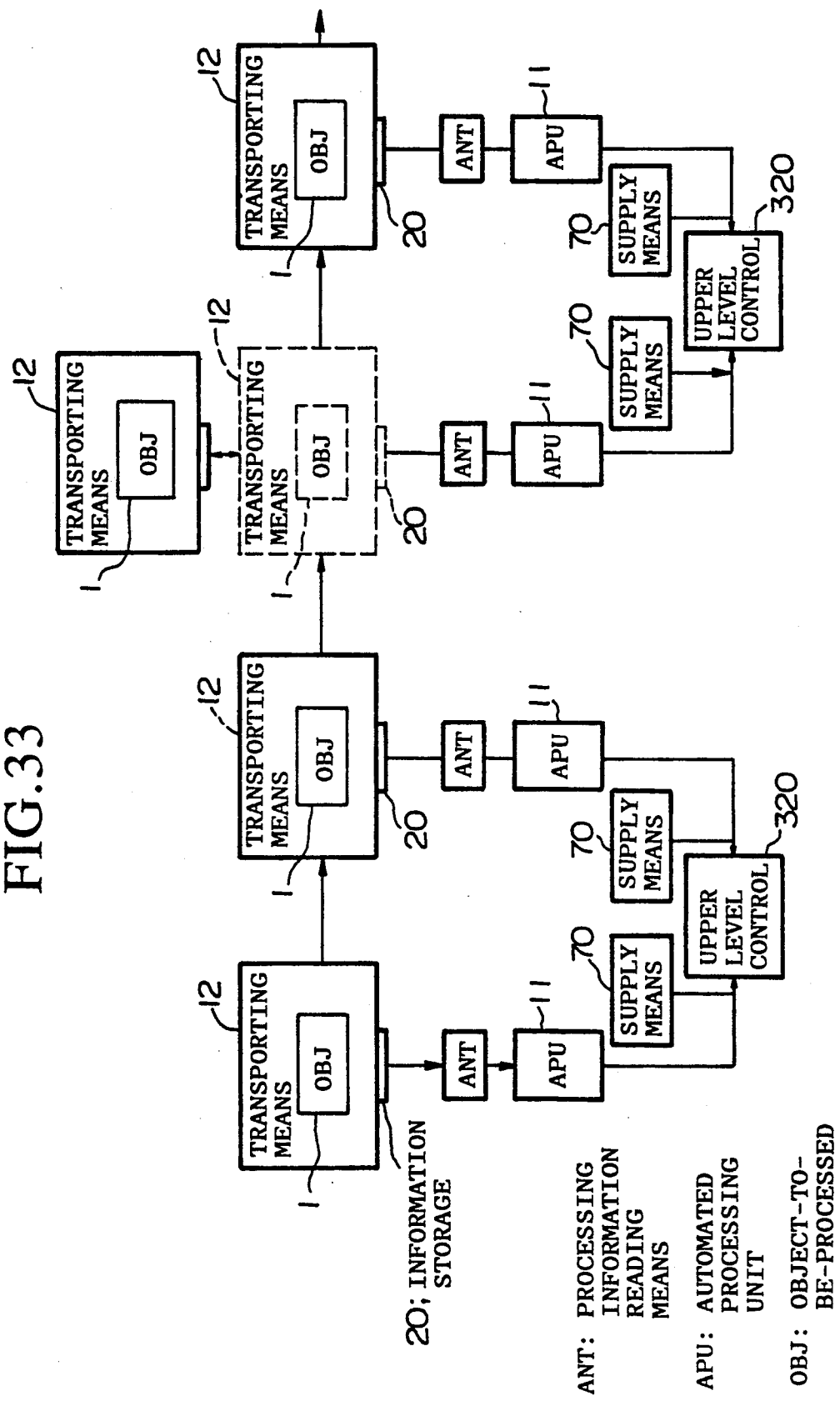
FIG. 33 is a schematic block diagram for analyzing according to functions the configuration necessary for the data transfer processing conducted in the third embodiment, as analyzed according to functions.

FIG. 32 and FIG. 33 show the third embodiment of the present invention. In the above embodiments, when an OBJ develops trouble which cannot be easily coped with immediately, it is usual practice to remove this OBJ from the production line by the worker. However, the conventional system which controls the production line does not allow prompt central monitoring of the information about the removed OBJ or the information on any other changes as stated above. It is desirable to be able to promptly obtain the updated production control information.

In consideration of the above problems, this embodiment aims to increase the through-put of the production line and to obtain the latest, most accurate production control information using ID information.

As the production line in the third embodiment has the same fundamental constitution as that in FIG. 1, only their differences will be explained. The numeral 70 in FIG. 32 shows an abnormality-data input device which feeds abnormality data into the multiple panel 40. This abnormality-data input device 70 is connected to each APU in parallel. A body moves close to a specified APU on the production line to be processed. When the body develops trouble which cannot be repaired immediately, or the proceeded body is moved again to the upstream side of the production line, the abnormal data or the change information is arranged to be input from the abnormality-data input device 70 to the multiple panel 40 and, via the data manager 42, transferred to the office terminal 45 so that the information on the production of bodies is always edited and displayed.

The abnormality data input from the abnormality data input device 70 is arranged to rewrite the body information of plural bodies stored on the ID plate 20 of the automated transport dolly which succeeded the removed body. Thus, the ID data is always updated and the time needed to prepare the processing of each APU is shortened.

When a body is brought back to the front of the input area 15, the following processing is conducted. The ID plate 20 of the automated transport dolly 12 on which the returned body is loaded is entered with the ID information of the corresponding body. Therefore, in the write processing at the input area 15, the read output Sr of the read circuit 53 corresponds to the ID information, so that a signal Sa is output from the clear circuit 54 and all write operations in the write circuit 51 are forbidden. By this, the loss of data to be held is prevented. In this case, the body to be transferred from the preceding production line is arranged to be loaded on another automated transport dolly 12 of which the ID plate has been cleared. As has been explained, according to the present invention, when a point to be repaired (such as a strain) appears on an OBJ moving on a production line and the point cannot be repaired immediately, or when an OBJ which has been processed is transferred again to the upstream side of the production line, as the information on the removal or transfer is supplied to the host computer by a supplier, the operation contents of the APU (which works based on the operation information supplied from this host computer) can be rapidly changed, thereby markedly improving the working efficiency of the APU.

Furthermore, the production control information on all OBJs over the entire production line can be obtained by outputting the information on the removal or introduction of OBJs to the host controller through the information supplier.

The constitution of the third embodiment is constructed according to function as shown in FIG. 33.

As shown in FIG. 33, the production control system relating to the present invention is provided with a transporter 12 which is loaded with an OBJ 1 transferred from the input area of the production line and transports the OBJ from the input area to the output area on the production line, and a processing information reader ANT which reads the storage medium 20 installed on this transporter 12 and a storage medium 20 which stores the processing information concerning the OBJ 1 sent beforehand based on the production control information from the host control information from the host controller 320 and a supplier 70 which supplies information about the removal or introduction of an OBJ to the host controller 320 when an OBJ 1 in a production line where an OBJ is subjected to a prescribed processing by sequentially actuating a number of APUs 11 disposed along the moving direction of OBJs 1 based on the operation information given from a host computer in accordance with processing information stored in a storage medium, when an OBJ 1 undergoing continues processing is removed from the production line or an OBJ is brought into the production line.

According to a production control system having the above constitution, when an OBJ moving on a production line is impaired by trouble (such as strain) that cannot be corrected immediately, or when a processed OBJ 1 is brought back into the upstream side of the production line, since the information on this removal or introduction is supplied to the host controller 320, the operation contents of the APU being actuated based on the operation information from the host controller 320 is rapidly changed, and the working efficiency of the APU is thereby significantly improved. The extraction of introduction information output from the supplier 70 to the host controller 320 provides production control information over the entire production line.

The central supervisory system can be detect cases where, out of the OBJs moving in succession, an OBJ develops trouble which cannot be easily managed, such an OBJ is extracted from the production line by the worker, or various information is changed.

Figure 34:
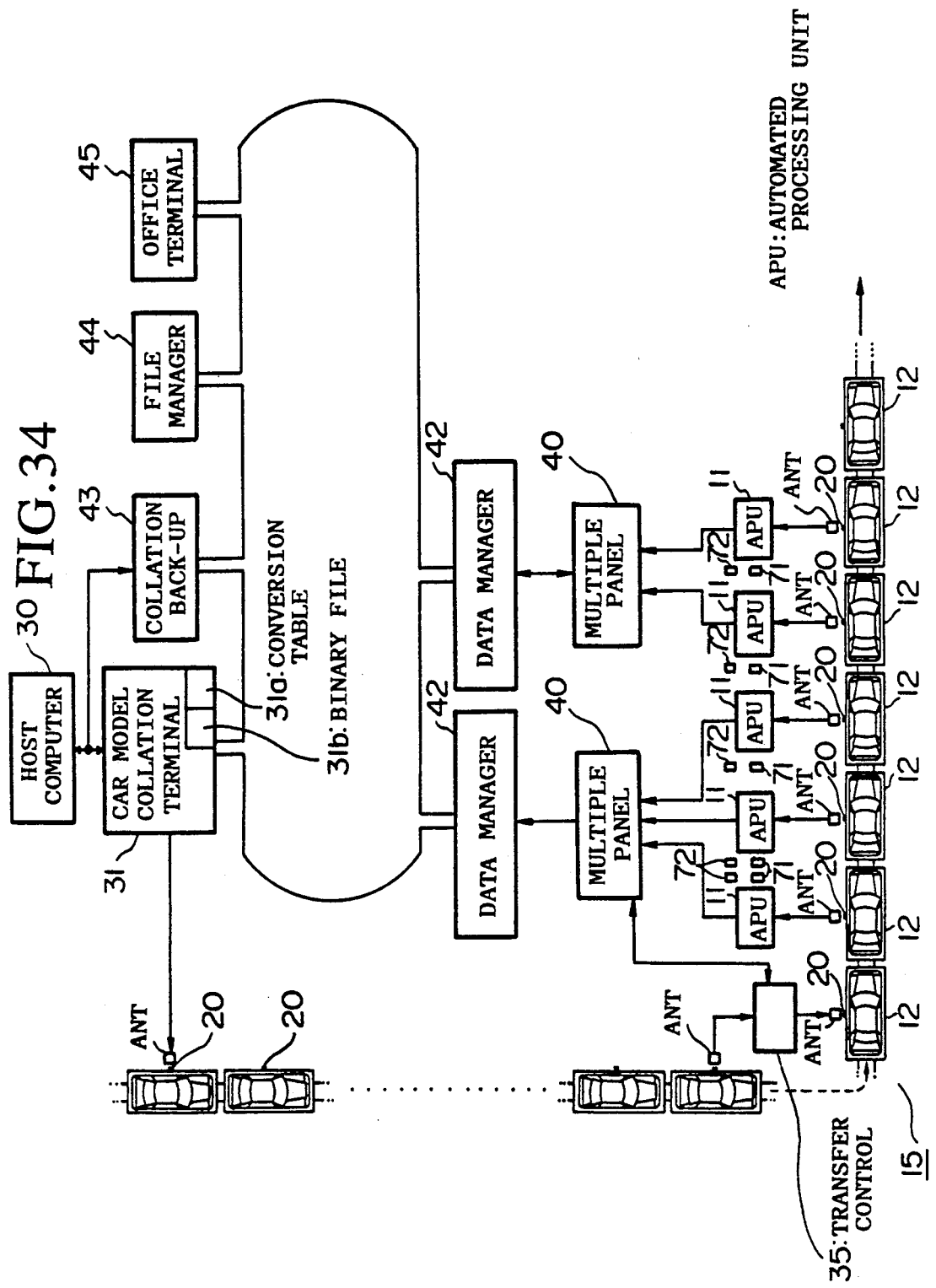
FIG. 34 is a schematic block diagram showing the electrical configuration of a fourth embodiment of the present invention applied to the production line of FIG. 1.
Figure 35:
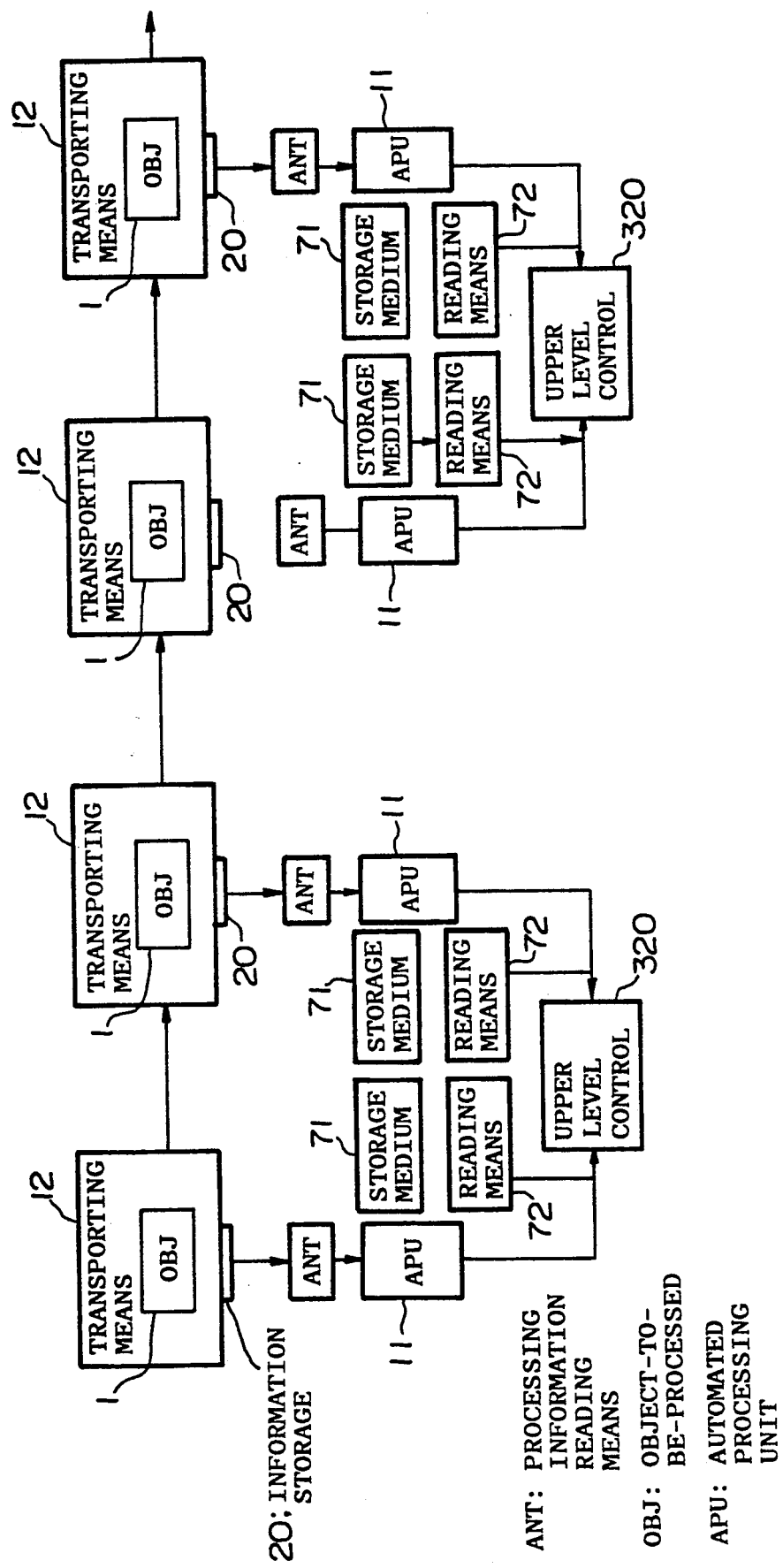
FIG. 35 is a schematic block diagram for analyzing according to functions the configuration necessary for the data transfer processing conducted in the fourth embodiment.

FIG. 34 and FIG. 35 show the fourth embodiment of this invention. It is feared that in the embodiments thus far explained that when a part of the data of the ID plate which stores prescribed processing information of an OBJ is destroyed, each APU will sustain read failure and be unable to obtain the processing information of the OBJ, thus forcing the entire production line to suspend operations until the destroyed ID plate is restored.

This embodiment, given in consideration of the above problem, aims to present a production control system which can cope with cases in which the confidential data recorded on an ID plate or the like is destroyed and further aims to conduct normal processing of OBJs in the production line.

This fourth embodiment has a fundamental constitution identical to the above-stated third embodiment. Hereafter, the differences between these embodiments will be explained. The numeral 71 in FIG. 34 shows a card-type storage medium storing processing information concerning a body. This storage medium 71 stores the information processing of a body by means of a magnetic storage or bar-code storage and reads processing information using a handy type card connected to each APU 11 in parallel and outputs the processing information of the body read from the storage medium 71 to the multiple panel 40. The storage medium 71 and read unit 72 are set close to the APU 11 so that the worker can remove them easily, and the storage medium 71 is composed of a number of members which store the same processing information as all ID plates 20 mounted on the automated transport dollies moving to the working area of each APU 11.

The above-stated control system is summarized by function as shown in FIG. 35. This system is provided with a transporter 12 which transports OBJs sequentially from the input area of a production line; a processing information reader ANT which reads information from the storage medium 20 installed on the transporter 12; and a storage medium 20 which stores the processing information concerning the OBJ 1 sent from the host controller 320 beforehand based on the production control information.

In the production line which applies prescribed processing to an OBJ 1 by actuating a plurality of APUs disposed along the moving direction of the OBJs based on the operation information given from the host controller 320 corresponding to the processing information stored in the storage medium 20, each APU 11 is provided with a storage medium 71, which stores the processing information concerning the OBJ 1, and a reader 72 which reads the information of this storage medium 71 and outputs the information to the host controller 320. The function of the host controller 320 is obtained from instruments such as the file manager 44 and the office terminal 45.

According to the above constitution, each APU 11 has a constitution that arranges a storage medium 71 which stores the processing information concerning the OBJ 1 and a read unit 72 which reads the information of this storage medium 71 and outputs it to the host controller 320.

Accordingly, even when the processing information regarding the body 1 which is stored in the storage medium 20 installed on the transporter 12 is destroyed, the processing information is output to the host controller 320 by making the reader 72 read the prescribed storage medium 71, and the corresponding operation information is output from the host controller 320 to the APU 11. The APU is thereby actuated normally and processing is applied to the body 1.

Since it is unnecessary to temporarily suspend the production line to repair the storage medium 20, the production capacity of the production line is improved.

Figure 36:
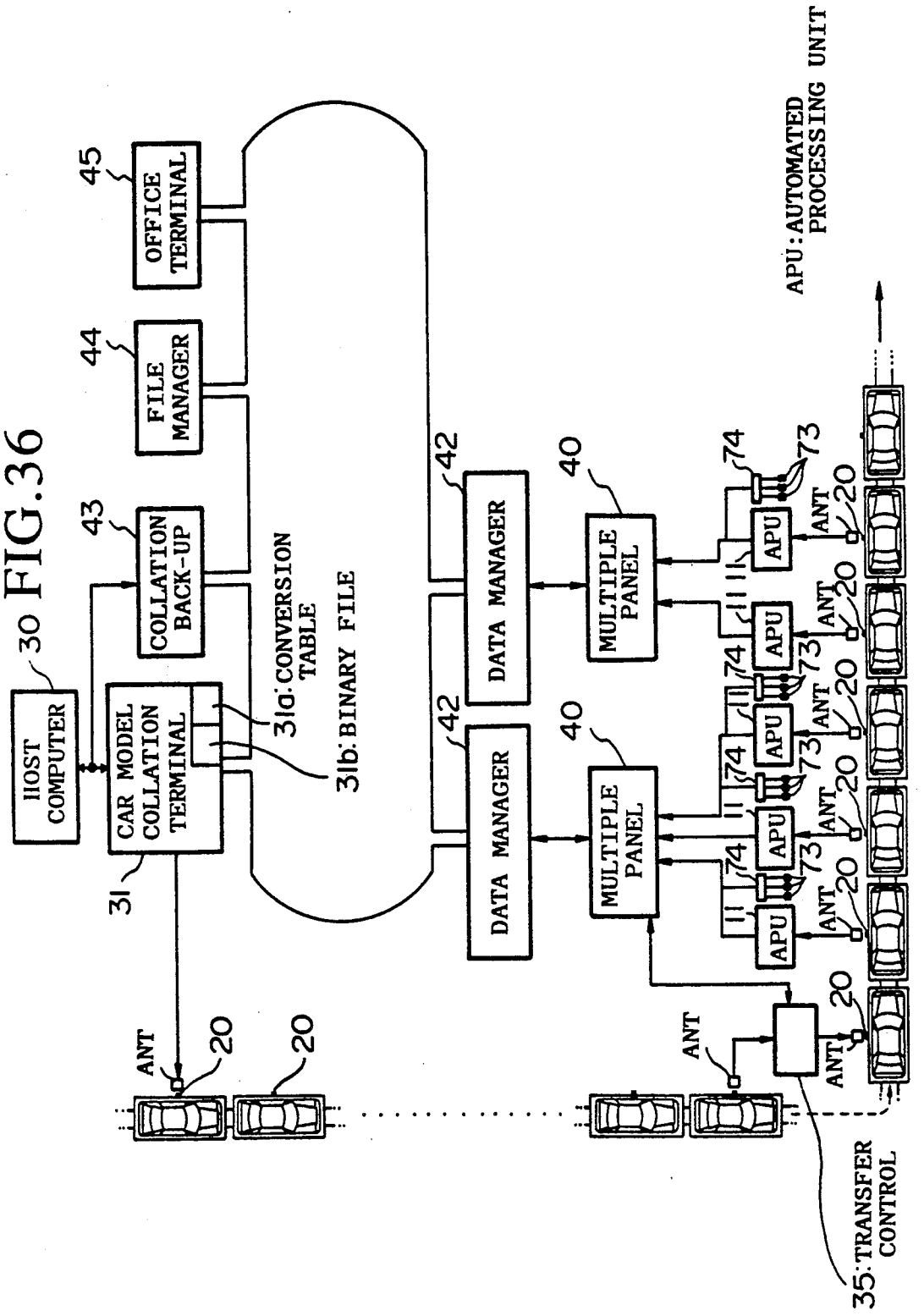
FIG. 36 is a schematic block diagram showing the electrical configuration of a fifth embodiment of the present invention applied to the production line of FIG. 1.
Figure 37:
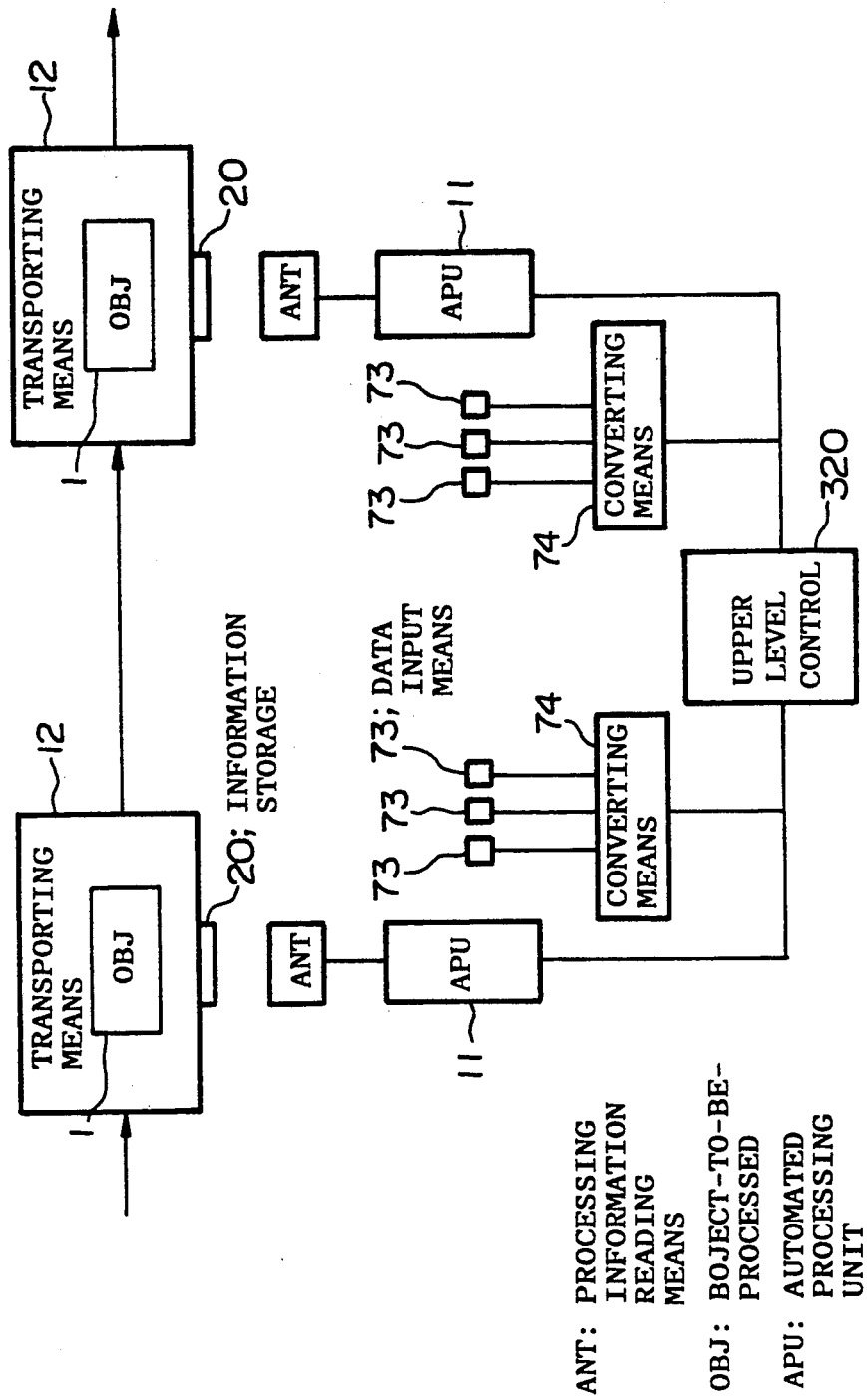
FIG. 37 is a schematic block diagram for analyzing according to functions the configuration necessary for the data transfer processing conducted in the fifth embodiment.

FIG. 36 and FIG. 37 show the fifth embodiment of this invention. This fifth embodiment is fundamentally identical in constitution to the third embodiment. Hereafter the differences between these embodiments will be explained.

The numeral 73 in FIG. 36 shows the inputters which are installed in different positions of the production line and input the body data. Concrete examples of inputters 73 are: a bar code reader system which reads the card storing the body data by the bar code storage; a keyboard system in which a worker inputs the data; and a touch panel system in which a worker inputs the body data by selecting picture information. Thus, the inputter 73 has a structure in which the above plural input methods are arranged in parallel and a worker can select either means. Furthermore, a conversion unit 74 is disposed between these inputters 73 and the multiple panel 40 and conducts conversion processing so that the data input from a number of inputters 73 assumes the same format as the data of the multiple panel 40.

When, for example, the ID plate 20 of the automated transport dolly 12 moving on the production line is destroyed or cannot be input, the body information is input by any inputter disposed at different positions on the production line, and the information is conversion-processed so as to assume the same format as the data of the multiple panel 40 and output to the multiple panel 40. The information output to the multiple panel is recognized by the file manager 44, thereby enabling confirmation of the operating conditions by a working condition monitor at the office terminal 45. In the first input area of the entire process, the ID information is written onto the ID plate 20. All APUs then perform automated processing by reading the operation factor code in the ID plate 20. For example, in the APU 11 of the processing station shown in FIG. 1, the operation factor code concerning the incoming body is read from the ID plate via an antenna ANT, and the prescribed processing is performed according to this operation factor code. This operation is conducted in a similar manner in other processing stations 2-9. Let us assume that the ID information is lost on the ID plate 20 installed on the automated transport dolly 12 moving on the production line. In this case, the worker selects one of many inputters 73 set at different positions of the production line and inputs the same information as that lost to this selected inputter. The ID information output from this inputter 73 is conversion-processed in the conversion unit to be output to the multiple panel 40. The APU 11 applies normal processing to the body by conducting transfer of operation information from the multiple panel 40 to the APU 11. The multiple panel 40 recognizes the processing information obtained from an inputter 73 and sends the information to the file manager 44. The manager 44 can then find abnormalities in an ID plate 20, which has moved to a specified APU 11, on an operation status monitor at the office terminal 45.

The production control system in the fifth embodiment is analyzed by function as shown in FIG. 37. The production line is provided with a transporter 12 to transport an OBJ 1 sequentially from the input area of the production line, a storage medium 20 installed on this transporter 12, a host controller 320 which sets and holds the content of processing concerning the OBJs 1 of the production line and communicates the content of processing using a network, a processing information reader ANT which reads the storage medium 20 that stores the processing information sent from the host controller 320 based on production information concerning the OBJ 1 and in which the OBJ 1 is subjected to a prescribed processing by sequentially operating a plurality of APUs disposed along the direction of OBJs 11, based on the operation information sent from the host controller 320, in accordance with the processing information stored in a storage medium 20; the production line is further composed of a plurality of inputters 73, such as a bar code reader and a keyboard that inputs the processing information concerning OBJs into the network, and a converter 74 which converts the information inputted from these inputters 73 to adopt the same format as that of the information on the content of processing sent from the controller 320.

According to the above constitution, the production line is provided with a plural number of inputters, such as a bar code reader and a keyboard that inputs processing information concerning the OBJs 1 to the network, and a converter 40 that converts and processes the information inputted through these inputters 73 to assume the same format as the information on the content of processing of the host controller 320.

Consequently, even when the processing information concerning OBJs stored in the storage medium 20 installed on the transporter 12 is destroyed, such information is output from any of the prescribed inputters 73, installed on different points of the production line. The information is then converted by the converter 74, and outputs to the host controller in the format specified above. Next, the host controller correspondingly outputs operation information to the APU, which thereby operates in a normal condition to process the OBJ 1. In this case, since no temporary suspension of the production line is required for restoration work of the storage medium 20, the capacity of processing OBJs 1 is improved.

The sixth embodiment is explained with reference to FIG. 38.

According to a detailed analysis, the APU 11 installed on the production line shown in the first to the fifth embodiments, such as those shown in FIG. 1 and FIG. 3, is composed of an operation unit 80 giving required functions and a control unit 81 such as a sequence controller controlling this working part as shown in FIG. 37. This control unit 81 stores various operation patterns in accordance with car models; more specifically, the individual types of operations that are proceeded by the operation unit 80 of the corresponding APU, and unit 81, thereby controls the operation unit 80 following any one of the operation patterns in accordance with the operation factor code read from the ID plate 20.

Figure 38:
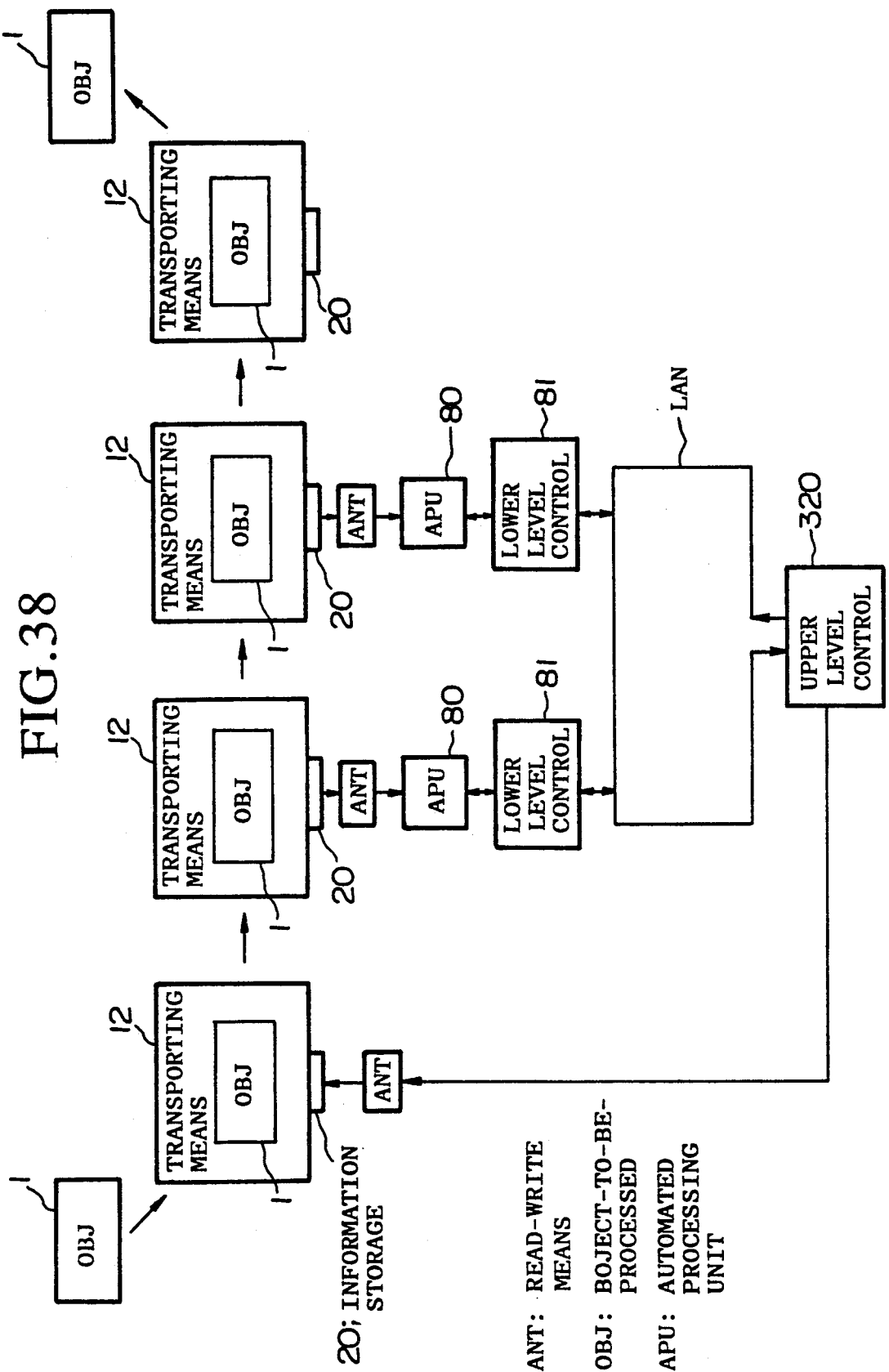
FIG. 38 is a schematic block diagram for analyzing according to functions the configuration necessary for the data transfer processing conducted in a sixth embodiment.

Referring to FIG. 38, in a production system provided with a transporter 12 that transports a body 1 from the input area to the output area in the production line and, after sending out the body 1, moves again to the input area to circulate the production line and a number of APUs (specifically their operation units 80) which sequentially process the body 1 transported by the transporter 12 along the production line, the APU comprises a storage medium 20 that is installed on a transporter 12 and stores product identification information or the like which is input for each body 1, a read-writer ANT that is installed on the APU 11 and writes information to the storage medium 20 or reads information from the storage medium 20 and outputs it, a subordinate control unit 81 that selects an operation pattern corresponding to the output of the read-writer ANT from among a plurality of operation patterns stored in advance in accordance with the output of the read-writer ANT, controls the operation unit 80 and outputs the data of the body 1 under processing in the operation unit 80, and a host controller 320 that outputs the product identification information to the storage medium 20 via the read-writer ANT and inputs it with the data via the network LAN.

According to the above constitution, since an APU 11 of the production line processes a body 1 using the subordinate control unit 81 in the operation pattern which is selected from a number of operation patterns stored beforehand in accordance with the product identification information which is stored in the storage medium installed on each transporter 12, the worker has no need to input instruction data to the APU by judging the car model of the body 1. Accordingly, erroneous judgement and input errors by the worker do not cause the APU to malfunction.

The host controller 320 supervises the progress of each process in the production line by returning the OBJ data, including the time required for processing OBJs in each APU 11 and the product identification information of bodies 11 processed by the APU 11, to the host controller 320.

The configuration in FIG. 38 will be explained with reference to the production line shown in FIG. 3.

The control unit 80 corresponds to the sequence controller of each APU 11 and the multiple panel 40 to which the sequence controller is connected. On the other hand, the controller 320 corresponds to each terminal instrument constituting the LAN, the model collation terminal 31, the collation back-up 43, the file manager 44, the office terminal 45, the data manager 42, and the host computer 30, which in turn connects to the model collation terminal 31 and the collation back-up 43. The control unit 80 functions as a subordinate controller relative to the controller 320. In a small-scale production line, the multiple panel 40 functions as a host controller relative to the sequence controller of each APU 11. In such configurations, the ID information concerning the body being processed by an APU 11 or the result (such as processing time required) of processes based on this ID information, is sent to the multiple panel 40. This panel 40 transmits the information fed from a number of APUs 11 to each terminal of the network via the data manager 42. The office terminal 45 which is connected to the network, displays the ID information of the body 1 that is being currently processed in each process on the production line, or displays information on the results of processing on a display device. Accordingly, each office terminal can confirm the preceding state of work or point to problems, if any arise. Each terminal is connected to the other terminals in the network, and can call up information in each process at any time. For example, if a problem develops and a body is removed from the production line, the information on the removed body 1 can be deleted by calling up the situation at any terminal of the LAN, such as the model collation terminal 31, the collation back-up 43, the file manager 44, the office terminal 45, the data manager 42, in APUs in other constitutions or in the multiple panel 40 connected to the APUs. Furthermore, even when the body 1 is removed and later returned to the production line, the information on the OBJ can be supplied to APUs 11 of other processes.

Referring to FIGS. 39-46, the seventh embodiment will be explained.

An APU used in the above process operates robots along prescribed tracks, and sets the work required for various work tools supported by these robots to operate in accordance with the operation program corresponding to the operation factor code. As a work tool to be attached to the above robot, for example, a wrench may be attached for fastening bolts and nuts to maintain the fastening torque for the work within a prescribed range. A welding machine must also maintain its resultant welding current within a prescribed range, and the atomizing pressure of paint for paint coaters must also be maintained within a prescribed range.

To satisfy these requirements, in the conventional production line control system, the result of the work is monitored visually by a worker on the display. If an abnormality occurs in the resulting work, the corresponding OBJ is subjected to repair work after being removed from the production line.

However, such extraction or the returning of the repaired OBJ might disturb the order of OBJs on the production line. In the circumstance in which OBJs are continuously fed into many APUs, it is difficult to correctly determine which OBJ has developed a problem and what kind of problem is involved, and to select the necessary repair work suitable to the nature of the abnormality.

The purpose of this embodiment is to control the results produced by the work tools.

The ID plate used as a storage medium is attached to an automated transport dolly 12 and is similar to the one shown in FIG. 4 of the first embodiment. The ID plate 20 has storage regions $20a$-$20d$ storing both of the numbers of the car which is an OBJ loaded on an automated transport dolly with this ID plate 20 attached. The operation factor codes Cn show the content of processing to be executed for the car of this number n in each process, and are electrically recorded as for cars with numbers ranging from n to n+i (i=3 in this embodiment).

Figure 39:
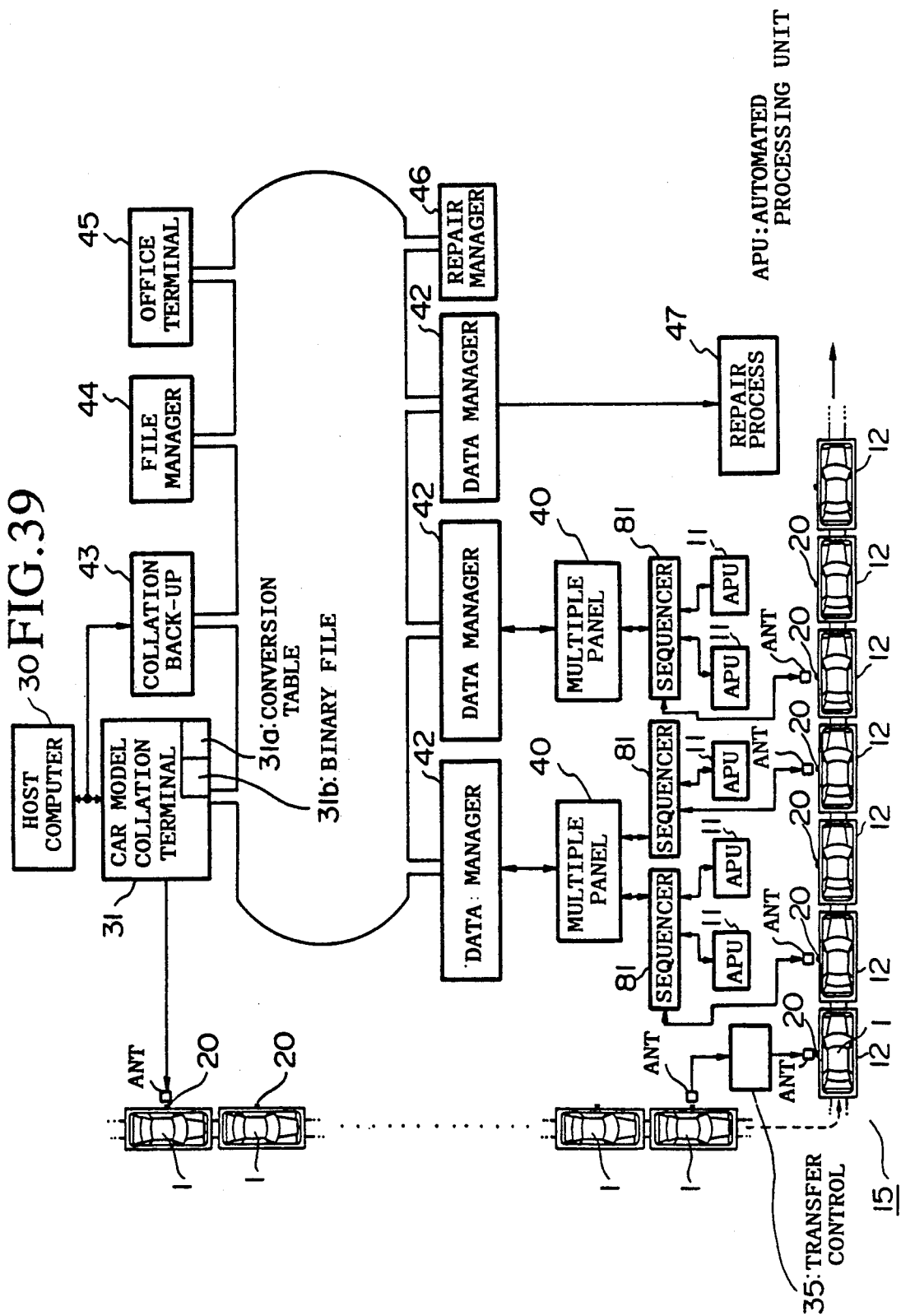
FIG. 39 is a schematic block diagram showing the electrical configuration of a seventh embodiment of the present invention applied to the production line of FIG. 1.

The configuration of the entire production control system controlled by the ID plate 20 is explained in FIG. 39.

A mark 30 indicates a host computer. When body information Db showing the kind, form of destination, and optional specification, etc., relating to an OBJ 1, the car of a particular number n, is output from this computer 30, the operation factor code Cn on the content of control (content of processing in each process) for each APU in accordance with this body information Db is output from the model collation terminal 31, and is written in the ID plate 20 together with the number data n through the write/read ANT.

This ID plate 20 is attached to an automated transport dolly 12 (or the car itself) loaded with the subject body 1 of number n and moved through each process along with the corresponding car 1, and a write-reader ANT attached to the APU 11 in each process reads the car number n the code Cn from the ID plate. Each car 1 is processed in accordance with the operation factor code Cn by controlling the corresponding car 1 in accordance with the factor code Cn read by the reader ANT. If an OBJ must be transferred from an automated transport dolly 12 to another dolly 12 because the production line ranges over several levels, the corresponding data is read once into the reader ANT and is then written into the ID plate of the other dolly 12, thereby enabling the corresponding data to be moved together with the dolly 12. If the corresponding dolly is empty, that is, if an OBJ is eliminated from a dolly 12 due to detection failure, or for some other reason, the data indicating the situation is written into the ID plate of the corresponding dolly 12, or the operation factor code Cn for the corresponding car is erased. The APU 11 is connected, usually grouped together or individually to the sequencer 81 and, via this sequencer 81, to the multiple panel 40 to output the data regarding the work situation. Thus, the work status, the numerical order of cars for which work is finished, and the time required for work, etc., of each of the grouped APUs is collected by the multiple panel 40 and is supplied to other terminals connected to the LAN. The sequencer 81 reads information from the ID plate by controlling the read controller ANT and at the same time, the sequencer 81 specifies the content of work to be executed by subordinate APUs 11 on the basis of the read information.

In this embodiment, via the data manager 42, the multiple panel 40 of each production line is connected to the LAN (Local Area Network), through which the panel 40 communicates with the model collation terminal 31, the file manager 44, the office terminal 45, and others. As the configuration of this network system is the same as those in the first to sixth embodiments, explanation is omitted.

Furthermore, the LAN is provided with a personal computer 46 that serves as a repair control unit to summarize data on the results of individual work for cars of each input number from the panel 40. For example, data supplied from the sequencer 81 of each APU 11 and related to the fastening torque of nuts, injected amount of liquid, etc., is collated with the corresponding reference data at the multiple panel (or sequencer) to determine whether the data is within the control range or not, so that the data on the work obtained as a result of collation is supplied to the repair control unit 46 along with the input data. If such data is shown to be abnormal (outside the control range), the repair unit 46 supplies information on the situation and the content of repair service required, in accordance with the repair process 47.

The repair process 47 is the redoing process for that executed by an APU 11 on the upstream side of the APU concerned, and is composed from an APU having a function, such as fastening nuts, liquid injection, etc., identical to that of at least one of the APUs 11 located on the upstream side, a worker for doing the above process, a display device for reporting the content of work to the worker, an automatic supply supplying repair parts and repair tools to the worker. Needless to say, the repair process is not necessarily installed furthest downstream along the production line, but can be installed somewhere along the production line (downstream from the APU to be repaired) so as to be able to apply processing equivalent to that of any APU on the upstream side of the position.

Next, an embodiment of the above configuration will be explained.

First, body information is successively output from the host computer 30 in accordance with a production plan. This body information is converted to an factor code at the model collation terminal 31, following the text file. The ID plate 20 of a body is output with the corresponding operation factor code at the initial input area of the process. Thereafter, each APU proceeds to conduct automatic processing by reading the operation factor code stored in the ID plate 20. In this case, the operation factor code is formed in accordance with each car model. Therefore, even when different kinds of cars are run on the production line, the processing of each APU 11 can adapt according to the situation. Since the operation factor code determines only the fundamental action of each APU, its combination can be suitably changed to provide a large freedom of APUs. Accordingly, in case of drastic change in car models, an operation factor code adapted to the content of change can be prepared to allow the prompt response of each APU on condition that the text file in the model collation terminal 31 be rewritten in compliance with the content of change.

Figure 40:
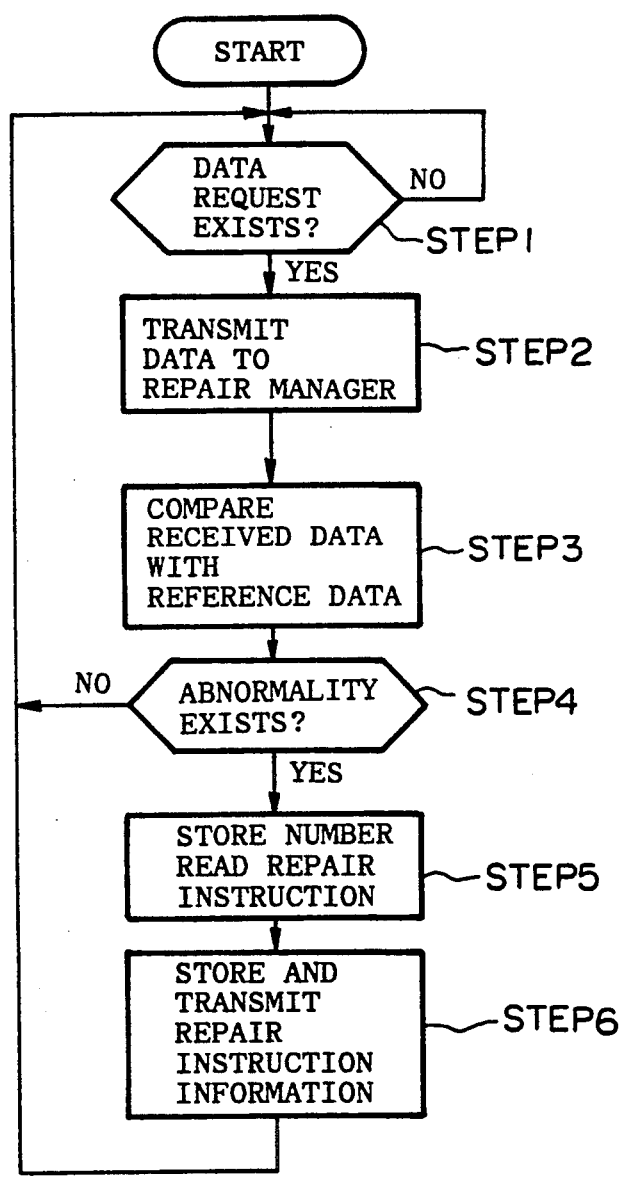
FIG. 40 is a flow chart for the repair processing in the seventh embodiment of the present invention.
Figure 41:
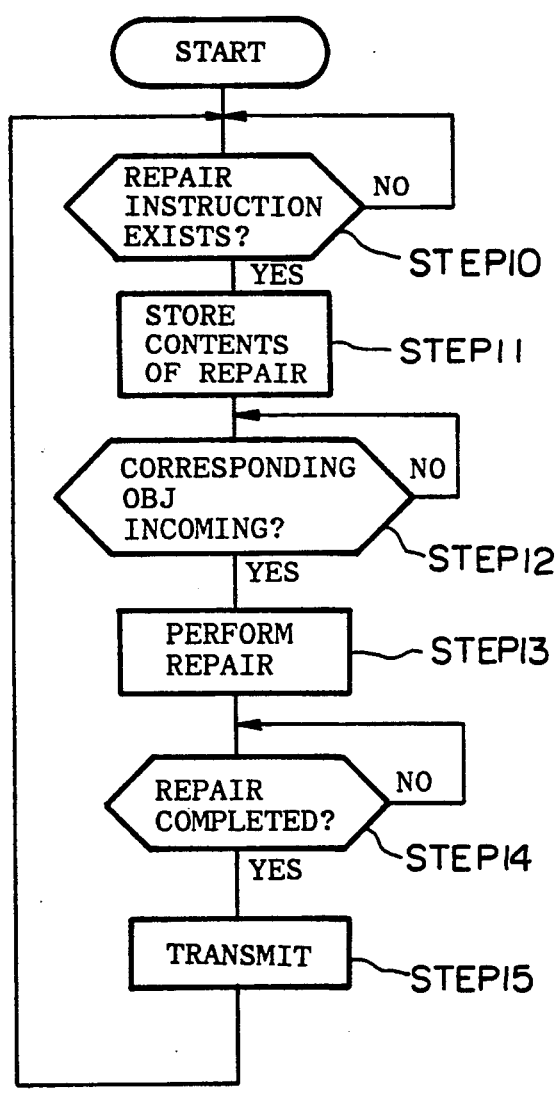
FIG. 41 is a flow chart for the repair processing in the seventh embodiment of the present invention.

The content of the repair controlling and processing operations will be explained with reference to FIG. 40.

Each APU 11 is provided with a sensor (not shown) to detect its operation results (operational status). The data related to the results of operation (e.g., propriety of fastening torque and liquid injection) is output from the sensor as well as the information (at least, identification data for specifying the OBJ and its input number) on the OBJ read from the ID plate are supplied to the multiple panel 40 and further to the repair control unit 46 via the LAN. The information is supplied further to the repair process 47. Since, in a small-scale production line consisting of a small number of APUs, the LAN is not constructed, the repair information and the identification data are transmitted directly to the repair process 47.

The multiple panel 40 functions as a controller superior to the sequencer 81, which is a controller for each APU. The multiple panel 40 places the demand to output operation results data on the control unit 81 of the APU 11 at specified intervals (for example, for each OBJ, or for a prescribed number of OBJs) and determines whether such demand exists or not (Step 1). If the judgement is affirmative, the operation results data is input to the multiple panel 40 (Step 2). The panel 40 compares the supplied information on the operation results with the reference data on the respective processes (Step 3). The panel 40 also judges the propriety of repair based on this results (Step 4). If it is judged, as a consequence of the previous results, that repair is unnecessary, information on the operation results relating to the next OBJ is not input until after returning to step 1. When repair is deemed necessary, the panel 40 transmits the data instructing repair and the data identifying the corresponding OBJ to the repair control unit 46 via the LAN (Step 5). The transmitted data instructing repair is stored in the repair control unit 46, which acts as a host controller (Step 6), and the information stored in the repair control unit 46 is supplied to the repair process 47 together with the information for identifying the OBJ. The identification data on the OBJ having undergone the repair instruction and the content of information on repair instruction may supplied to other terminals connected to the LAN. The information on the identification of the OBJ and repair instructions is recorded and stored in the repair control unit 46 or some other instrument having received the information from the repair control unit 46. The repair process is explained with reference to FIG. 41.

The controller (not shown) installed on the repair process waits for the identification data and the repair instruction information to be input from the repair control unit 46 (Step 10). When this identification data is input, the information is stored (Step 11). Subsequently, the body designated for repair is waited for (Step 12). When the body 1 requiring repair arrives, specified processing is applied to the body 1 according to the repair instructions (Step 13). Specifically, this processing is completed by instructing a specified operation to the sequencer 81 of the APU installed in the repair process, or by displaying the work contents on some display, (an electrical display such as an EL display, a CRT display, or a document printed with the content of the corresponding repair processing) in order to be seen by the workers who are ready to conduct the repair.

It may be natural to set a preparatory process for supplying tools and parts required for the repair process 47 depending on the content of the repair instruction in a production line different from the original line for the flow of bodies 1 and supplying the above information on repair instruction to this preparation process for repair. Then the workers are on stand-by until the repair is completed (Step 14). The judgement as to whether the repair is completed or not may be made on the basis of either of the following criteria:

1. Completion of the reproduction of a specified repairing action program in the APU 11 installed on the repair process.
2. Manual operation (e.g., switching operation indicating the finish of repair) by workers in the repair process. completed is recognized by the sequencer 81 of the repair process 47. When repair is completed, the information that the repair is completed is output from the sequencer 81 of the repair process 47 to the repair control unit 46 via the LAN (Step 15).

While the repair information is set to be controlled by the repair control unit 46 connected to the LAN in the above embodiments, it is naturally possible to allow other instruments connected to the LAN to execute the process to be executed by the repair control unit. The results of functional analysis on all devices executing a repair process in the above production control system may be represented as in FIG. 41.

A number of processes 401–403 in the work production line have installed sensors 404–406 to detect the respective process statuses. The detection data of these sensors 404–406 is supplied to the repair discrimination unit 407. This repair discrimination unit 407 is usually the multiple panel 40 managing, for a number of sets, the sequencers 81 of the APUs on the production line shown in FIG. 38, but it may be replaced with other multiple panels connected to this panel 40 via the LAN or other host controller on the LAN. On the other hand, the reference data storage unit 408 attached to the repair discrimination unit 407 stores the reference data on the processing situation in each process, and these reference data are arranged to be compared with the detection data by the repair discrimination unit 407 to compare the data supplied from the sensors with the reference data to determine whether repair is needed or not. The repair instruction storage unit 409 stores the contents of repair processing, depending on the abnormality detected; for example, messages for instructing the repair processing to be executed, or the repair instruction information indicating the optimum action program of APU in the repair process. This repair instruction information is selected by the results of discrimination issued from the repair discrimination unit 407 to be output. Thus, output repair instruction information is supplied to the APU 410, which executes repair processing or the repair process 412 composed from a display unit 411 displaying the message which instructs the contents of repair to execute the prescribed repair. The results of repair in the repair process 412 are judged by a repair completion judger (sensor 413 installed on the APU 410 or a completion reporting switch 411 installed for manual operation) to be stored in the repair information storage medium 415.

The repair process 415 is not necessarily installed separately from the usual production line. If an abnormal process happens to occur, for example, in process 401, the repair contents can be shown on a display (the display part of the sequencer in the process) installed on the process 403, or to actuate any of APUs installed on the process 403. That is, the repair process can be replaced by any process constituting the usual production line.

The above embodiment demonstrates that the results of judgement relating to the propriety of repairing by means of a multiple panel is supplied to the repair process together with the identification data of OBJ via a host controller. Alternatively, the results of judgement as to the propriety of repair can be written directly in the ID plate 20 of the body 1, which necessitates the corresponding repair utilizing the reader ANT installed on each process. As stated above, when the propriety of repair is written in the ID plate, necessary repair processing can be conducted in the repair process 412 by reading the information on the ID plate and judging the propriety of repair in the process 412.

The above display 411 indicates the repair contents to be instructed to the worker from the repair discrimination unit 407.

Figure 42:
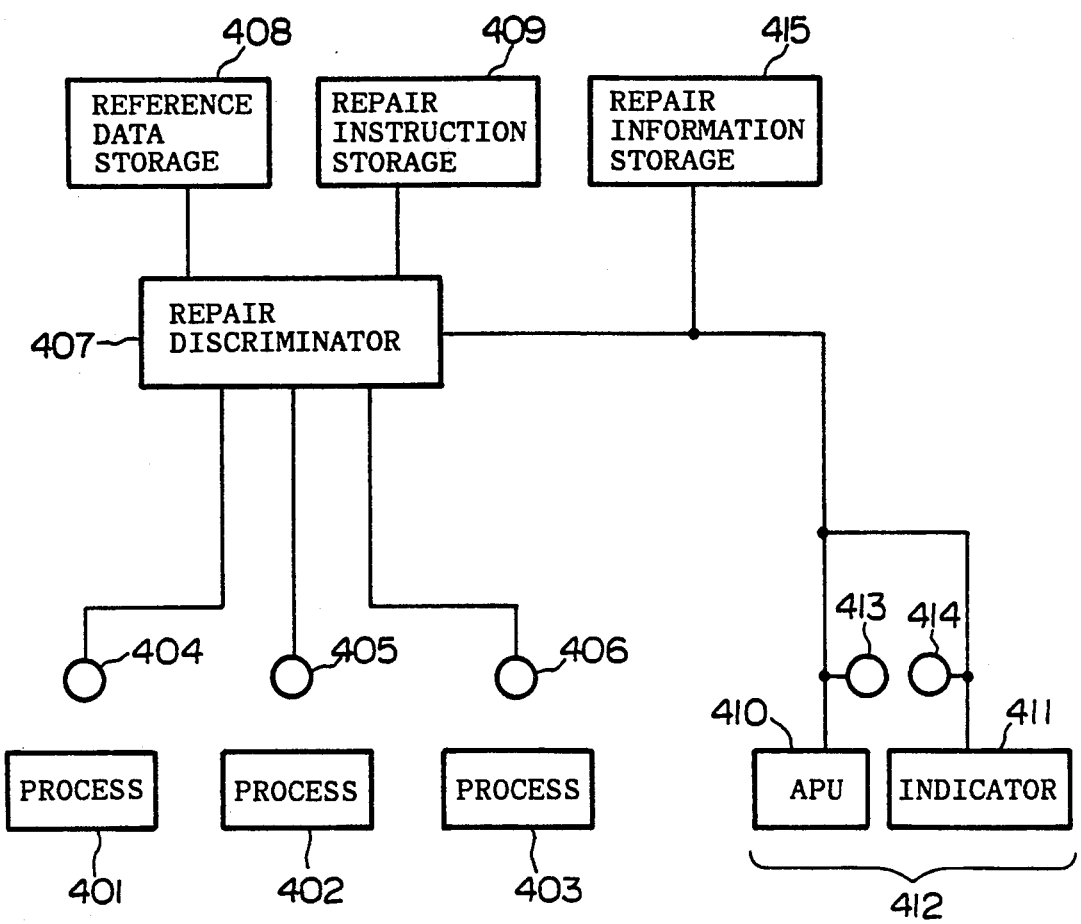
FIG. 42 is a schematic block diagram for analyzing according to functions the configuration necessary for the repair processing in the seventh embodiment.
Figure 43:
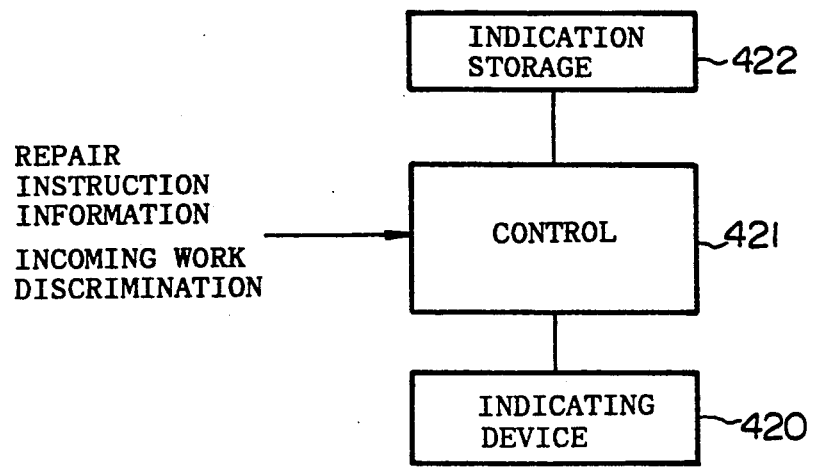
FIG. 43 is a schematic block diagram showing the configuration of the repair processing in the seventh embodiment.

Its concrete constitution is explained by referring to FIGS. 42–43 in the following. The display consists of a display 420 such as an EL display, or a CRT display, etc.; a control unit 421 for controlling this display 420; and a picture data storage unit 422 which stores the picture data to be displayed on the display 420.

When repair instruction information is supplied, the control unit 421 retrieves the picture data corresponding to the repair instruction information from the display content storage unit 422 and displays the picture data on the display 420, provided that the corresponding OBJ is fed into the repair process 412.

A concrete example of instructing the repair contents as stated above is given in the following. For example, when it is determined in the control unit 407 that the tightening torque of a tire-fitting-nut related to an OBJ X is insufficient, the repair instruction information that "tightening adjustment of a tire-fitting-nut Y with regard to an OBJ" is required, is supplied to the control unit 421 of the repair process 412. The control unit 421 retrieves the picture data corresponding to the tightening adjustment of a tire-fitting-nut Y from the displayed content storage unit 422 and displays the picture data on a display 420.

Figure 44:
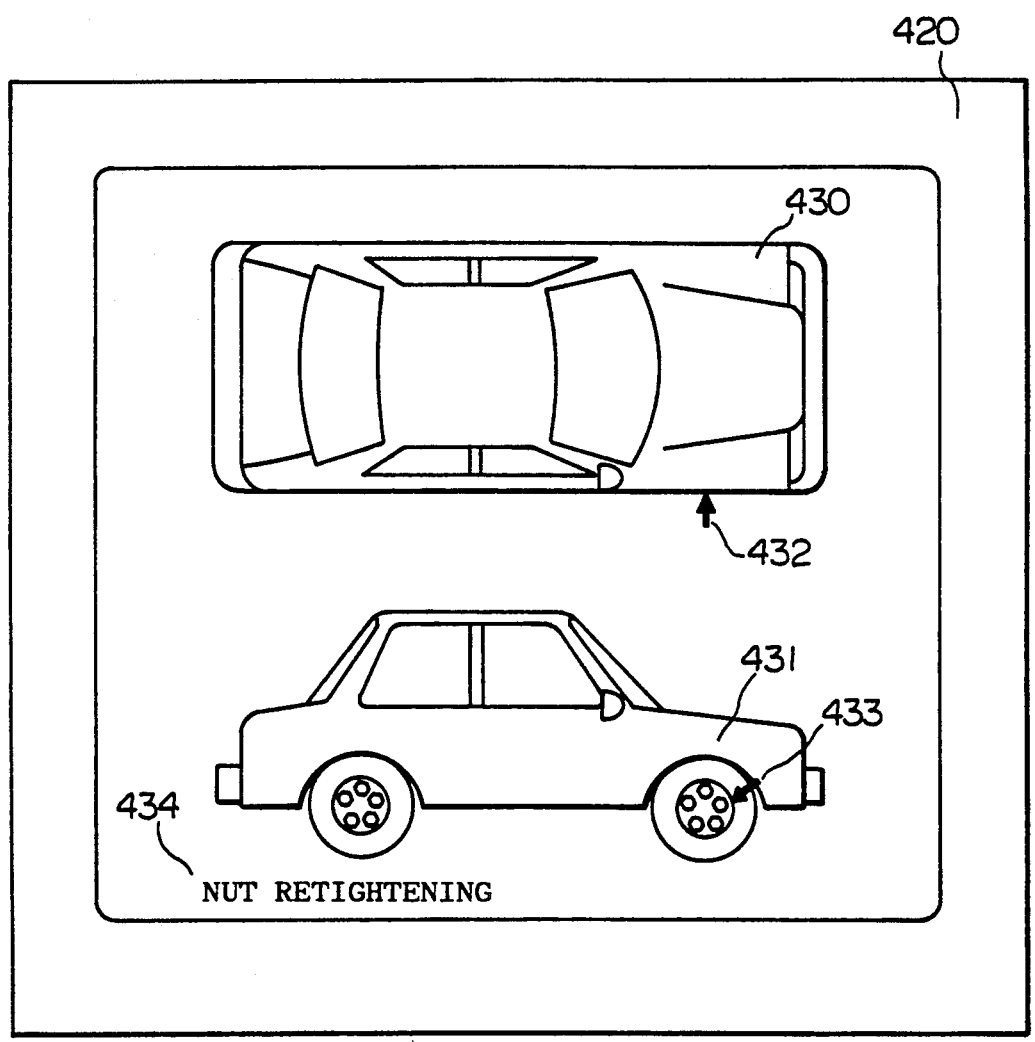
FIG. 44 is a front view of a display in the repair processing in the seventh embodiment.

The picture data consists of fundamental picture data (corresponding to the picture of the external form of the OBJ as indicated by the numerals 430 and 431 in FIG. 44) based on the kind of OBJ X (specified by car-model, destination, year-model, etc,) and the kind (specified by the part to be repaired such as tire, engine, etc.). The instructed picture data (corresponding to the arrow mark indicating the nut Y indicated by numerals 432 and 433 in FIG. 44) giving instruction on the repair on the picture 430 and 431 of external form, and the character data (character indicated by numeral 434 in FIG. 44) showing the processing content.

Accordingly, the worker of a repair process can conduct the necessary repair processing by looking at the picture on the display 420.

In the repair process, if the repair processing is not completed within a prescribed interval, some specific reactions occur such as an alarm by voice or picture, instructions on repairing again, and suspension or slowdown of the production line. In this case, the above time interval starts when the product to be repaired is introduced or the repair instructions are displayed; while the end of the interval is determined, for example, when the switching operation reports the end of the processing.

The concrete means constituting the display 430 are not limited to electric displays such as a CRT display or a liquid-crystal display; a mechanical display or even a display board displaying characters or figures, etc., may also be used.

According to the above seventh embodiment, in a automated production line where many processes are disposed in the moving direction of OBJs, and each OBJ is sequentially processed under the specific controller installed on each process, the controller in each process supplies information about the situation of the processing executed at each stage, this information is detected by a sensor, to the host controller which controls each subordinate controller at each stage. The host controller can recognize the processing situation at each stage and accordingly assess the processing situation over the entire production line.

In an automated production line where, by arranging the controller of each one of the various processes along the moving direction of the OBJs control each process based on the data stored in the storage medium which the OBJ together, prescribed processings are sequentially applied to the OBJ in such a way that each process is provided with a sensor which detects the situation of the processing executed at each stage, and a writer which writes the information detected by the sensor into the storage medium can securely transmit the result of the processing performed at each stage to other stages on the downstream side.

Furthermore, when the above constitution is such that a repair process is provided on the downstream side, by controlling the repair process based on information from the controller on the upstream side or the information in the storage medium, defects generated on the upstream side in the repair process so that the outflow of defective products from the production line, can be prevented, accordingly enhancing the reliability of the production line.

In an automated line where an OBJ is sequentially subjected to prescribed processing in a variety of processes disposed along the direction in which the OBJ, a system is provided with a sensor installed in each process for which a sensor detects the processing executed during the process, a discriminator which discriminates the property of the processing at each stage based on the supplied from the sensors at each process, a repair information outputter which outputs the repair instruction information required for a dissolution of an abnormality on condition that the discriminator discriminates the abnormality, and the repair process which is installed on the downstream side of the process for which the repair processing has been determined as necessary, and which applies the repair processing to an OBJ to be repaired. The process consists of a picture data storage unit which stores the picture data corresponding to the repair information, and a display which displays the picture data read from the picture data storage unit, can supply not only repair information, but also the content of the repair processing corresponding to this repair information, that is, the information on the processing position, the kind of processing, etc., of the repair process, in order to promote the repair processing.

Figure 45:
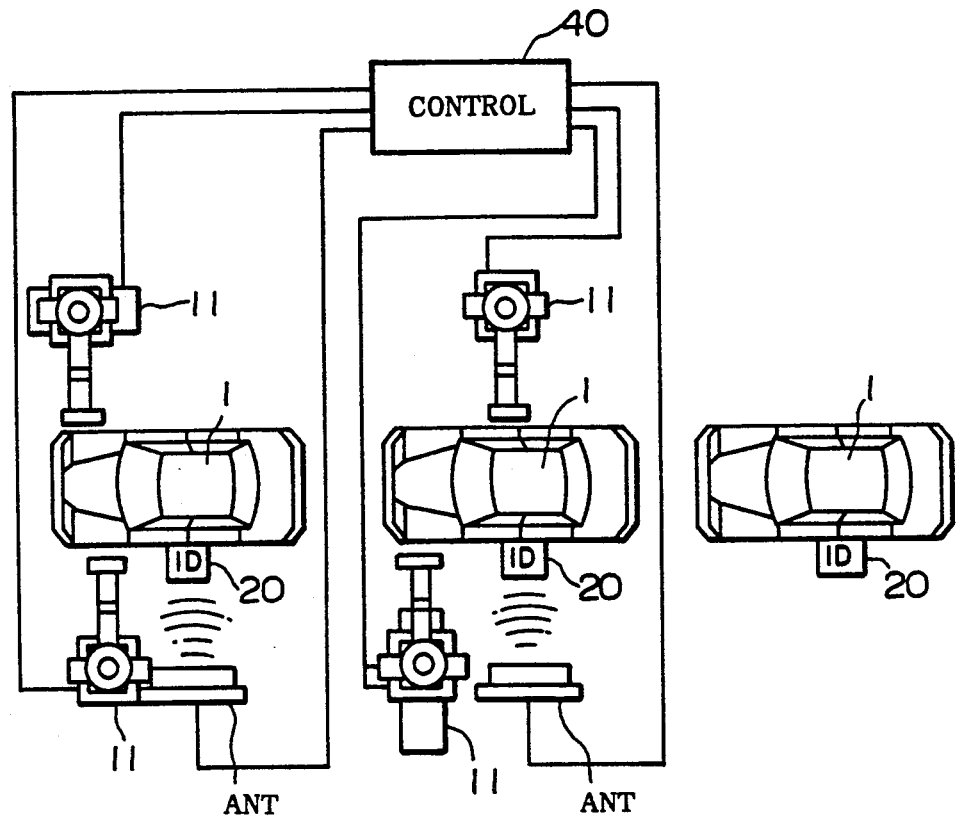
FIG. 45 is a plan view of the major portion of the production line to which an eighth embodiment of the present invention is applied.
Figure 46:
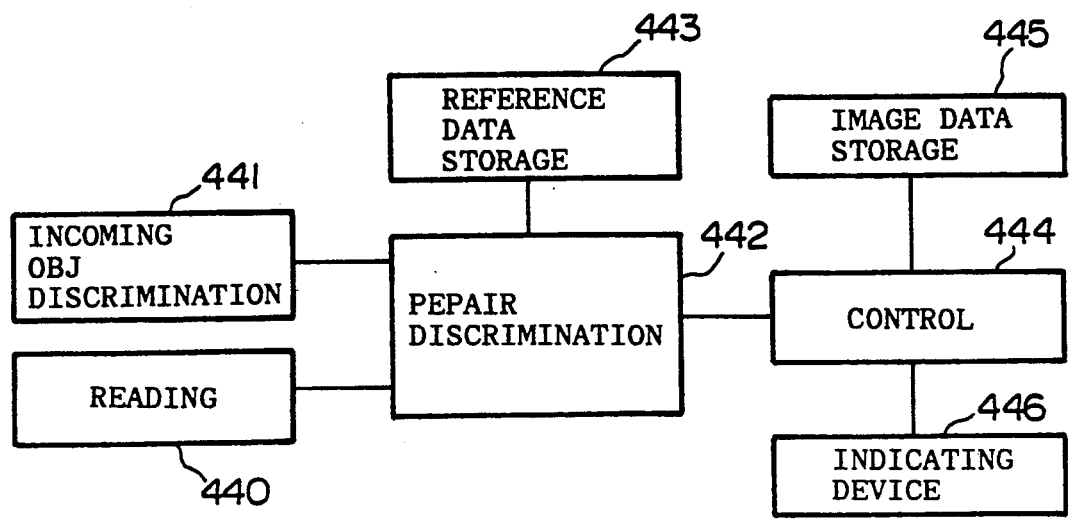
FIG. 46 is a schematic block diagram for analyzing by functions the configuration necessary for the repair processing in the eighth embodiment.
Figure 47:
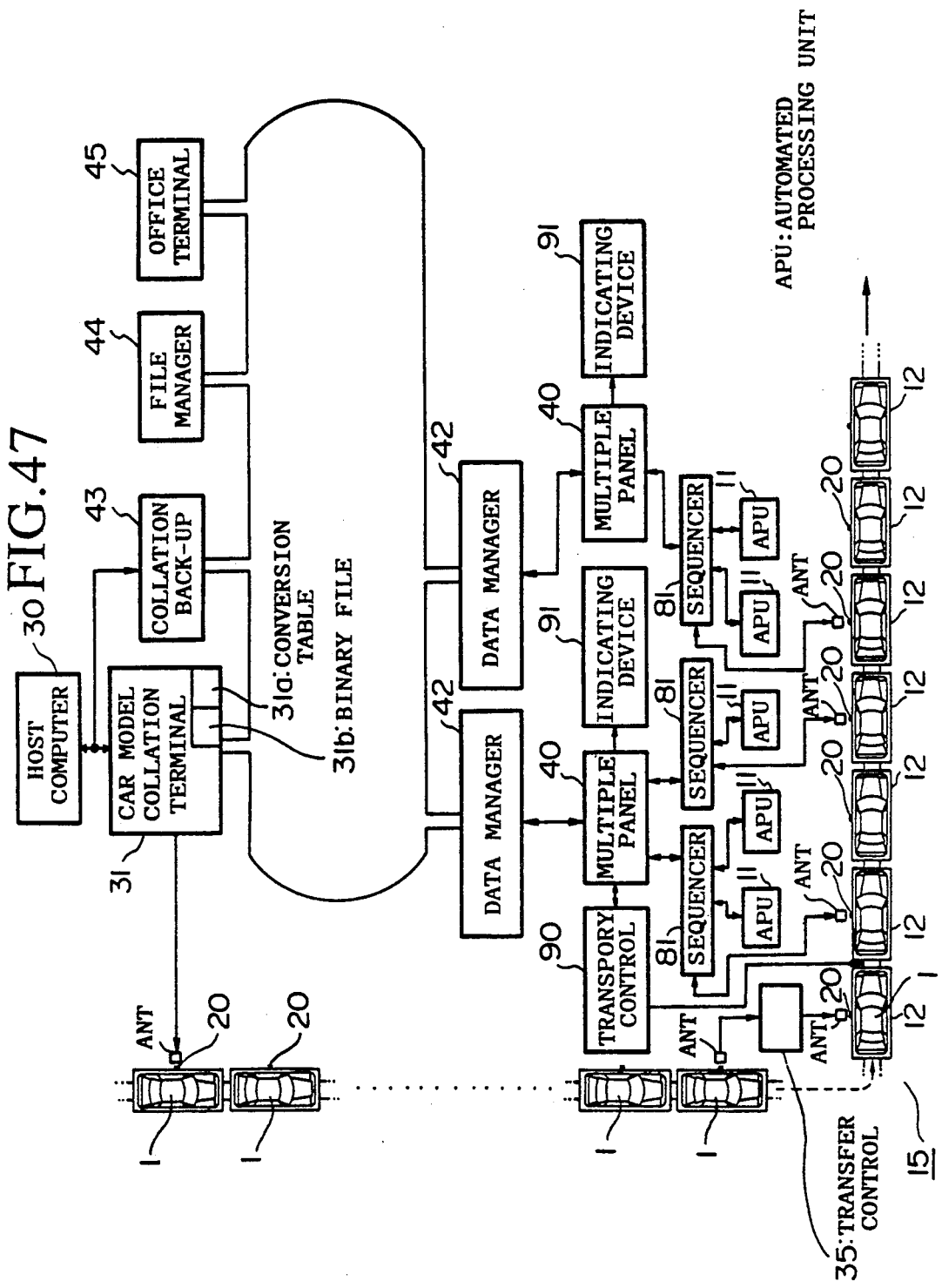
FIG. 47 is a schematic block diagram showing the electrical configuration of a ninth embodiment of the present invention applied to the production line of FIG. 1.
Figure 48:
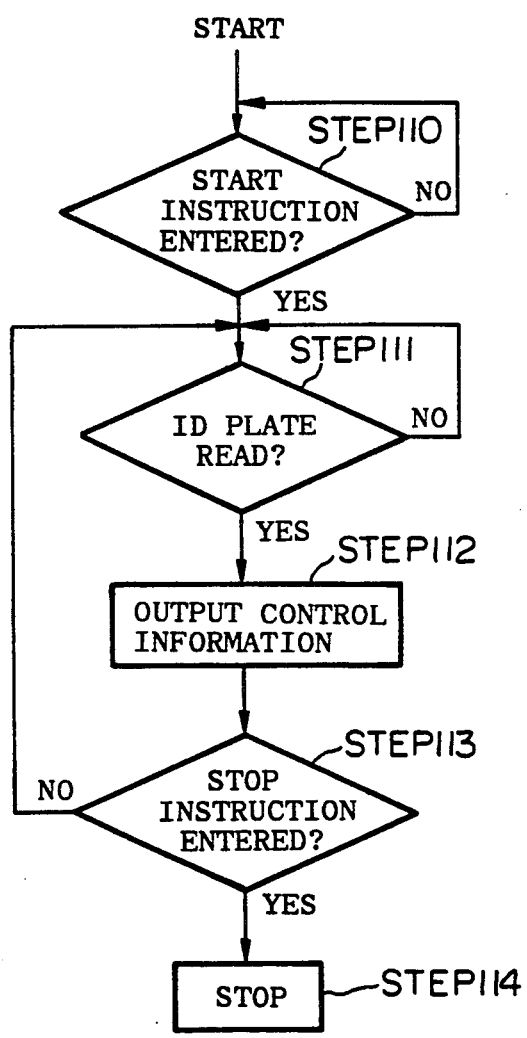
FIG. 48 is a flow chart showing the start and stop processes for one sequencer in the ninth embodiment.

FIG. 45 and FIG. 46 show the eighth embodiment of the present invention.

FIG. 45 shows one process on the upstream side of the repair process. In this process, the result (such as tightening torque) of the processing applied to a body 1 on the basis of the information read from the ID plate 20 by each APU 11 is detected under control of the controller 40 (e.g., the multiple panel installed in the process) controlling this APU 11. This result is compared with the reference data to be assessed to determine whether the results are within a specified range of quality control and the results of this assessment are put into the ID plate 20 of each OBJ 1 by means of a reader ANT (having a write function) or the handy-type writer of the worker. That is, in this embodiment, the information (to be read in each process) on the processing instruction to the APU and the information on the processing results is written into the ID plate 20 in each process. Consequently, it is unnecessary to send the information related to repair to the repair process via the LAN as in the first embodiment.

The repair process is installed on the downstream side of the process in which repair is conducted. This repair process is explained using FIG. 46. Numeral 440 indicates the reading unit which reads the information written into the ID plate 20; numeral 441 indicates an introduction discrimination unit which detects the presence of introduction of the OBJ to the repair process; numeral 442 indicates a repair discrimination unit where the correctness of the repair is assessed based on the comparison results between the data on the results of the processing fed from the reading unit 440 and the reference data stored in the reference data storage unit 443 on condition that the introduction of the OBJ is noted by the introduction discrimination unit 441. Numeral 444 shows a control unit which displays the picture data retrieved from the picture data storage unit 445 on the display 446 based on the discrimination results provided by the repair discrimination unit 443. According to the above, the following operation is executed.

When the introduction of a work is discriminated by a work introduction discriminating unit 441, the reading unit 440 reads the storage content (repair information) of the ID plate 20 and this repair information is supplied to the repair discrimination unit 442. The repair discrimination unit 442 reads the reference data corresponding to the repair information received from the data storage unit 443, and specifies the required contents of the repair processing.

The repair processing contents recognized by the repair discrimination unit 442 are supplied to the control unit 444 of the repair process.

This control unit 444 selects the picture data displaying the optimum repair processing from the data storage unit 445 in response to the discriminated contents of the defect, and controls the display 446 based on the selected picture data. This display 446 displays the contents of a suitable repair processing by selecting the picture shown in FIG. 43 on the basis of the supplied picture data. It is possible to provide a writer in the repair process and to write the contents and the results of repair processing based on the discrimination of the repair discrimination unit 442 to the ID plate 20 of the body 1. Furthermore, the information concerning the contents or results of the processing can be transmitted to the host computer (any computer connected to the LAN) to increase the degree of control.

The above embodiment uses a system in which the results of the processing of the OBJ are compared with the value to evaluate the propriety of a repair, and then the repair information is written into the ID plate. It is also possible to directly store the information of the operation results of each APU in the ID plate and to compare these results with the reference data to determine whether the results are within the prescribed range of quality control and to evaluate the propriety of the repair processing based on these determination results. When it is determined that repair is necessary, the repair contents are displayed, as in the case of FIG. 45. Otherwise, the repair processing is bypassed.

Whereas the system to report the repair contents to the worker through a display in the repair process is adopted in FIG. 46, the following may be used for the APU to conduct repair processing. The repair discrimination unit selects the optimum program from among the available repair processing programs to be conducted by the APU on the basis of a determination that repair is necessary, and supplies this program to the control unit of the APU instead of the display.

The embodiments in FIG. 45 and FIG. 46 are arranged according to function as follows.

In an automated production line where the OBJ is sequentially subjected to prescribed processing in a variety of processes disposed along the moving direction in which the OBJ moves, when the OBJ is provided with a storage medium in one therewith, each process is provided with a sensor which detects the processing situation executed during the process and a writer which writes the information detected by the sensor to the storage medium; a repair process in which the repair is applied by corresponding to the processing executed in the process on the downstream side of the process is provided with a reader which reads information from the storage medium, a repair discriminator which discriminates the propriety of the repair processing based on both the information supplied from the reader and the reference data and, at the same time, which outputs the repair information on the content of the required repair processing, a picture data storage unit which stores the picture data corresponding to the repair information, and a display which displays the picture data read from the picture data storage unit. The repair processing contents are transmitted to the repair process in a concrete form, which is easy to understand. It is also effective to compose repair information from information specifying the type of OBJ, information specifying the portion of the OBJ requiring repair, and information regarding the contents of required repair processing, and to classify the picture data into fundamental picture data, instruction picture data or character data, and store them. More detailed repair instructions are possible by controlling the selection of the fundamental picture data based on the information specifying the type of OBJ and by controlling the instruction picture data and character data based on information about the repair processing contents.

Next, FIGS. 47-51 will illustrate the ninth embodiment of the present invention.

When a host computer, indicated by numeral 21, outputs body information Db (car model derivation forms, option specification, etc.) relating to an OBJ (automobile) of a certain number n, the operation factor code Cn, for the control contents (processing to be applied in each process) of each APU are output from the model collation terminal 22 in accordance with this body information Db, and are written into an ID plate 20 together with the number data n, by means of an antenna ANT. This ID plate is attached to the automated transport dolly 12 on which the subject car 1 of the number n, is mounted or on the car itself, to be moved with the car 1 so that the number data n, and the operation factor code Cn, can be read by an antenna ANT and a write-reader attached to the APU 11 of each process. The code Cn, controls each APU 25, and thereby applies the corresponding processing to the body 1. In the case where the transfer of an OBJ from one automated transport dolly 12 to another is required because of the existing layout, i.e., a production line spanning several levels, the corresponding data is transferred to the ID plate on the other automated transport dolly 12 through the chain of a reader ANT, a transfer control unit 35, and a writer ANT. In addition, when an OBJ is removed from an automated transport dolly 12 because of a failure detection or some other circumstances, the data indicating such a situation is written into the ID plate of this dolly 12 by the writer applied by the production line worker, or the operation factor code Cn, relating to this dolly 12 is erased.

The APU 11 is connected to the sequencer 81 singly or in a group which can be further connected to the multiple panel 40 in order to output the processing conditions. Thus this operational conditions data (the number of the last car for which processing has been completed, time taken for processing, etc.) is supplied to a multiple panel 40 installed for every group of a variety of APUs so that they can be collected and supplied to other terminals connected to the LAN. The sequencer 81 reads information from the ID plate by controlling the reader ANT, and specifies the processing contents to be ordered to the subordinate APU 11.

While the multiple panels 40 of each production line are connected to the LAN (Local Area Network) to communicate with the model collation terminal 31 via the LAN in this embodiment, the structure of this network is identical to that in the aforementioned embodiments.

In this embodiment, each multiple panel is connected to both the APUs 11 constituting each production line, and the sequencer 90 which control the transporter, including the conveyors and loaders installed in the production line to transport the OBJs of the corresponding APU. Thus, the multiple panel 40 communicates with each of the sequencers 81 and 90 to control the APUs and the transporter subordinated to these sequencers in a package for each production line, and to assess the processing conditions of each APU 11 by receiving information from the sequencers 81. The interposition of the sequencers 81 and 90 between the multiple panel and each APU facilitates the catching of phenomena that occur randomly on the APU side, and if required, the random supply of control signals to the APUs.

Next, the processing contents in the production line are explained on the basis of their functions.

Monitoring Function

A sequencer is required to transact information that is randomly supplied from each APU and to supply exact control signals to each APU to control each APU individually. As a matter of fact, the majority of its throughput is dedicated to these activities. Therefore, if an occasional outputting of APU processing condition information is requested, it cannot respond to these requests promptly in some cases. To satisfy such demands, a monitoring function which uses a controller superior to the individual sequencer to exactly assess the processing situation of each process in the production line is needed.

Each sequencer 81 reads information from the ID plate 20 after noticing the approach of an automated transport dolly loaded with an OBJ, and sends control signals to subordinate APUs to specify their respective processing contents. It monitors the contents of the processing of each APU 11 over a prescribed sampling period, and inputs the information monitored (e.g., the action mode of the APU and the number of APU) into a prescribed storage area for update-recording. The sequencer 90 as a control unit monitors the operational situation of the transporter (e.g., tact (transporting speed), the position of the transporter (is it at the starting point of the operational stroke? or at the end? or on the way?)) and update-records its operational situation to a prescribed storage region. At the same time, the multiple panel 40 reads the data in each storage region of the sequencers 81 and 90 from each sequencer 81 and 90 at a prescribed sampling period (independent of that of the sequencer) and update-records or sequentially records the read information in a time series.

Accordingly, the worker controlling the production line can evaluate the operational situation of each instrument in the production line via a display 91 installed on the multiple panel 40 by operating the panel 40. Since the multiple panel 40 is connected to the network via the data manager 42, similar monitoring is possible in the other instruments.

Production line start-up/stopping function

Since the above automated production line is capable of carrying out normal production on condition that all APUs constituting the production line are operable, it is considered necessary that all APUs and transporters such as the conveyor, be operable when the production line starts. This production line start-up/stopping function is provided to quickly and securely determine whether all of the APUs and transporter constituting the production line are operable.

The automated production line in the embodiment can be started or stopped by operating the multiple panel 40. If the "start-up of production line" is defined as the state in which an OBJ can be carried in or out of the working area of each APU 11 provided that the OBJ is present and each APU 11 can conduct a prescribed action provide that the information read from the ID plate has been input the sequencer 81 controlling each APU is started when the start-up command is inputted from the multiple panel 29 as shown in FIG. 4 (Step 110).

A determination is made as to whether information has been read from the ID plate (Step 111). Control information is output based on this information to specify the operation of the APU 11 (Step 112).

The above operation is repeated until a stop command is input (Steps 113 and 114).

Figure 49:
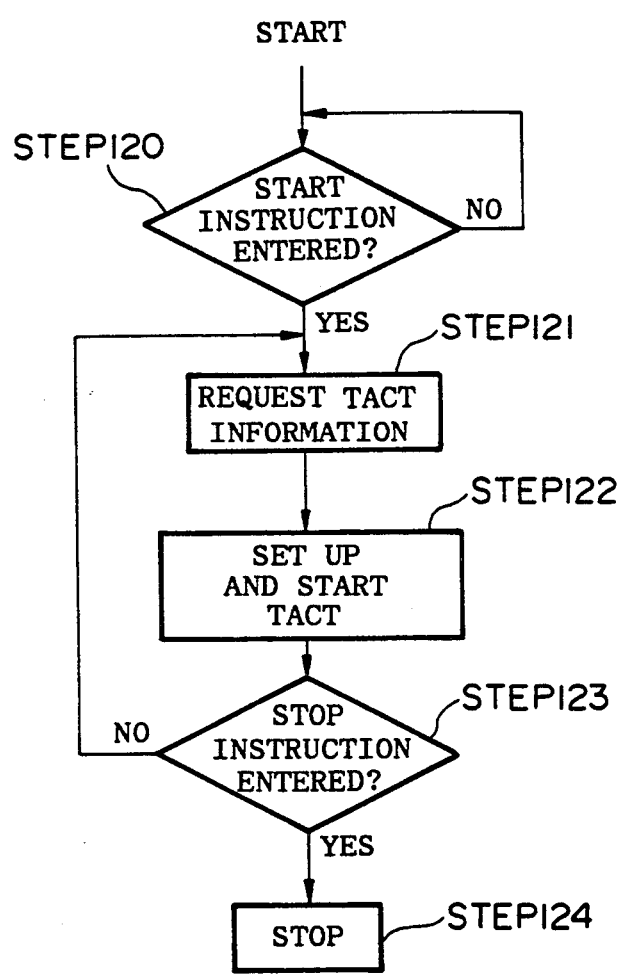
FIG. 49 is a flow chart showing the start and stop processes for other sequencers in the ninth embodiment.

Meanwhile, the sequencer 90 controlling transport operates as shown in FIG. 49.

A determination is made as to whether or not a start-up command has been inputted from the multiple panel 40 (step 120).

Information on the tact is requested from the multiple panel 40 (step 121).

The tact is set based on the supplied information, and the operation is started at the set tact (step 122).

The above operation is repeated until a stop command is input. If a change of tact becomes necessary for any reason, the tact setting value supplied in response to the request in step 121 will be changed by changing the setting of tact in the multiple panel 40.

The change of tact is defined as a change in the transport speed (amount of work transported by the transporter per unit time). Accordingly, if the tact is lowered, the frequency at which work is supplied to each APU 11 decreases so that the interval between operations becomes longer, and vice versa.

Figure 50:
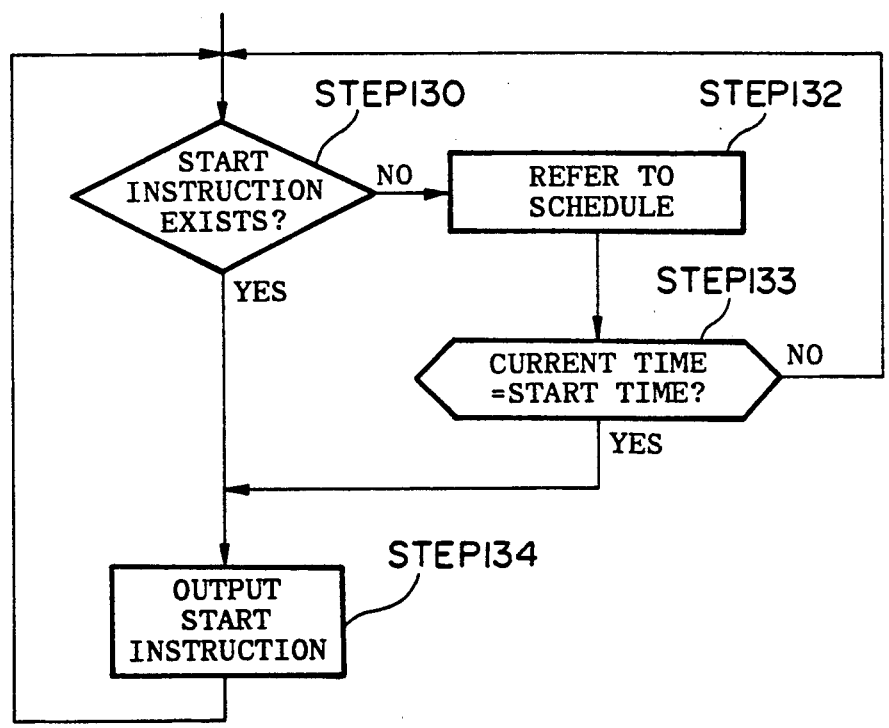
FIG. 50 is a flow chart showing the start process for the collective panel in the ninth embodiment.

The multiple panel 40 operates as shown in FIG. 50.

A determination is made as to whether or not start-up has been instructed from the keyboard, etc., installed in the multiple panel 40 (step 130).

For the start-up, a start command signal is output to the sequencer 90 (step 131).

During non-operation, the schedule from start to stop is referred to (step 132).

The time at present is compared (step 133).

A determination is made as to whether or not the starting time coincides with the time at present (step 134).

If the times coincide, step 131 is implemented, and a start command is instructed.

The schedule is recorded in the prescribed storage region of the multiple panel 40 in the structure where the time of start-stop in the production line is recorded along a time axis, so that the production plan input from the keyboard installed on the multiple panel 40, or from the host computer, is recorded in a prescribed region of the multiple panel 40.

It is possible to securely determine whether a start command is possible by utilizing the above-stated monitoring function to recognize the operating conditions of each APU in the production line prior to the start command.

Tact-changing function

The tact of the above automated production line is updated permanently or temporarily in response to the production plan or the production situation (liable to advance? or to delay?) in the preceding or subsequent process. However, it is troublesome to change the tact for every APU constituting the production line in these cases. The change of tact is not always maintained, but in some cases, is effective only during a specific period until a certain condition is met, such as, for example, until the work on that day is finished, a predetermined amount of production has been realized, etc. At times, problems may arise in returning to the original tact after the tact has been changed once. Accordingly, the. practice of changing the tact should be standardized. The tact is changed by operating the keyboard installed on the multiple panel 40 or by supplying a command to change the tact from a personal computer superior to the multiple panel 40.

Figure 51:
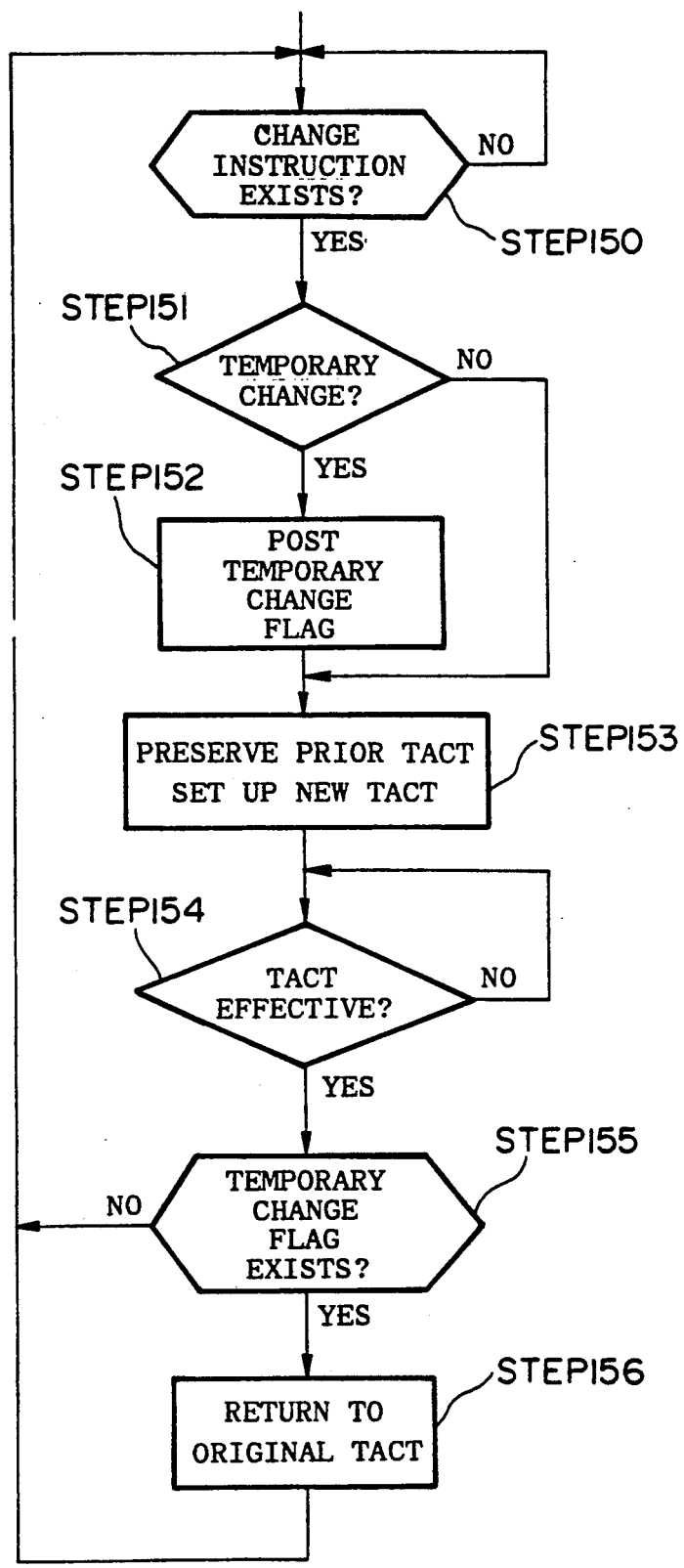
FIG. 51 is a flow chart showing the tact change process.

Hereafter, the processing for changing the tact is explained with reference to FIG. 51

Step 150

The input of tact change command is awaited.

Step 151

A determination is made as to whether or not the inputted tact change command is permanent or temporary. The tact change command is composed from the data relation to the setting value of the tact to be changed and the data indicating whether this tact change is temporary or permanent, and this determination is made by reading the data. For a temporary change, after the temporary change flag has been set at a specified position of the storage region of the multiple panel 40 (step 152), step 153 is implemented.

Step 153

The tact value supplied as the tact change data is stored undated in the set tact storage region as the set tact of the production line. The data on the tact is established before any change is conserved in any other storage regions. Consequently, a new tact is stored in a prescribed region and, as the result, the tact value supplied in Step 121 when starting the production line, is changed. If it is temporarily changed, the conservation of data regarding the tact before the change is unnecessary.

Step 154

A determination is made as to whether or not the set tact is effective. The materialization of predetermined time conditions are, for example, (e.g., a preliminary designated time has arrived, or the finishing time for that day has arrived), numerical conditions (e.g., a prescribed number of cars are produced), and artificial conditions (e.g., the production line is halted due to manual operations). As a result, the current tact is maintained as it is until the prescribed conditions occur.

Step 155

A determination is made as to whether or not the temporary change flag is up. If it is not, the program is finished, and the tact is left as it is after the change.

Step 156

If the temporary change flag is up, the data on the reference tact conserved in a separate region is read, and this tact is stored updated in a prescribed region.

Thus, depending on whether the tact change command includes a command about whether it is temporary or not, the tact after the set time or after numerical conditions are established either returns to the original tact or is maintained as changed.

The reference tact can be conserved in not only the multiple panel 29 to which the tact change command can be input, but also in the data manager superior to the panel or each APU. That is, only the region storing the current tact is installed on the multiple panel 40, and this tact can be arranged to return to the reference tact by receiving the data regarding the reference tact supplied from the storage region of the instrument of a higher or lower rank only if the change is temporary. Furthermore, a multiple panel 40 in a production line can monitor the information of the multiple panel 40 in another production line through a data manager and the LAN, or it can supply a start command or a stop command.

While an explanation is given in the case of a tact change in the above embodiment, a distinction between a temporary change and a permanent one may be allowed in changing, e.g., the operation mode. The technique in the present invention can be applied to a case in which the operational mode used in producing cars of a set model is to be restored after a temporary change in the mode to an operational mode used in producing a special model car, while the stationary operational mode is set as reference data.

The constitution of the above ninth embodiment is arranged according to the following functions.

In an automated production line where, in various processes disposed along the moving direction of the OBJs, an OBJ is subjected to prescribed sequential processings, the system related to this embodiment is composed from an individual control unit controlling each process individually and a packaged control unit controlling the individual control units in which the individual control unit is provided with a discrimination unit which discriminates the propriety of the operation in individual processes by the instructions supplied from the packaged control unit, a record unit which records the situation of individual processes during a prescribed sampling period; the packaged control unit is provided with a command setting unit which sets the command to be supplied to the individual control unit, and a reading unit which reads the information recorded in the record unit.

The above constitution enables the individual control unit to start, provided that a start command is issued from the packaged control unit, and to enable the packaged control unit to issue a start command by artificial operation or based on a prescribed operational plan. The command setting unit for the above may be, for example, a switcher which is manually operated.

The above command setting unit may be composed of a schedule recording unit which records the starting time, and a time discriminator which outputs a discrimination signal, provided that the starting time recorded in the schedule recording unit agrees with the current time.

As stated above, a start commanding signal is supplied from the packaged control unit to the control unit of each process manually or by because it arrives at the start time based on a prescribed production plan, and each process becomes operable, provided that this signal is supplied so that the automated production line composed of many processes containing many APUs is promptly activated to initiate production.

In the ninth embodiment of the invention, in an automated production line in which a number of processes are disposed along the moving direction of OBJs, an OBJ is subjected to prescribed sequential processings; the system relating to this invention consists of an individual control unit individually controlling each process and a packaged control unit controlling the individual control units; and moreover, an individual control unit is provided with a storage unit storing the updated operational situation at a prescribed period and a packaged control unit is provided with a reading unit which reads the information stored in the storage region of the individual control unit and a display which displays the information read into the reading unit.

For the above, since the updated information on the instrument to be controlled is stored in the storage region of the individual control unit, the packaged control unit obtains information of the instrument to be controlled in each process so that it can be displayed. Since the updated information on the instrument to be controlled is stored in the storage region of the individual control unit, the packaged control unit obtains information on the instrument to be controlled in each process to properly ascertain the operational situation of the instrument to be controlled by a packaged control unit.

In the ninth embodiment of the invention, in an automated production line where the OBJs are subjected to prescribed sequential processing in a variety of processes which are arranged along the direction in which the OBJs are moving, the production control system of the present invention consists of a first storage which stores the processing data recording the activity of each process, a first writer which makes the first storage store the updated data of the processing conditions, a first discriminator which discriminates the data on the new processing conditions to be updated by the updater, a second storage which conserves the contents stored in the first storage prior to the updated storage by the first writer when the specified discrimination results are obtained by the discriminator, a second discriminator which discriminates the completion of operation under the new operational conditions, and a second writer which stores the updated contents stored by the second storage into the first storage in response to the results discriminated by the first discriminator when the second discriminator discriminates the end of the operation.

For the above, the operational data related to previous operational conditions is conserved prior to the writing of the data related to the new operational conditions, based on the discrimination results related to the new operational conditions. Consequently, after the operation under the new operational conditions is finished, the conserved operational results are established in response to the discrimination results, thereby allowing an automatic return to previous operational conditions. When the operational conditions are related to speed, after the change of the production speed of the production line, the operational conditions can return automatically to their original speed.

In regard to the industrial availability of the invention as described above, since the identified data is converted to operation instruction data through a conversion table, which in turn controls the APUs, changes in the processing contents can be easily carried out by changing the contents of the conversion table. Moreover, since the operation instruction data on many OBJs is stored in the storage medium, the operation instruction data concerning the succeeding OBJs as well as the OBJ that has arrived at the processing position of an APU are obtained in advance. As a result, before the processing to one OBJ is completed and the succeeding OBJs are introduced, the operation instruction data on the succeeding OBJs is obtained and the preparation work for these OBJs can be carried out, thereby reducing the amount of time wasted, and enhancing the production efficiency of the production line.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A production control system comprising:
    a host computer for outputting identification data for identifying products;
    a plurality of automated processing units (APUs) disposed at predetermined locations in a production line, said APUs for conducting processing in accordance with operation instruction data;
    data converting means having text files which store the relationship between said operation instruction data and said identification data, said data converting means for generating said operation instruction data from said identification data by referring to said text files;
    information storage means being respectively disposed on and moving together with a plurality of objects to be processed (OBJs) flowing along said production line, said information storage means for storing the contents of processing to be applied to said OBJs;
    data writing means for writing said operation instruction data generated by said data converting means in information storage means of OBJs corresponding to said operation instruction data;
    first reading means for reading information from an information storage means of one OBJ existing at a predetermined location on said production line; and
    control means for controlling said APUs in accordance with said information read from said information storage means by said reading means so that said APUs process said one OBJ with predetermined processing;
    said information storage means comprising a plurality of storage regions for respectively storing information about one said OBJ and information about other OBJs located in a predetermined range upstream of said OBJ along said production line.

2. The production control system according to claim 1, wherein said data converting means having files for compression conversion of data, said data converting means for compression-converting said operation instruction data by referring to said files for compression conversion of data, said data writing means for writing said compression converted operation instruction data in information storage means of OBJs corresponding to said compression converted operation instruction data, each of said APUs for reading said compression converted operation instruction data from said information storage medium of said corresponding object to be processed, each of said APUs for conducting processing in accordance with said read compression-converted operation instruction data.

3. The production control system according to claim 1 or 2, wherein said control means permits processing to be performed on one of said OBJs by said APU only when said contents of processing to be applied currently on said one of OBJs coincide with said contents of processing on another one said OBJs which had been previously processed.

4. The production control system according to claim 1 or 2, further comprising:
    erasing means for clearing contents of an information storage means attached to said transporting means separated from an OBJ at the exit of said production line and transported to the entrance of said production line, and
    write-permit determination means for determining whether said contents of said information storage means is cleared, before said data writing means conducts writing, whereby said write-permit determining means enables said writing means if said contents of said information storage medium is cleared, and disables said writing means if said contents of said information storage medium is not cleared.

5. The production control system according to claim 4, wherein said data writing means comprising:
    second reading means for reading said written information from said information storage medium,
    coincidence determination means for determining whether the result read by said second reading means coincides with said information to be written by said data writing means, and
    alarm means which rewrites said information to be written when said coincidence is determined to not exist, and activates an alarm in the case where said coincidence is not detected after said rewriting is conducted a predetermined number of times.

6. The production control system according to claim 1 or 2, wherein said APUs, in addition to processing said one OBJ in accordance with information on said one OBJ, stored in said one information storage medium, conduct preparation work necessary for processing said other OBJs located in a predetermined range upstream from one said OBJ, along said production line, in accordance with information on said other OBJs.

7. A control method for production line comprising the steps of:
   storing in each of information storage means moving together with a plurality of objects to be processed moving along said production line, respective information about the contents of processing which are to be applied by automated processing units (APUs) to one OBJ, and about the contents of processing which are to be applied by said APUs to others OBJs located at up to an ith location in succession on the upstream side of said one OBJ along said production line;
   reading information from an information storage means moving together with one said OBJ;
   causing said APUs to apply to said one OBJ on said information corresponding to said one OBJ only when a coincidence exists between information about said one OBJ, read from said one information storage means corresponding to said one OBJ, and information about said one OBJ, read from an information storage means of another OBJ processed by said APUs prior to said reading from said corresponding information storage unit;
   said control method for a production line further comprising the step of:
   replacing information, in the case where an OBJ is removed from said production line, at a location up to an ith location on the upstream side of said one OBJ to be processed, said step of replacing information including replacing information, stored in a group of information storage means, about OBJs on the upstream side of said removed OBJ, with information about OBJs upstream respectively adjacent to said OBJs on the upstream side of said removed OBJ stored, said group of information storage means being disposed on OBJs located at up to an ith location in succession on the downstream side of said removed OBJ.

8. A control method for a production line comprising the steps of:
   storing in each of information storage means moving together with a plurality of transporting means, on which a plurality of objects to be processed (OBJs) are respectively disposed, moving along said production line, respective information about the contents of processing which are to be applied by automated processing units (APUs) to one OBJ, and about the contents of processing which are to be applied by said APUs to other OBJs, disposed on said transporting means, located at up to an ith location in succession on the upstream side of said one OBJ along said production line;
   reading information from an information storage means moving together with one said OBJ;
   causing said APUs to apply to said one OBJ on said information corresponding to said one OBJ only when a coincidence exists between information about said one OBJ, read from said one information storage means corresponding to said one OBJ, an information about said one OBJ, read from an information storage means of another OBJ processed by said APUs prior to said reading from said corresponding information storage means;
   said control method for a production line further comprising the step of:
   writing information, in the case where an OBJ is removed from one transporting means on said production line, said step of writing information including writing information that no OBJ exists, in storage regions of an information storage medium disposed on said one transporting means and in storage regions of information storage means disposed on a group of transporting means located at up to an ith location in succession on the downstream side of said one transporting means, said storage regions corresponding to said removed OBJ and OBJs disposed on said group of transporting means, and for replacing said information that no OBJ exists, stored in said storage regions, with information about said new OBJ when a new OBJ is mounted on said one transporting means, from which said one OBJ was removed.

9. A control method for production line comprising the steps of:
   storing in each of information storage means moving together with a plurality of objects to be processed (OBJs) moving along said production line, respective information about the contents of processing which are to be applied by automated processing units (APUs) to one OBJ, and about the contents of processing which are to be applied by said APUs to others OBJs located at up to an ith location in succession on the upstream side of said one OBJ along said production line;
   reading information storage means moving together with one said OBJ;
   causing said APUs to apply to said one OBJ on said information corresponding to said one OBJ only when a coincidence exists between information about said one OBJ, read from said one information storage means corresponding to said one OBJ, and information about said one OBJ, read from an information storage means of another OBJ processed by said APUs prior to said reading from said corresponding information storage means;
   said control method for a production line further comprising the steps of:
   placing a new OBJ on the downstream side of an OBJ located at a not-less-than-the-ith location on the upstream side of said one OBJ being processed by said APUs;
   storing in an information storage means of said new OBJ, information about said new OBJ and information about a group of OBJs located at up to an ith location in succession on the upstream side of said new OBJ, along said production line; and
   writing information about said new OBJ, in storage regions of information storage means of OBJs located at up to an ith location in succession on the downstream side of said new OBJ, said storage regions corresponding to said new OBJ, and for replacing information, stored in storage regions corresponding to OBJs on the upstream side of said new OBJ, with information about OBJs downstream adjacent to said OBJs on the upstream side of said new OBJ.

10. A production control system comprising:

information storage mediums being respectively disposed on and moving together with a plurality of objects to be processed (OBJs), said information storage mediums for storing the contents of processing to be applied to said OBJs;

first reading means for reading information from one of said information storage medium disposed on one of said OBJs existing at a predetermined location on said production line;

data writing means for writing information in said one information storage medium;

a control unit for controlling automated processing units (APUs) in accordance with said information read from said one information storage medium by said reading means so that said APUs apply predetermined processing to said one OBJ; and discriminating means for discriminating whether an OBJ has been removed from said production line;

said information storage mediums comprising a plurality of storage regions for respectively storing information about said one OBJ, and information on OBJs located between a predetermined range of distance on the upstream side of said one OBJ, along said production line;

said discriminating means for discriminating whether an OBJ has been removed from said production line, and whether a new OBJ has been placed in said production line, at a not-less-than-the-ith location on the upstream side of said one OBJ;

said data writing means for replacing information, stored in a group of information storage mediums, about OBJs on the upstream side of said removed OBJ, with information about OBJs upstream respectively adjacent to said OBJs on the upstream side of said removed OBJ stored, said group of information storage mediums being disposed on OBJs located at up to an ith location in succession on the downstream side of said removed OBJ when said removal of said OBJ is discriminated by said discriminating means;

said data writing means for writing information about said new OBJ, in storage regions of information storage mediums disposed on OBJs located at up to an ith location in succession on the downstream side of said new OBJ, said storage regions corresponding to said new OBJ, and for replacing information, stored in storage regions corresponding to OBJs on the upstream side of said new OBJ, with information about OBJs downstream adjacent to said OBJs on the upstream side of said new OBJ, when said placement of said new OBJ is discriminated by said determining means;

said control unit for controlling said APUs, in accordance with information on said one OBJ read out currently from said one information storage medium only when said information on said one OBJ read out currently from said one information storage medium and information on said one OBJ read out last time from said one information storage medium.

11. A production control system comprising:

information storage mediums being respectively disposed on and moving together with a plurality of objects to be processed (OBJs), said information storage mediums for storing the contents of processing to be applied to said OBJs;

first reading means for reading information from one of said information storage medium disposed on one of said OBJs existing at a predetermined location on said production line;

data writing means for writing information in said one information storage medium;

a control unit for controlling automated processing units (APUs) in accordance with said information read from said one information storage medium by said reading means so that said APUs apply predetermined processing to said one OBJ; and discriminating means for discriminating whether an OBJ has been removed from said production line;

said information storage mediums comprising a plurality of storage regions for respectively storing information about said one OBJ, and information on OBJs located between a predetermined rage of distance on the upstream side of said one OBJ, along said production line;

said discriminating means for discriminating whether an OBJ has been removed from said production line, and whether a new OBJ has been placed in said production line, at a not-less-than-the-ith location on the upstream side of said one OBJ;

said data writing means for writing information that no OBJ exists, in storage regions of an information storage medium of said removed OBJ and in storage regions of information storage mediums disposed on OBJs locate at up to an ith location in succession on the downstream side of said removed OBJ, said storage regions corresponding to said removed OBJ, when said removal of said removed OBJ is discriminated by said discriminating means, and for replacing said information that no OBJ exists, stored in said storage regions, with information about said new OBJ when the placement of a new OBJ on said one transporting means from which said one OBJ was removed, is discriminated by said discriminating means;

said control unit for controlling said APUs, in accordance with information on said one OBJ read out currently from said one information storage medium only when said information on said one OBJ read currently from said one information storage medium and information on said one OBJ read last time from said one information storage medium.

12. The control method for a production line according to any one of claims 7 to 9, wherein said information replacing is performed by information supply means.

13. The production control system according to claim 1 or 2, further comprising:

transfer means for transferring objects to be processed form an introduction part of a plurality of production lines and to transfer each production line to a delivery part and then to circulate the production line after moving to said introduction part again after delivering said objects to be processed;

storage means for storing information regarding said objects to be processed;

reading means for reading said information from the storage means provided at said transferring means when said transferring means, provided with objects to be processed, reaches a delivery part of a production line;

storage means for storing said information read by said reading means;

writing means for writing said information to be stored by said storage means into a storage medium which is provided at said transferring means existing in another production line; and writing means for writing information to be stored by said storage means into a storage medium which is provided at said transferring means when said objects to be processed reach a transferring means existing at an introduction part of another production line.

14. The production control system according to claim 1 or 2, further comprising;

transfer means for transferring objects to be processed from an introduction part of a plurality of production lines and to transfer each said production line to a delivery part, and then to circulate the production line after moving to said introduction part again after delivering said objects to be processed;

intermediate transferring means to transfer said objects to be processed from the delivery part of one production line to the introduction part of another production line;

a storage medium for storing information regarding said objects to be processed which is provided at said transferring means;

reading means to read said information from the storage medium which is provided at said transferring means when said transferring means which is provided with objects to be processed reaches a delivery part of one production line;

first storage means to store said information read by said reading means;

second storage means for reading information within the first storage means when said objects to be processed are placed at said intermediate transferring means;

third storage means for reading information within said second storage means when said objects to be processed are carried to an introduction line of another production line; and writing means for writing information within said third storage means into said transferring means when said objects to be processed are placed at a transferring means existing at an introduction part of another production line.

15. The production control system according to claim 14, wherein said intermediate transferring means comprises a plurality of continuous transferring means, said second storage means comprises a plurality of storage areas corresponding to each transferring part, each storage area reading information form a storage area of a previous stage when objects to be processed are placed at a corresponding transferring part, and said third storage means reading information form a storage area at a final stage of said second storage means when objects to be processed are carried to an introduction part of another production line.

16. The production control system according to claim 1 or 2, comprising:

transferring means for transferring objects to be processed from an introduction part of a plurality of production lines and to transfer each production line to a delivery part, and then to circulate the production line after moving to said introduction part again after delivering said objects to be processed;

intermediate transferring means for transferring said objects to be processed form a deliver part of one production line to an introduction part of another production line;

a storage medium to store information regarding said object to be processed which is provided at said transferring means and said intermediate transferring means;

reading means for reading said information form a storage medium which is provided at said transferring means when said transferring means which is provided with objects to be processed reaches a delivery part of one production line;

first storage means for storing said information read by said reading means;

writing means for writing information which said second storage means stores into a storage medium which is provided when said objects to be processed reach a transferring means existing at an introduction part of another production line; and writing means for writing information to be stored into said second storage means into a storage medium which is provided at said transferring means when said objects to be processed reach a transferring means existing in an introduction part of another production line.

17. The production control system according to claim 1 or 2, wherein each automated processing unit is provided with a storage medium used to store processing information regarding objects to be processed and with reading means for reading information from this storage medium and then outputting the information to an upper-level controller, the production control system further comprising;

transferring means for transferring objects to be processed which are fed from an introduction part of a production line in sequence;

storage means which is provided at said transferring means; and processed information reading means for reading said storage medium, wherein processing information regarding objects to be processed is fed from an upper-level controller previously being based on production control information, wherein a plurality of automated processing units which are disposed along the travelling direction of objects to be processed are operated in sequence, being based on operation information from said upper-level controller corresponding to processing information stored at said storage medium for performing a predetermined processing to said objects to be processed.

18. The production control system according to claim 1 or 2, comprising a plurality of input means such as a bar code reader or a keyboard for entering processing information regarding objects to be processed into a network and conversion means for performing conversion-processing to enable input information to be of the same format as information of the above processing details of said upper-level controller, wherein said production line is provided with transferring means for transferring objects to be processed which are fed form an introducing part of a production line in sequence, storage means which is provided at this transferring means, an upper-level controller which sets and stores processing details regarding objects to be processed on the production line, and processing information reading means for reading said storage medium where processing information regarding the objects to be processed, which is sent from the upper-level controller previously being based on production control information, and which enables a predetermined processing to be made to said objects to be processed by operating a plurality of automated processing units which are placed along the travelling direction of objects to be processed in sequence, being based on operation information from said upper-level controller corresponding to processing information which is stored in said storage medium.

19. The production control system according to claim 1 or 2, further comprising:
- transferring means for transferring objected to be processed form an introduction part of a production line to a deliver part and for moving to said introduction part again after the objects to be processed are delivered, and for circulating the production line;
- automated processing units which are provided along said production line and process objects to be processed which are carried by the transferring means in sequence;
- storage means which is provided at said transferring means and for storing receiving product identification information writes information into said storage medium, or reads and outputs information from said storage medium;
- a lower-level controller which selects an operation pattern corresponding to the output of said reading/writing means out of a previously stored plurality of operation patterns corresponding to output from said reading/writing means, controls said automated processing units, and outputs data of the objects to be processed, being processed by said automated processing units; and
- an upper-level controller which outputs product identification information to said storage medium through said reading/writing means and receives data of said objects to be processed through a network.

20. The production control system according to claim 1 or 2, wherein predetermined processing is performed in sequence on objects to be processed by enabling controlling means, which is provided at each process, to control a plurality of processes which are disposed along the travelling direction of objects to be processed, and said controlling means at each process supplies information which is supplied from a sensor which detects the condition of processing to be executed at said process to upper-level control means for controlling each controlling means.

21. The production control system according to claim 1 or 2, wherein a predetermined processing is performed for said objects to be processed in sequence by enabling controlling means at each process to control a plurality of processes which are disposed along the traveling direction of said objects to be processed, being based on data written into a storage medium which moves in one piece with said objects to be processed comprising;
- a sensor for detection processing conditions to be executed during said process; and
- writing means for writing information detected by said sensor into said storage medium.

22. The production control system according to claim 20, further comprising repair means for performing repairs necessary on objects to be processed, the repairs being based on information which is supplied from said upper-level control means provided downstream of said plurality of processes.

23. The production control system according to claim 21, further comprising repair means for repairing objects to be processed, the repairs being based on information written into said storage medium downstream of said plurality of processes.

24. The production control system according to claim 22, wherein said repair means comprises an image data storage part for storing image data corresponding to said repair information and a display part for displaying image data read from said image data storage part.

25. The production control system according to claim 23, wherein said repair means comprises reading means for reading information from said storage medium, repair discriminating means for outputting repair information regarding the details of the repair processing needed according to information supplied from said reading means, an image data storage part for storing image data corresponding to said repair information, and a display part for displaying image data read from said image data storage part.

* * * * *